(12) United States Patent
Moore et al.

(10) Patent No.: US 10,100,902 B2
(45) Date of Patent: Oct. 16, 2018

(54) MOTOR WITH ENCODER FLYWHEEL

(71) Applicant: Nidec Motor Corporation, St. Louis, MO (US)

(72) Inventors: William D. Moore, Florissant, MO (US); Philip S. Johnson, Granite City, IL (US); Joshua M. Biro, Collinsville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 171 days.

(21) Appl. No.: 15/047,260

(22) Filed: Feb. 18, 2016

(65) Prior Publication Data
US 2016/0241105 A1 Aug. 18, 2016

Related U.S. Application Data

(60) Provisional application No. 62/206,109, filed on Aug. 17, 2015, provisional application No. 62/153,985, (Continued)

(51) Int. Cl.
*H02K 1/18* (2006.01)
*H02K 5/22* (2006.01)
*F16H 1/10* (2006.01)
*F16H 57/02* (2012.01)
*H02K 1/27* (2006.01)
(Continued)

(52) U.S. Cl.
CPC ........... *F16H 1/10* (2013.01); *B60K 7/0007* (2013.01); *F16H 57/02* (2013.01); *H02K 1/18* (2013.01); *H02K 1/185* (2013.01); *H02K 1/276* (2013.01); *H02K 5/161* (2013.01); *H02K 5/1735* (2013.01); *H02K 5/22* (2013.01); *H02K 5/225* (2013.01); *H02K 7/02* (2013.01); *H02K 7/085* (2013.01); *H02K 7/116* (2013.01); *H02K 11/20* (2016.01); *H02K 11/21* (2016.01); *H02K 11/22* (2016.01); *H02K 11/33* (2016.01); *H02K 15/03* (2013.01); *B60K 17/043* (2013.01);
(Continued)

(58) Field of Classification Search
USPC .............................. 310/68 B, 89, 90, 91, 99
IPC ................................................ H02K 1/18,5/22
See application file for complete search history.

(56) References Cited

U.S. PATENT DOCUMENTS 4,862,044 A * 8/1989 Karashima ................ G01P 1/00
318/400.37
5,831,358 A * 11/1998 Bobay ...................... H02K 7/04
310/216.117
(Continued)

FOREIGN PATENT DOCUMENTS

JP 3335034 10/2002
JP 2003189539 A 7/2003
(Continued)

OTHER PUBLICATIONS

PCT International Search Report and Written Opinion from PCT Application No. PCT/US2016/018509 entitled Electric Motor (Dated Aug. 11, 2016).

(Continued)

*Primary Examiner* — John K Kim
(74) *Attorney, Agent, or Firm* — Hovey Williams LLP

(57) ABSTRACT

Electric motors are disclosed. The motors are preferably for use in an automated vehicle, although any one or more of a variety of motor uses are suitable. The motors include lift, turntable, and locomotion motors.

20 Claims, 40 Drawing Sheets

Related U.S. Application Data filed on Apr. 28, 2015, provisional application No. 62/117,810, filed on Feb. 18, 2015.

(51) Int. Cl.
| | |
|---|---|
| H02K 15/03 | (2006.01) |
| H02K 11/20 | (2016.01) |
| H02K 5/16 | (2006.01) |
| H02K 11/21 | (2016.01) |
| H02K 11/22 | (2016.01) |
| H02K 7/02 | (2006.01) |
| H02K 7/116 | (2006.01) |
| B60K 7/00 | (2006.01) |
| H02K 5/173 | (2006.01) |
| H02K 7/08 | (2006.01) |
| H02K 11/33 | (2016.01) |
| B60K 17/04 | (2006.01) |

(52) U.S. Cl.
CPC ............ *B60K 2007/0038* (2013.01); *B60K 2007/0046* (2013.01); *B60K 2007/0061* (2013.01); *B60Y 2200/40* (2013.01); *F16H 2057/02034* (2013.01)

(56) References Cited

U.S. PATENT DOCUMENTS

| | | | | |
|---|---|---|---|---|
| 6,255,751 | B1* | 7/2001 | Hoffmann | H02K 7/083 |
| | | | | 310/40 MM |
| 6,577,030 | B2* | 6/2003 | Tominaga | B62D 5/0406 |
| | | | | 310/64 |
| 2004/0119345 | A1* | 6/2004 | Takano | H02K 5/00 |
| | | | | 310/43 |
| 2005/0027396 | A1 | 2/2005 | Yang et al. | |
| 2005/0174007 | A1 | 8/2005 | McClelland et al. | |
| 2006/0250039 | A1 | 11/2006 | Yamamoto | |
| 2010/0243357 | A1 | 9/2010 | Yim et al. | |
| 2011/0273166 | A1* | 11/2011 | Salt | G01D 5/147 |
| | | | | 324/207.24 |
| 2013/0249356 | A1* | 9/2013 | Nakano | H02K 5/24 |
| | | | | 310/68 D |
| 2014/0042861 | A1 | 2/2014 | Kawaji | |
| 2016/0241105 | A1* | 8/2016 | Moore | F16H 1/10 |

FOREIGN PATENT DOCUMENTS

| | | |
|---|---|---|
| JP | 2006246629 A | 9/2006 |
| JP | 2007189812 A | 7/2007 |
| JP | 2008187764 | 8/2008 |
| JP | 2010158154 A | 7/2010 |
| JP | 2013034335 A | 2/2013 |
| JP | 2014075900 A | 4/2014 |
| KR | 1020070092811 A | 9/2007 |
| KR | 1020090050650 A | 5/2009 |

OTHER PUBLICATIONS

European Search Report from European Application No. 17190966.6 entitled Electric Motor (Dated Feb. 18, 2018).

* cited by examiner

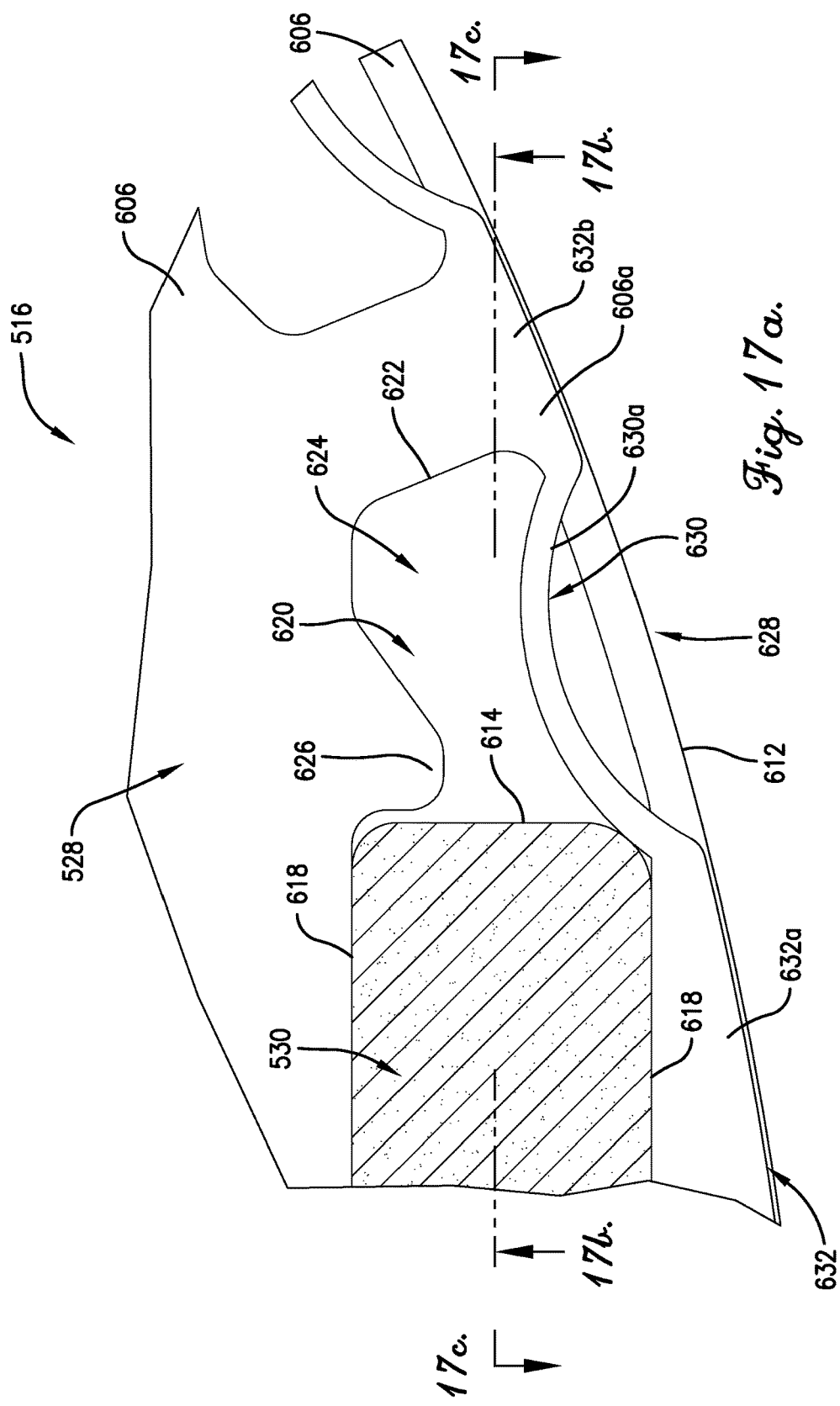

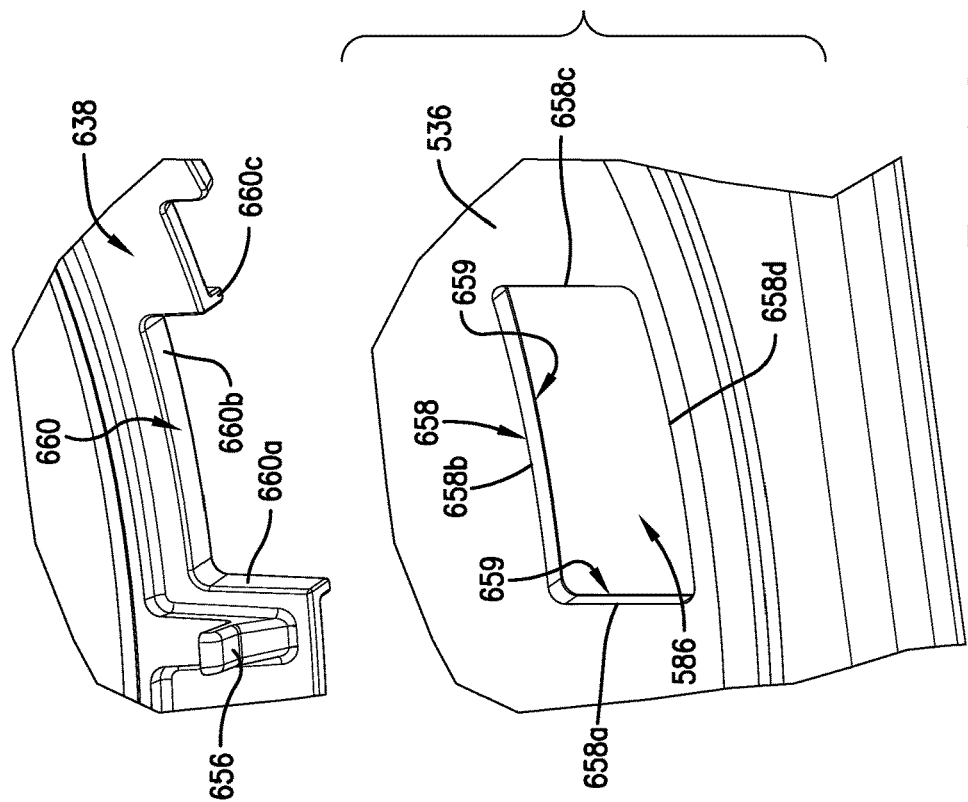
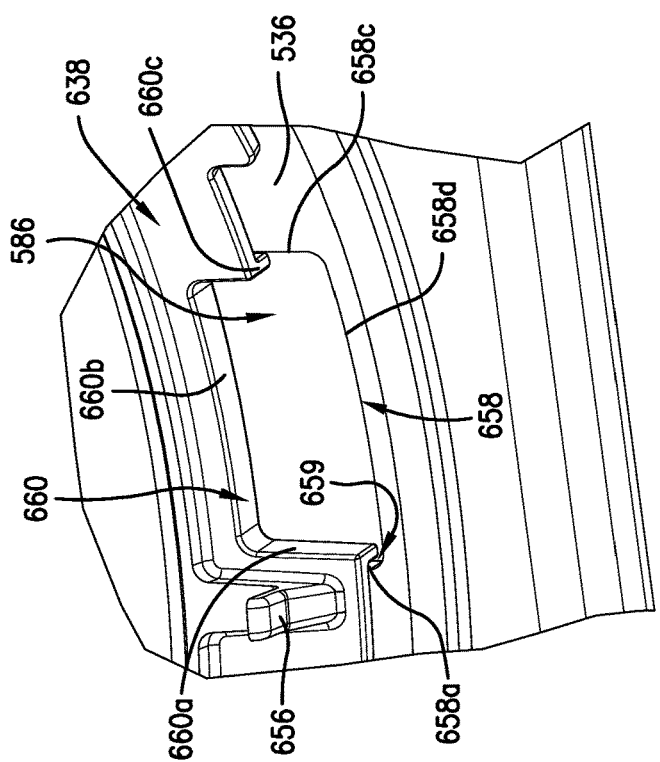

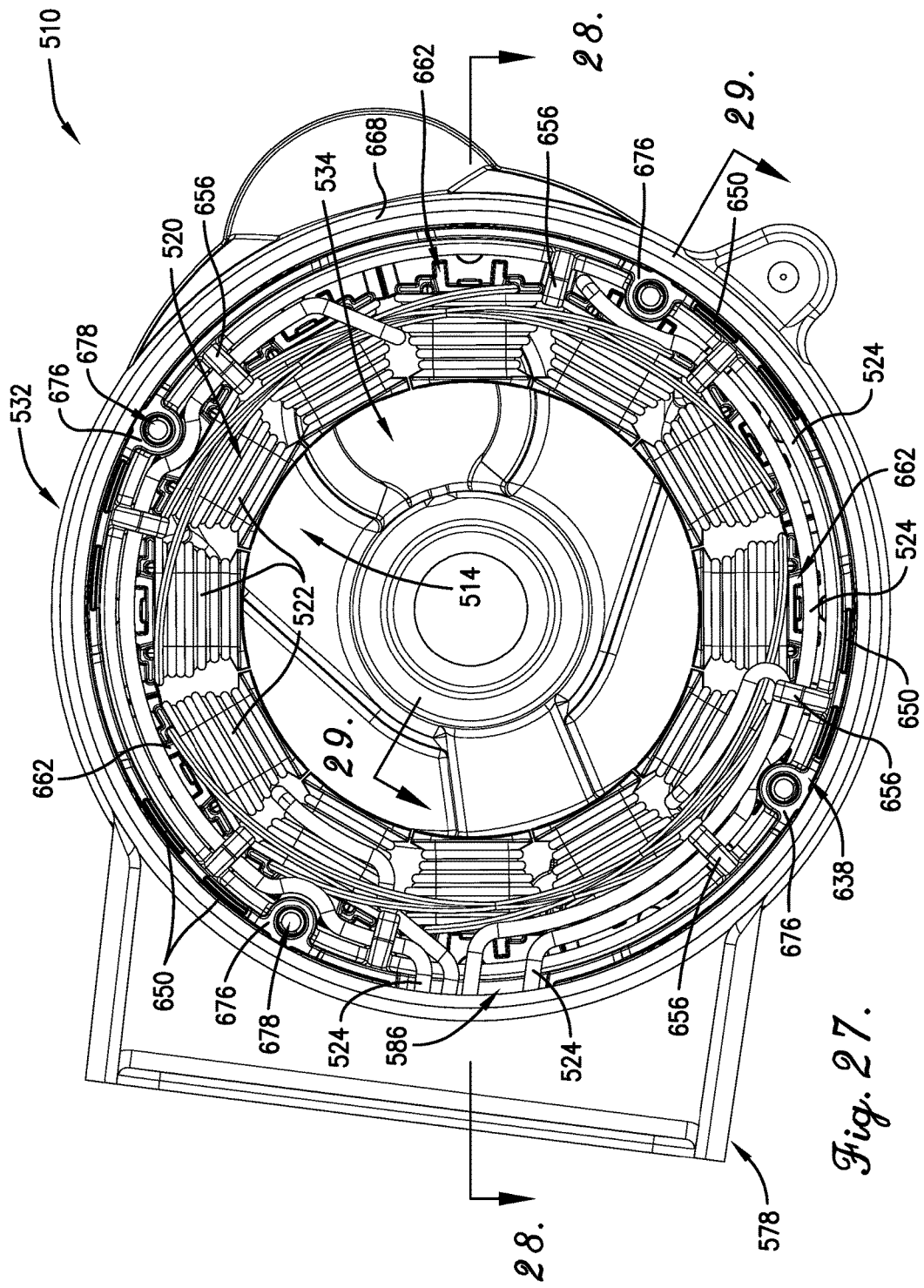

MOTOR WITH ENCODER FLYWHEEL

CROSS-REFERENCE TO RELATED APPLICATIONS

1. Priority Applications

The present application claims priority from U.S. Provisional Patent Application No. 62/117,810, filed Feb. 18, 2015, and entitled LOCOMOTION GEARMOTOR FOR AUTOMATED GUIDED VEHICLE; U.S. Provisional Patent Application No. 62/153,985, filed Apr. 28, 2015, and entitled INTEGRATED MOTOR AND CONTROL FOR AUTOMATED GUIDED VEHICLE; and U.S. Provisional Patent Application No. 62/206,109, filed Aug. 17, 2015, and entitled GEARMOTOR FOR AUTOMATED GUIDED VEHICLE AND THE LIKE, the entire disclosure of each of which is hereby incorporated by reference herein.

2. Contemporaneously Filed Applications

The present application is filed contemporaneously with U.S. patent application Ser. No. 15/047,244, entitled TRACTION MOTOR ASSEMBLY WITH GEAR-INTERCONNECTED WHEEL AND OUTPUT SHAFT, filed Feb. 18, 2016; U.S. patent application Ser. No. 15/047,249, entitled ELECTRIC MOTOR HAVING LOW AXIAL PROFILE, filed Feb. 18, 2016; U.S. patent application Ser. No. 15/047,256, entitled MOTOR HAVING RING FOR AXIALLY RETAINING STATOR, filed Feb. 18, 2016; and U.S. patent application Ser. No. 15/047,265, entitled STAKED ROTOR CORE FOR RETAINING MAGNETS, filed Feb. 18, 2016. The entire disclosure of each of the aforementioned contemporaneously filed applications is hereby incorporated by reference herein.

BACKGROUND OF THE INVENTION

1. Field of the Invention

The present invention relates generally to an electric motor assembly. The motor assembly is preferably for use in an automated vehicle or, more particularly, in a robot for use in a warehousing system. However, any one or more of a variety of motor assembly uses are suitable.

2. Discussion of the Prior Art

Those of ordinary skill in the art will appreciate that electric motor assemblies are often used in a variety of applications, including but not limited to vehicles, automated devices, home appliances such as dishwashers and washing machines, exercise equipment, pumps, and more.

SUMMARY

According to one aspect of the present invention, a motor is provided for use in a machine. The motor comprises a rotor and an encoder flywheel. The rotor is rotatable about an axis. The rotor includes a core, a plurality of magnets fixed relative to the core to rotate therewith, and a rotor shaft rotatably supporting the core and the magnets. The encoder flywheel is fixed to the rotor shaft to rotate therewith. The encoder flywheel includes a wheel body and a sensed element secured to the wheel body to rotate therewith. The rotor and the encoder flywheel cooperatively present a total moment of inertia. The encoder flywheel presents an encoder flywheel moment of inertia that is at least fifteen percent (15%) of the total moment of inertia.

BRIEF DESCRIPTION OF THE DRAWING FIGURES

Preferred embodiments of the present invention are described in detail below with reference to the attached drawing figures, wherein.

Figure 2:
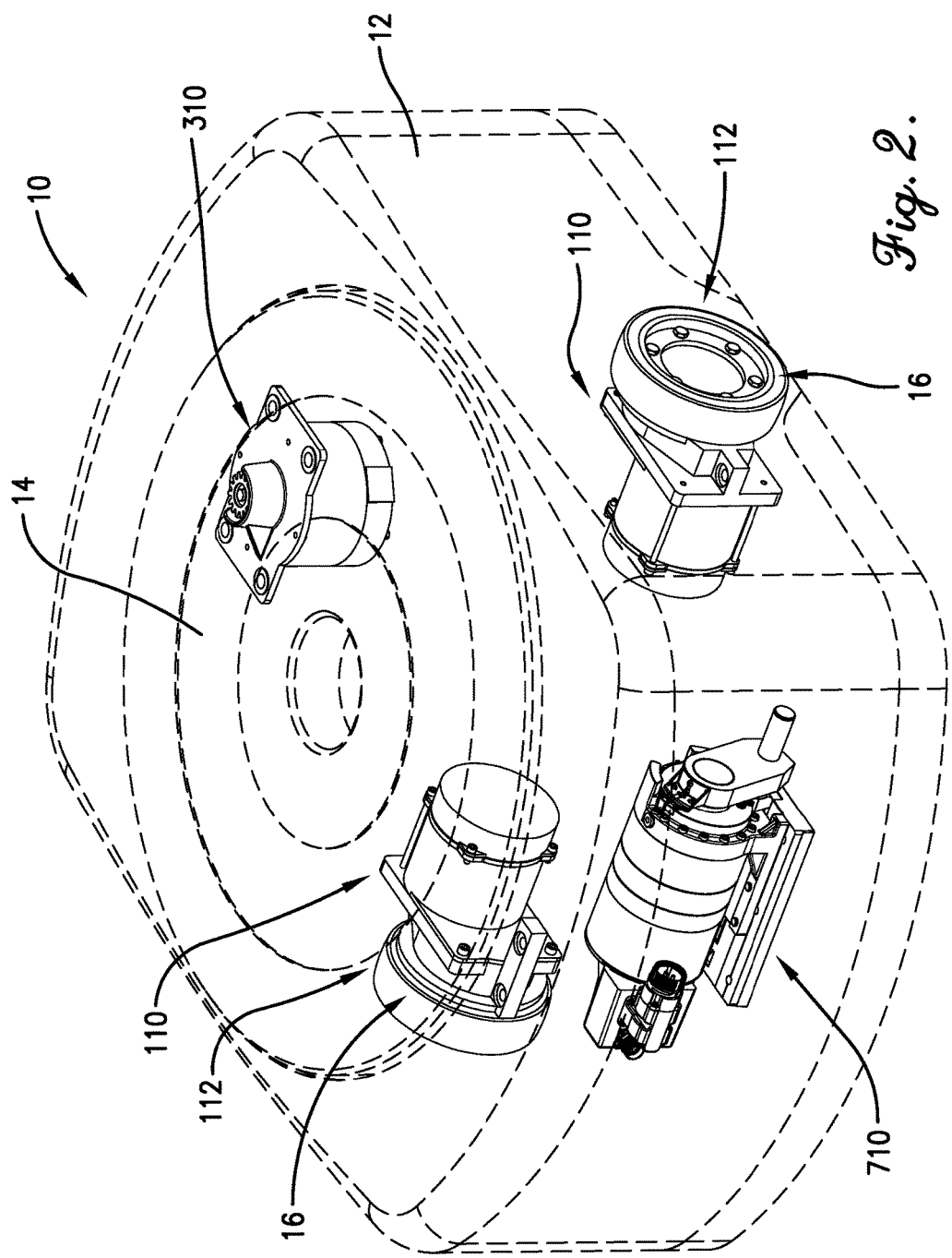
FIG. 2 illustrates the robot of FIG. 1, including locomotion, turntable, and lift motor assemblies provided in the robot in accordance with a preferred embodiment of the present invention.
Figure 3:
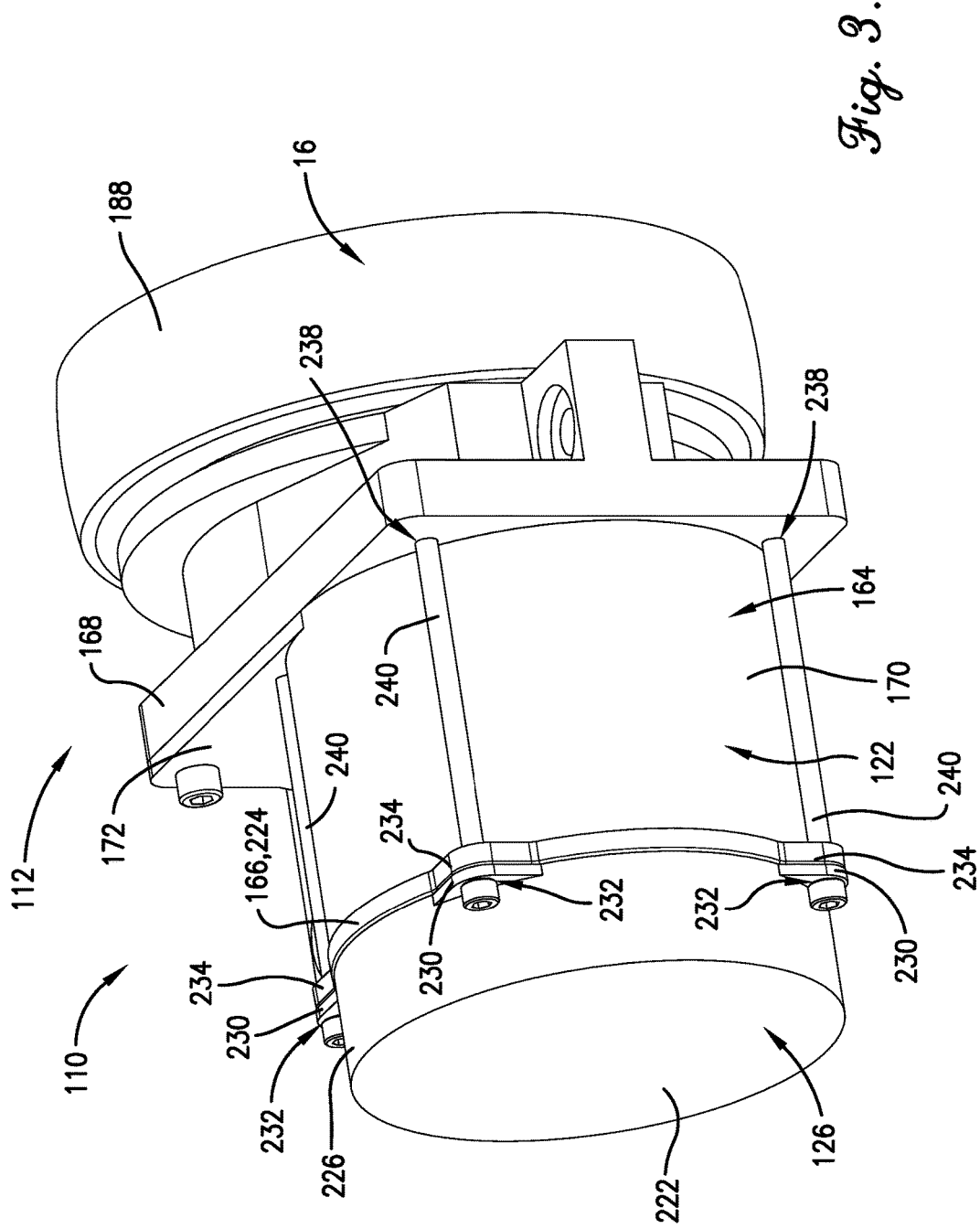
FIG. 3 is a perspective view of one of the locomotion motor assemblies and wheels of FIG. 2.
Figure 4:
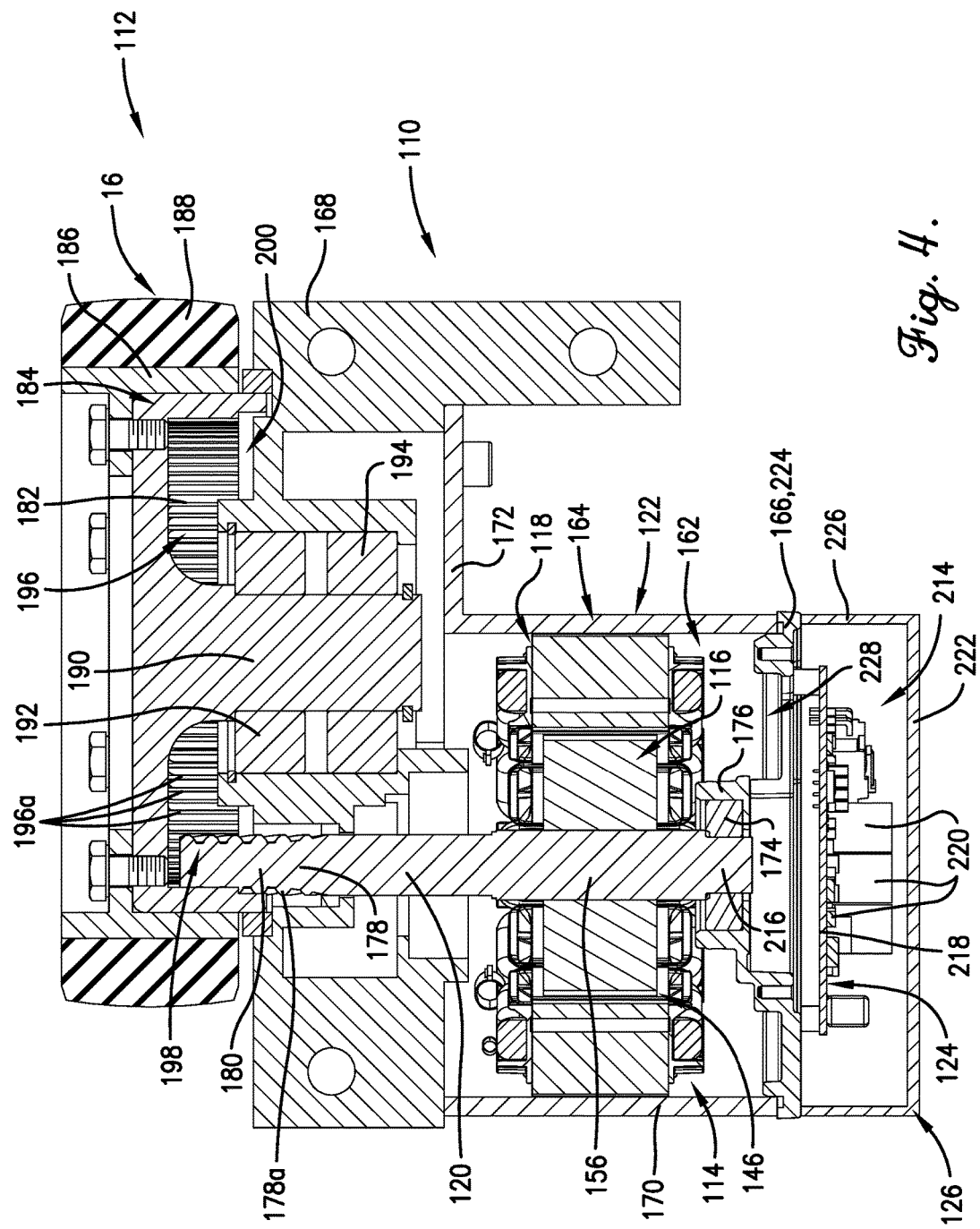
FIG. 4 is a cross-sectional view of the locomotion motor assembly and wheel of FIG. 3.
Figure 4A:
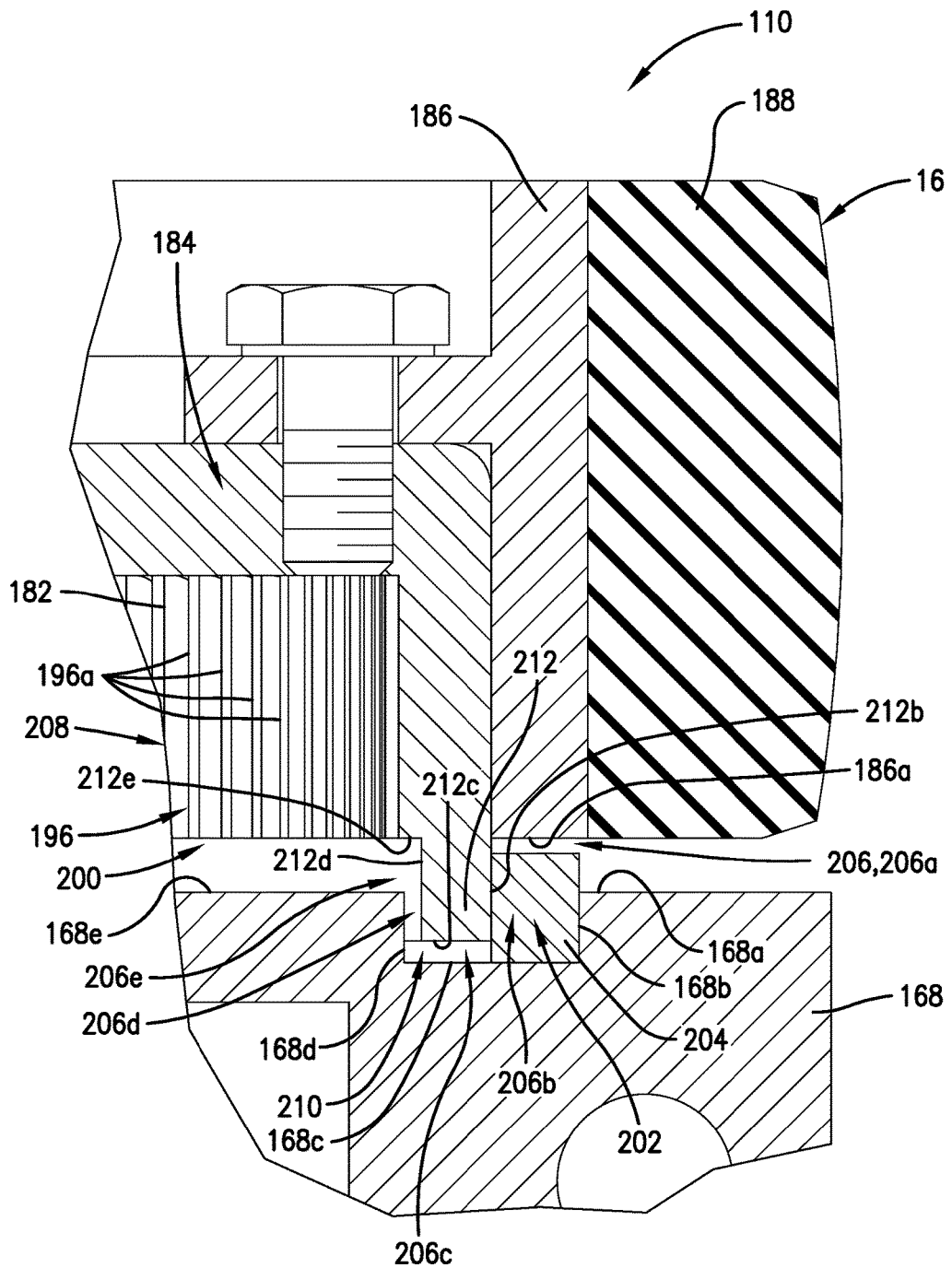
Figure 5:
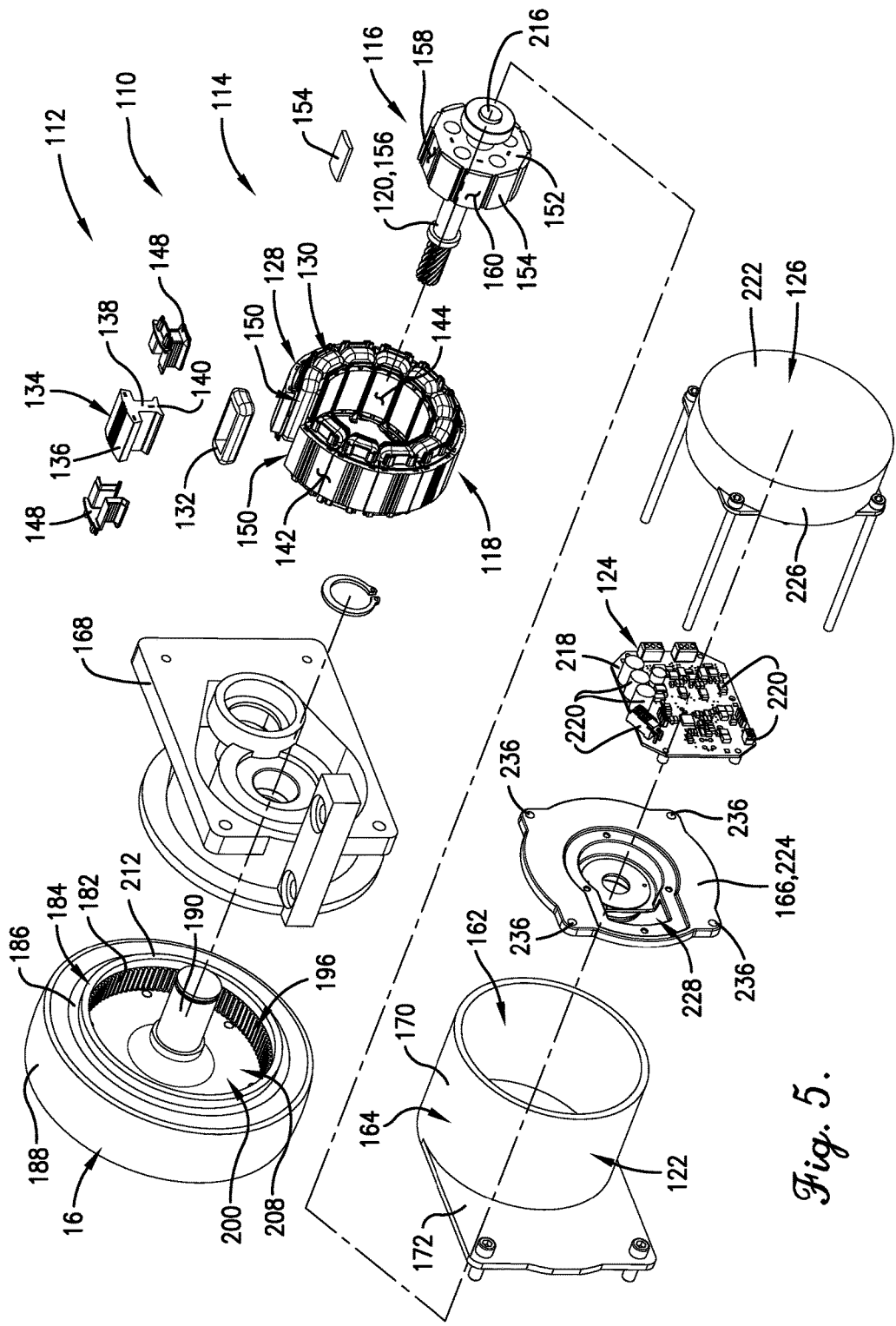
Figure 6:
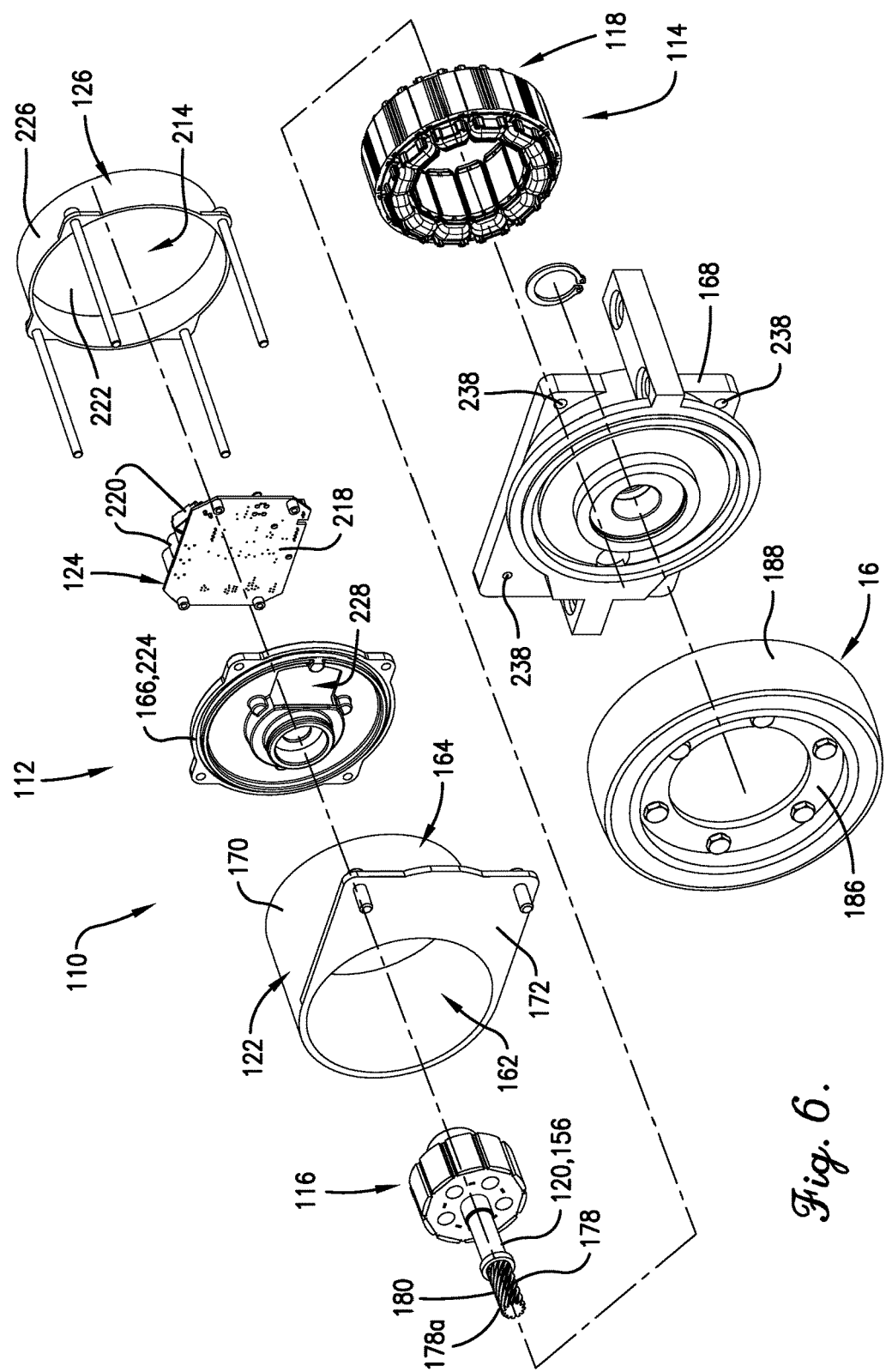
Figure 7:
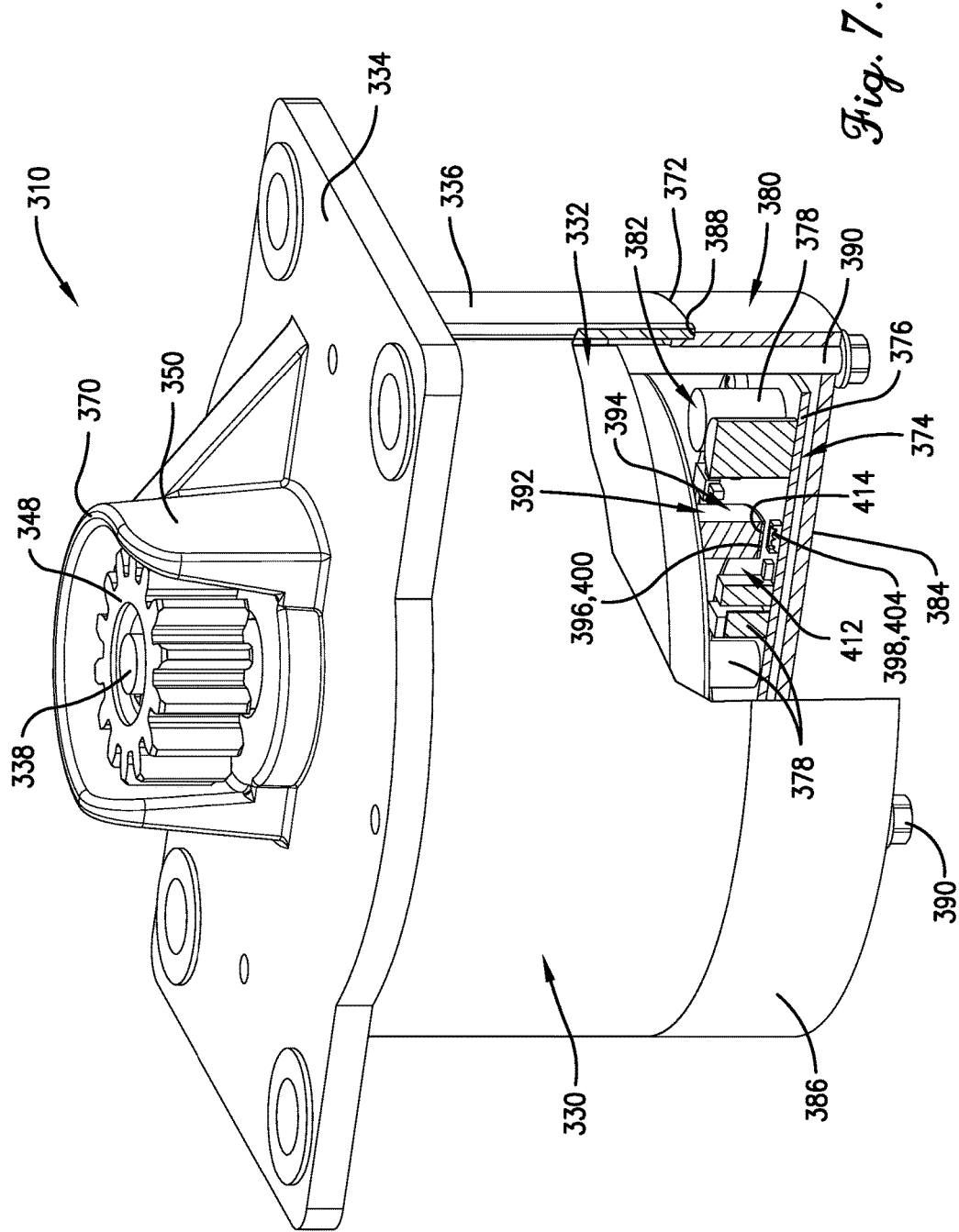
Figure 8:
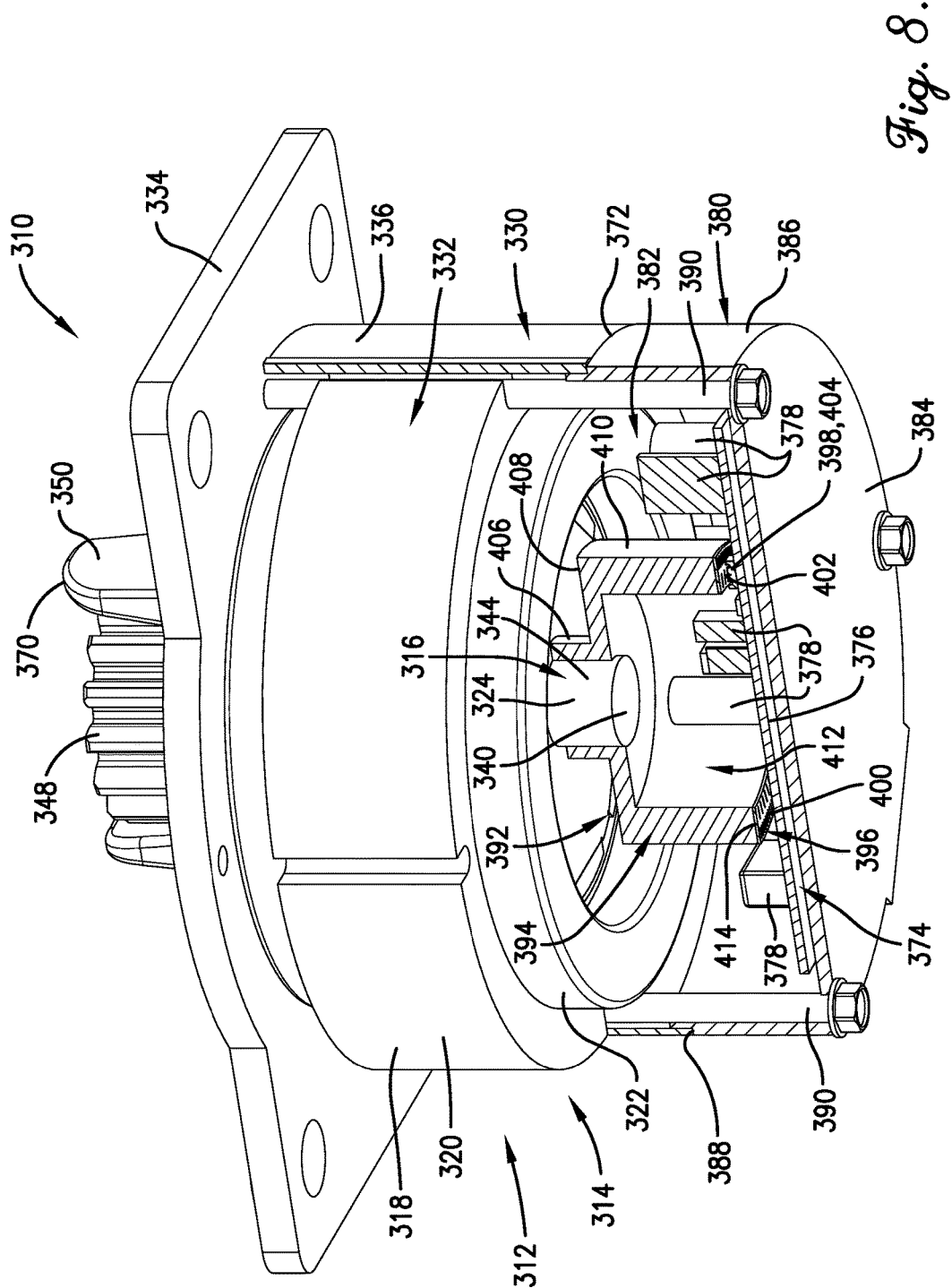
Figure 9:
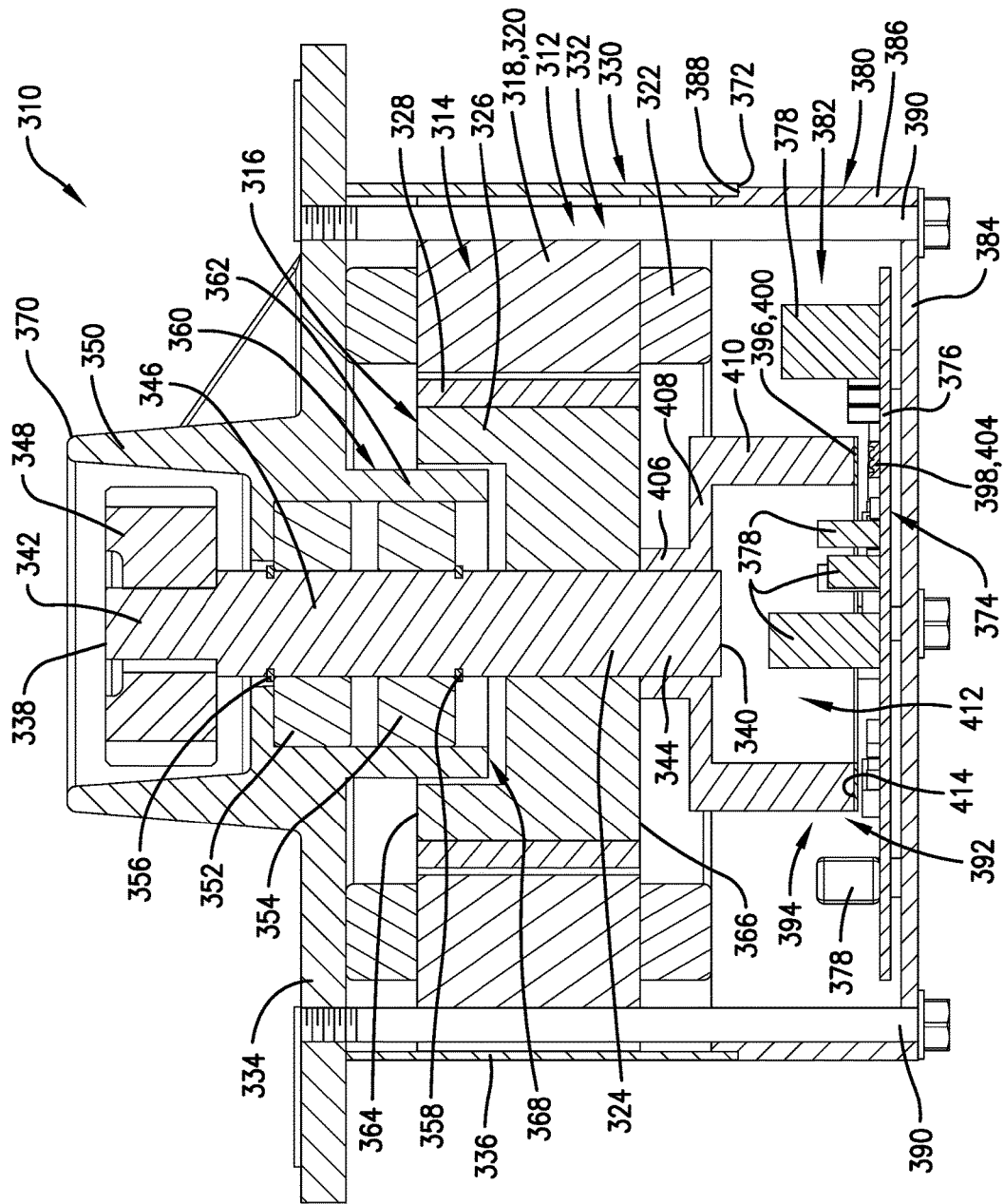
Figure 10:
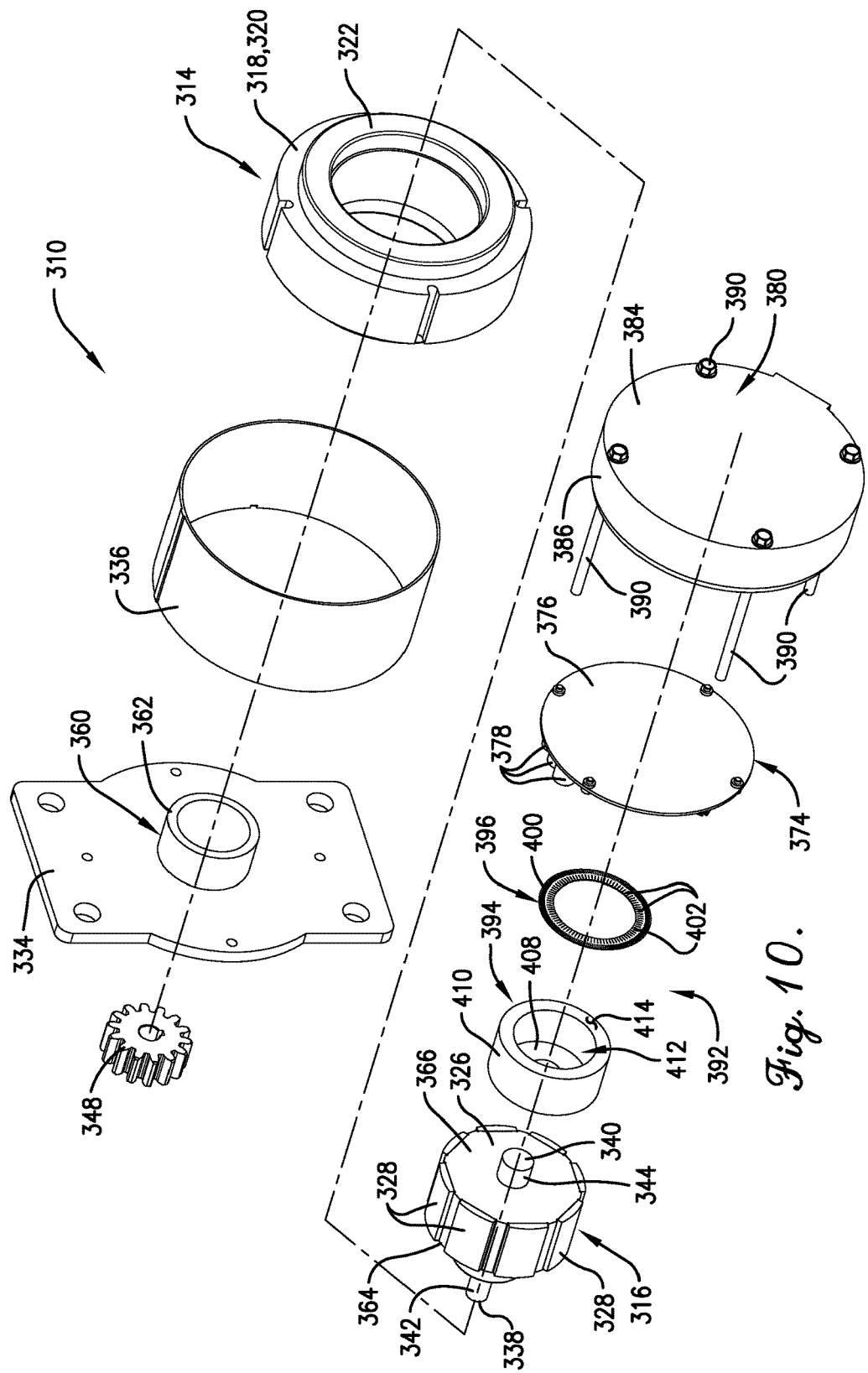
Figure 11:
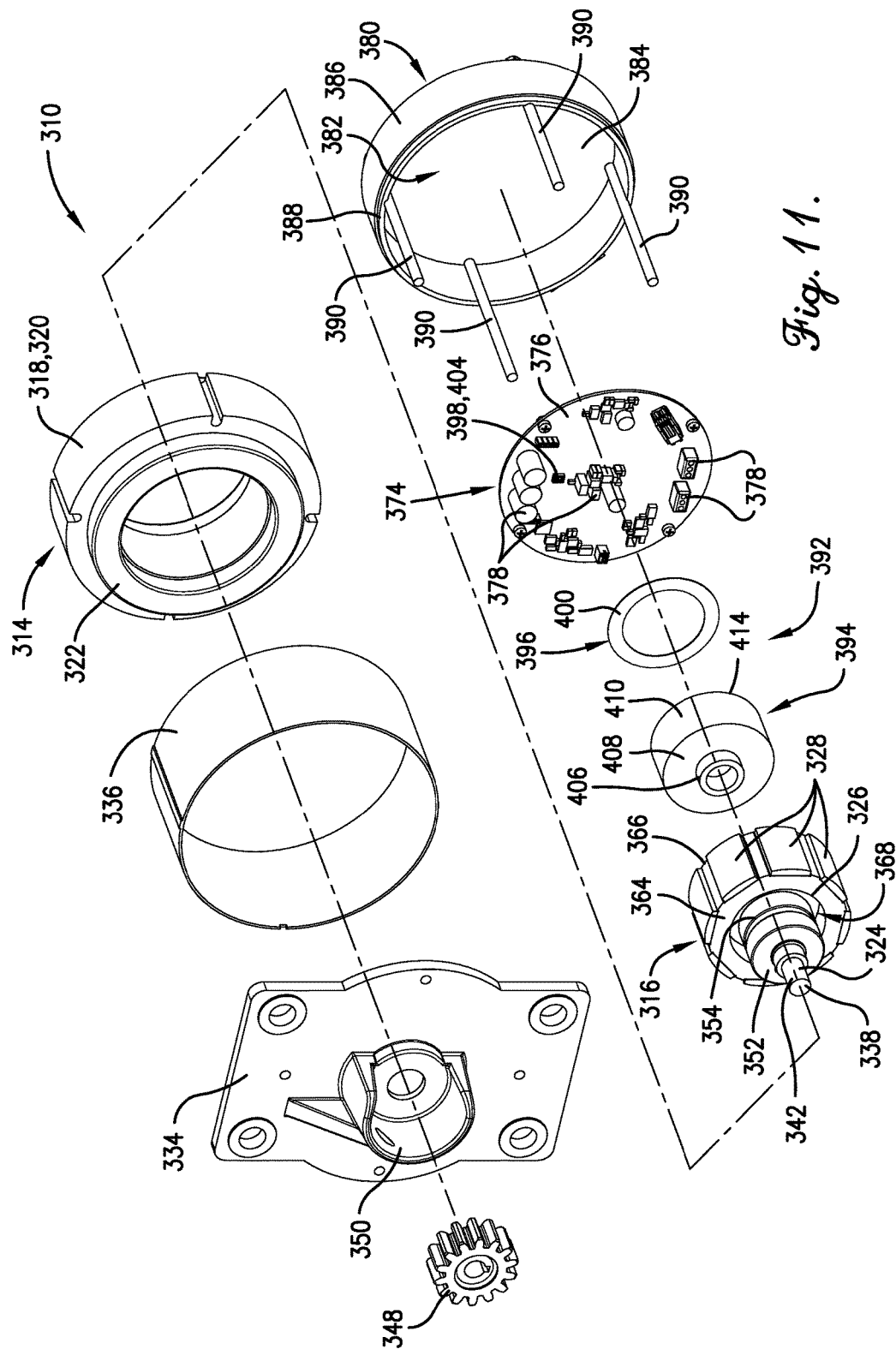
Figure 12:
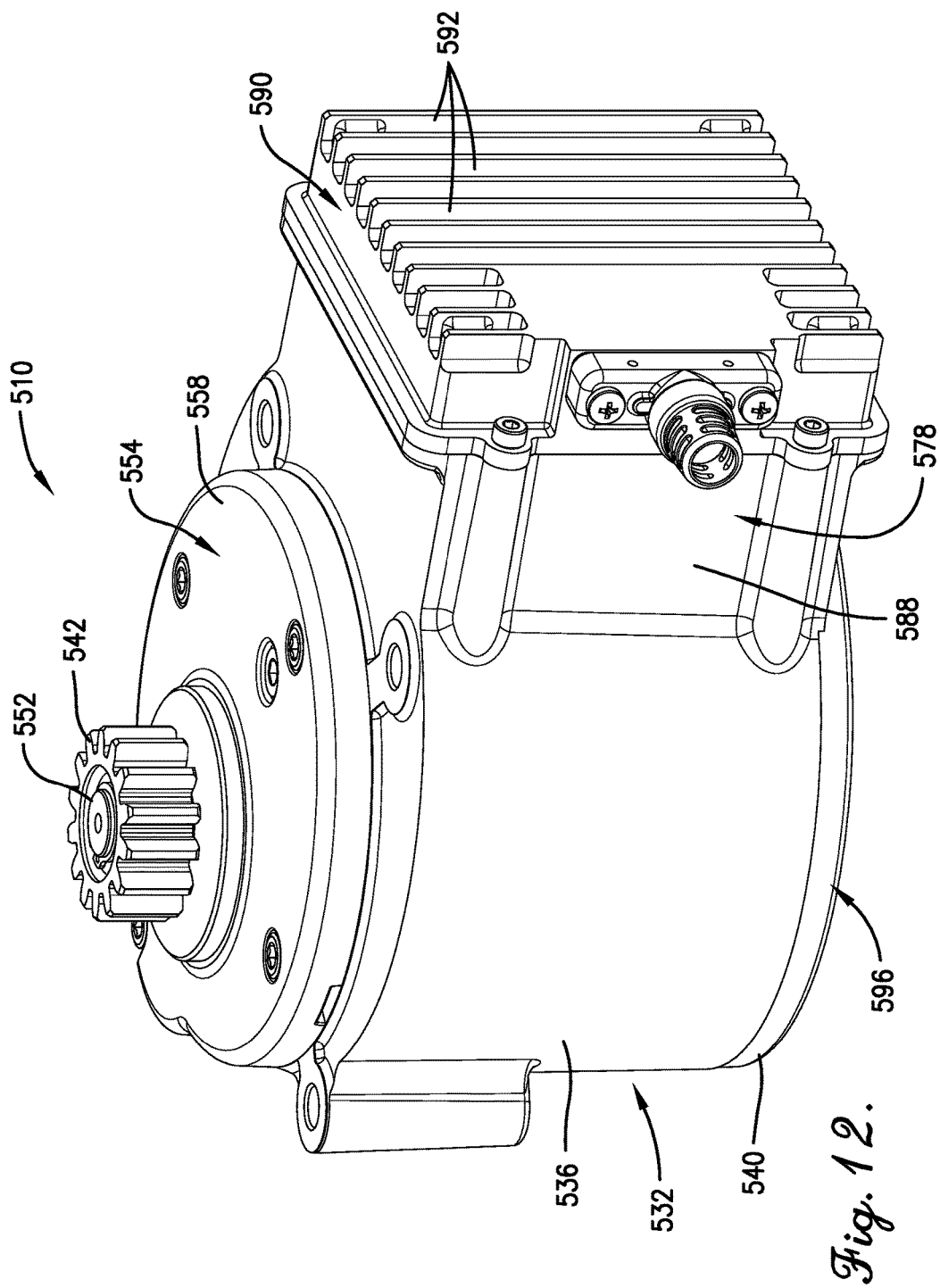
Figure 13:
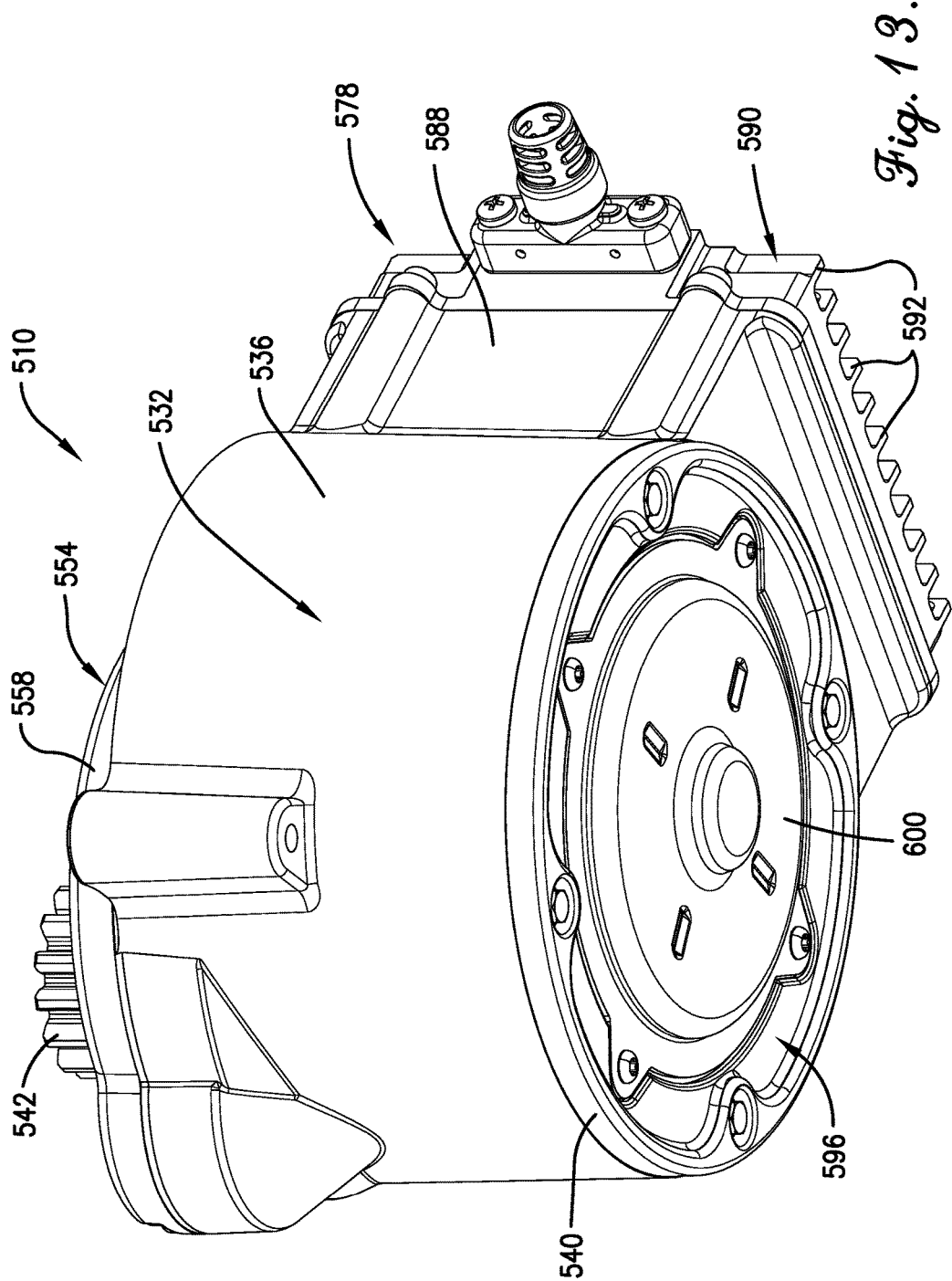
Figure 14:
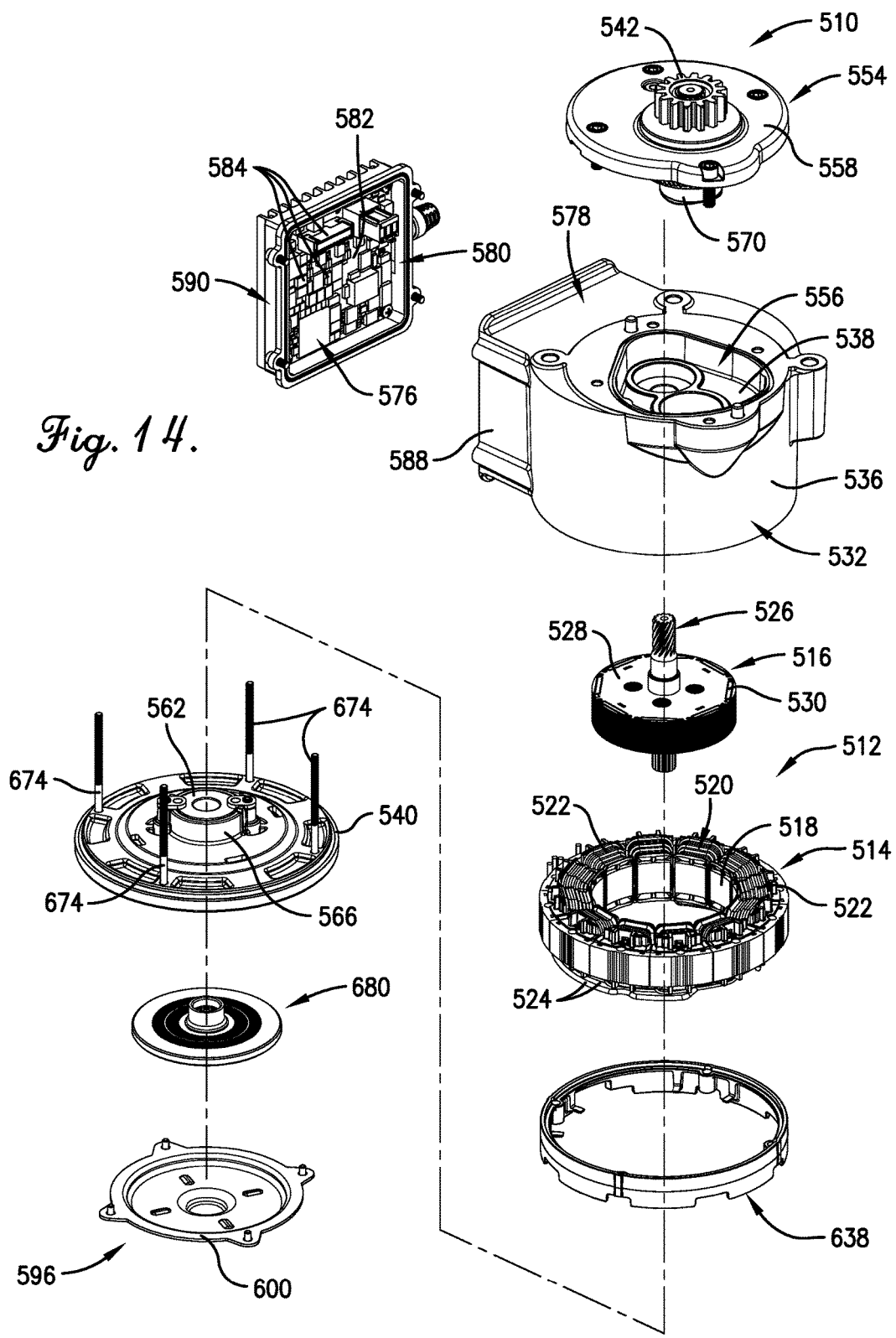
Figure 15:
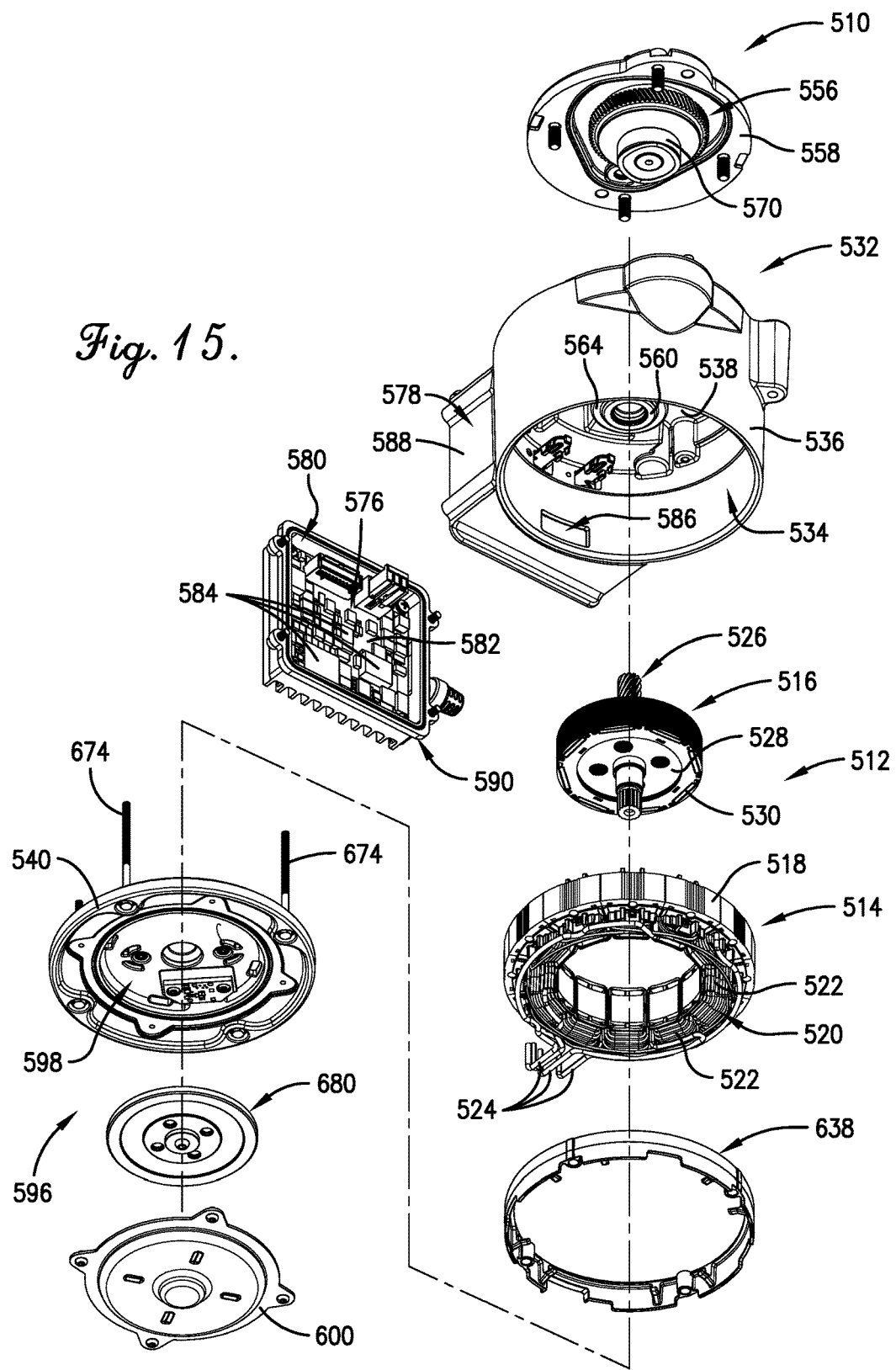
Figure 16:
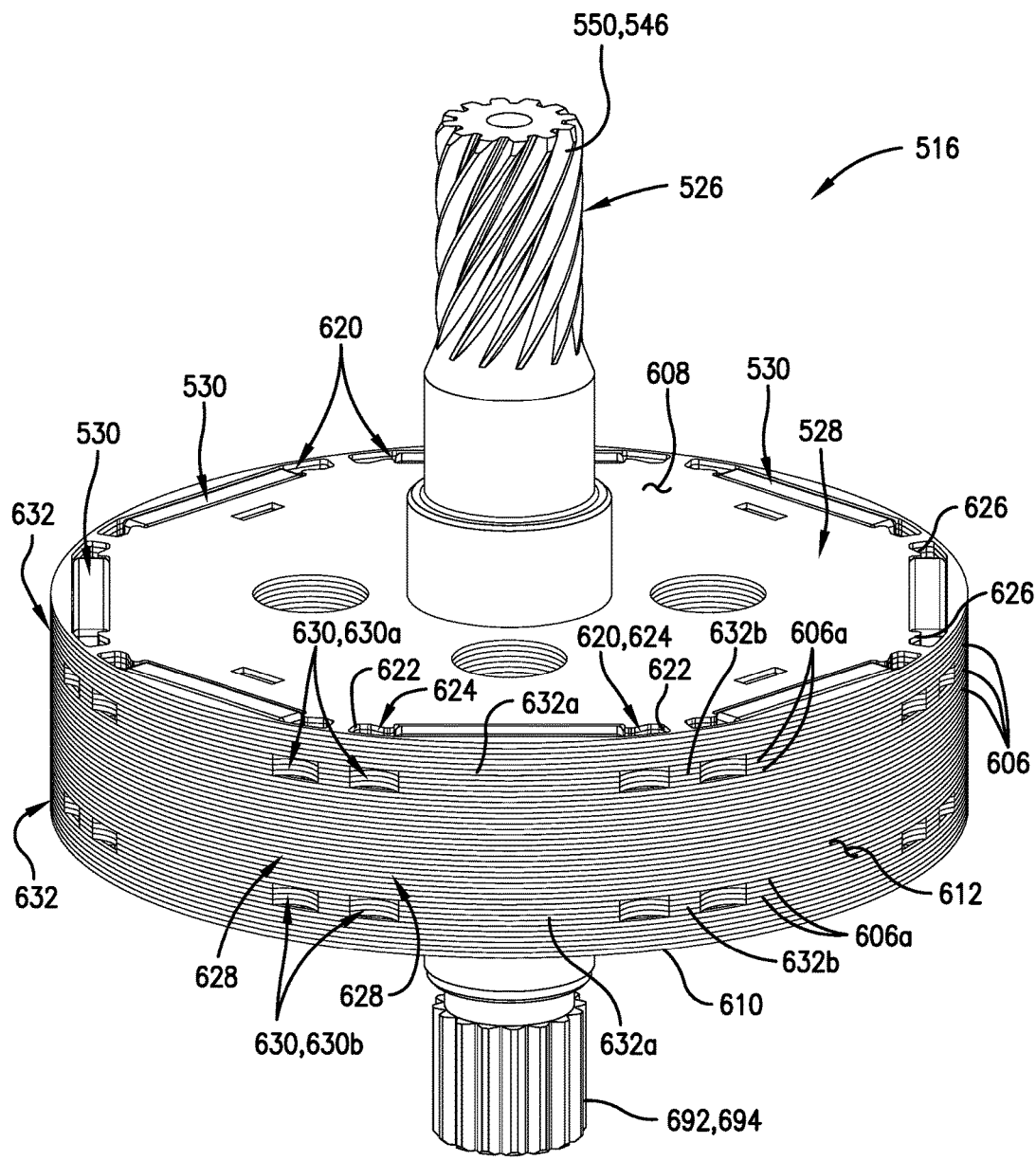
Figure 17:
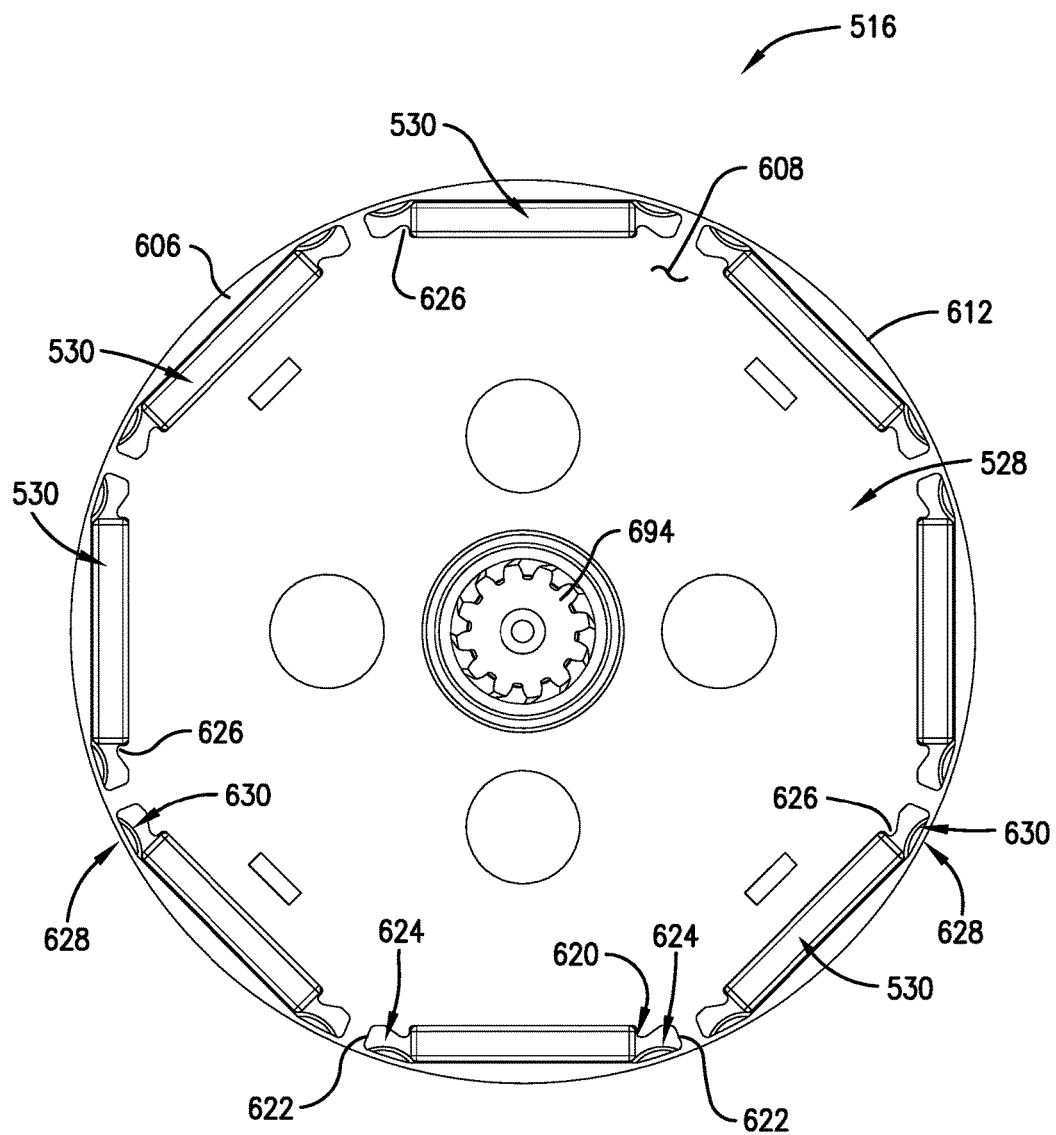
Figure 17B:
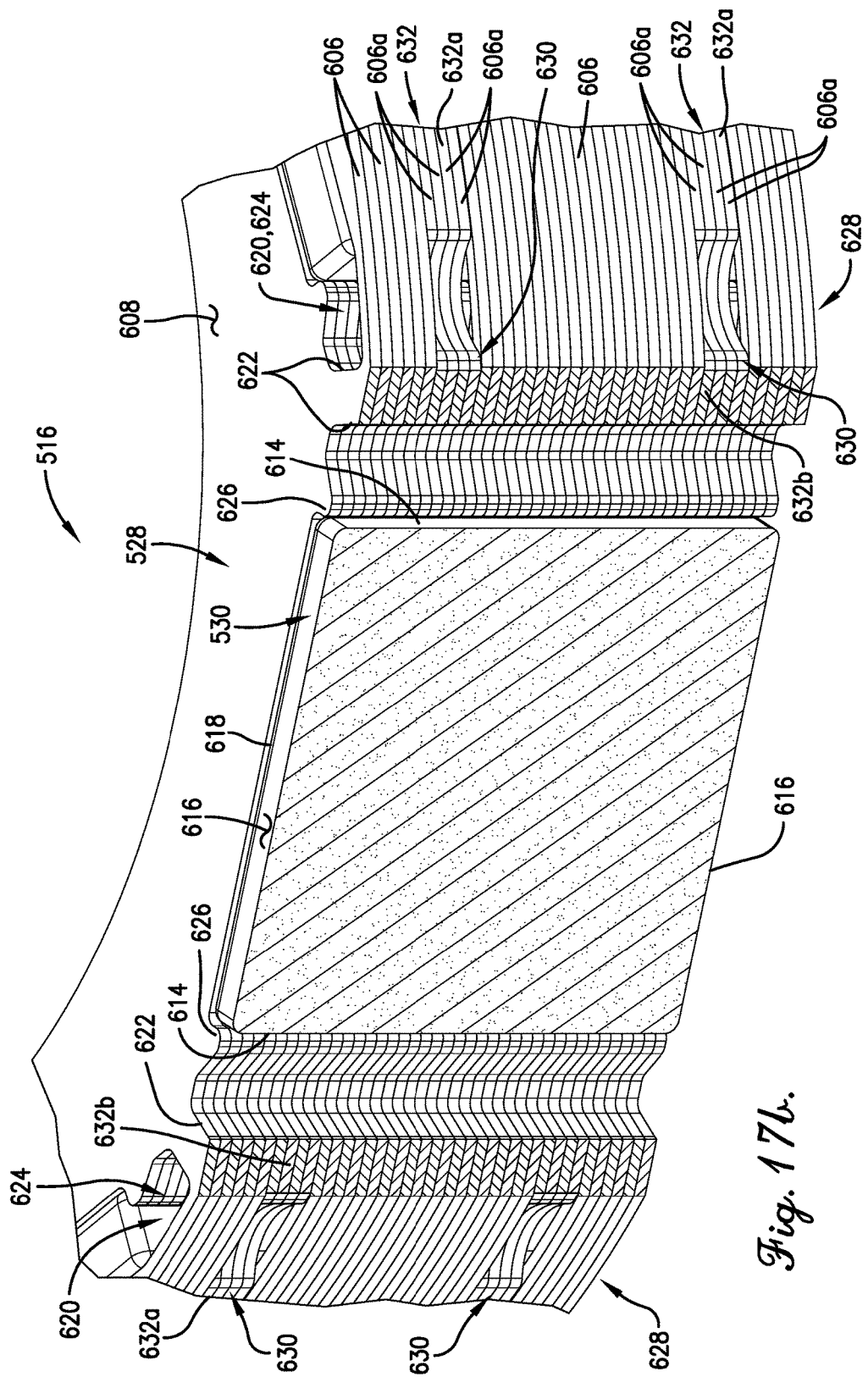
Figure 17C:
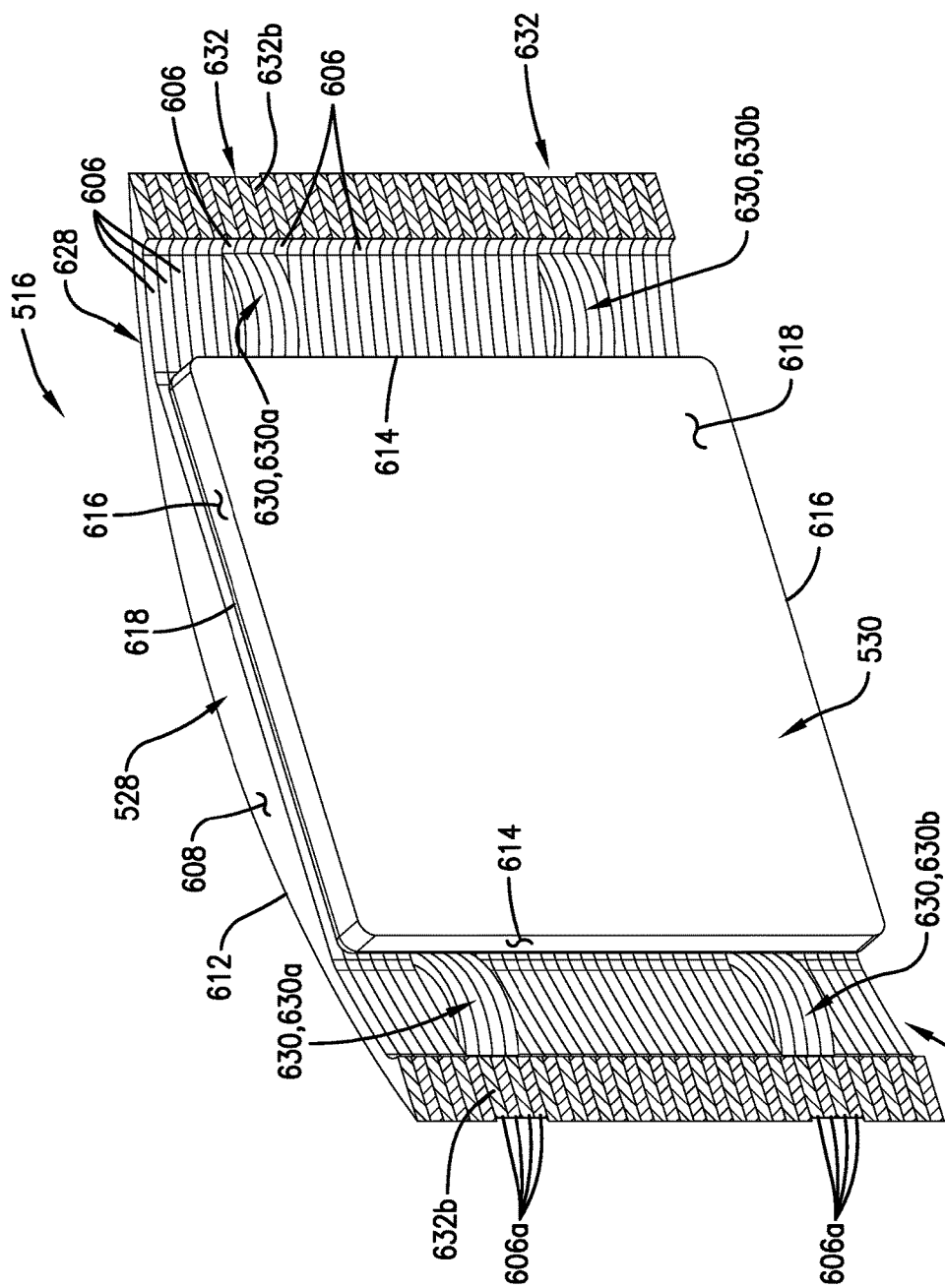
Figure 18:
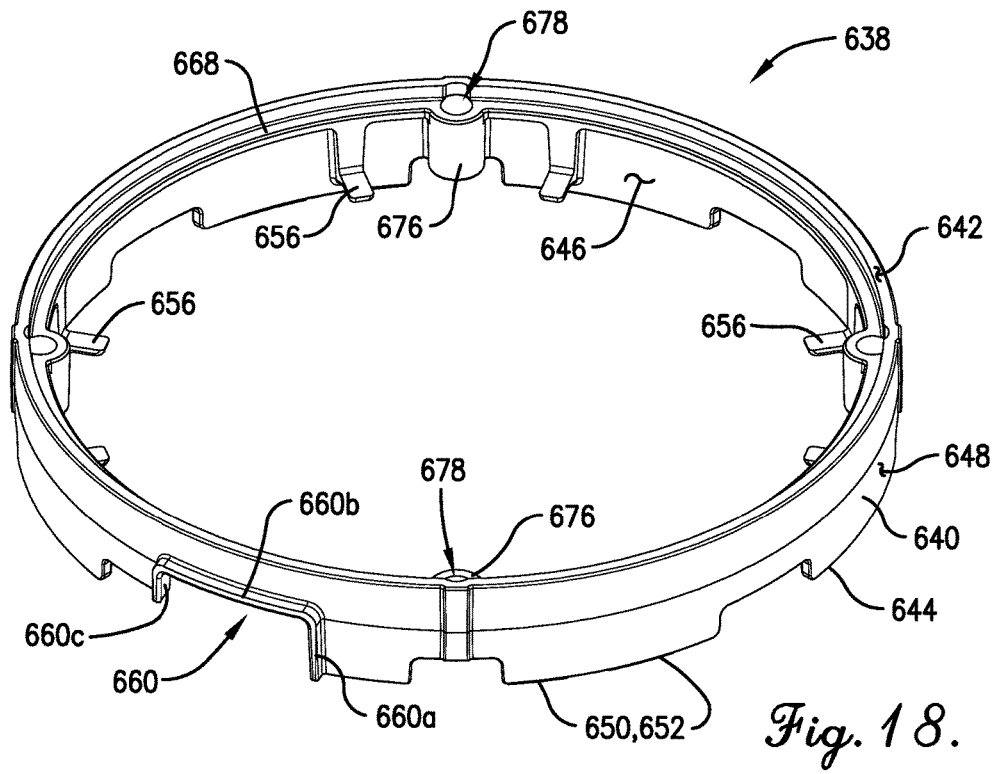
Figure 19:
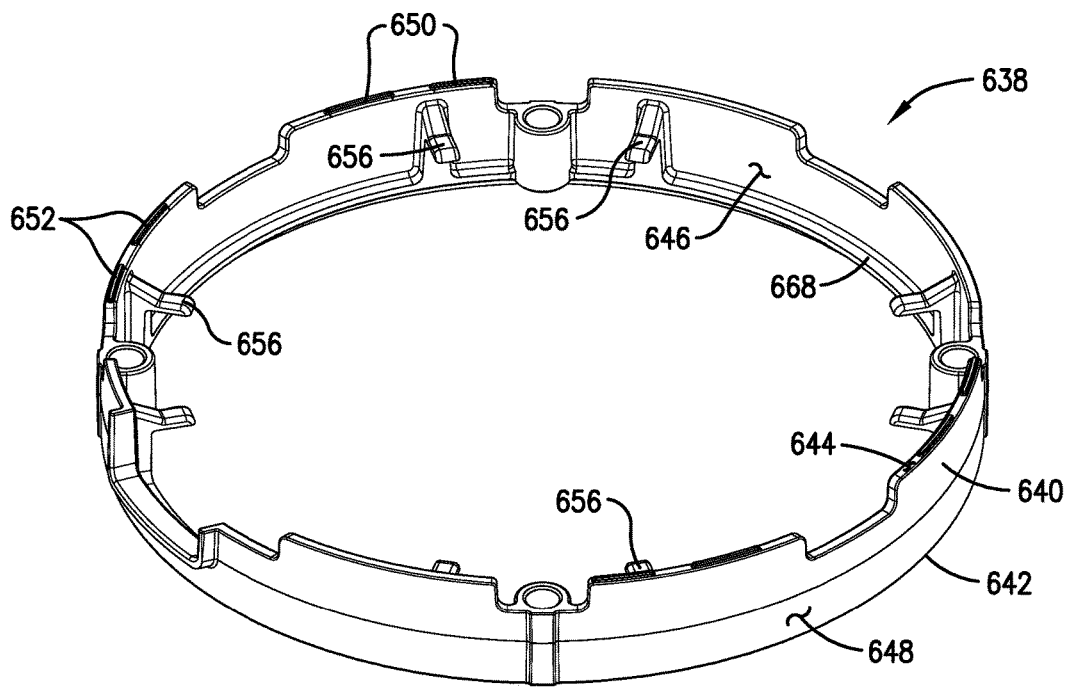
Figure 20:
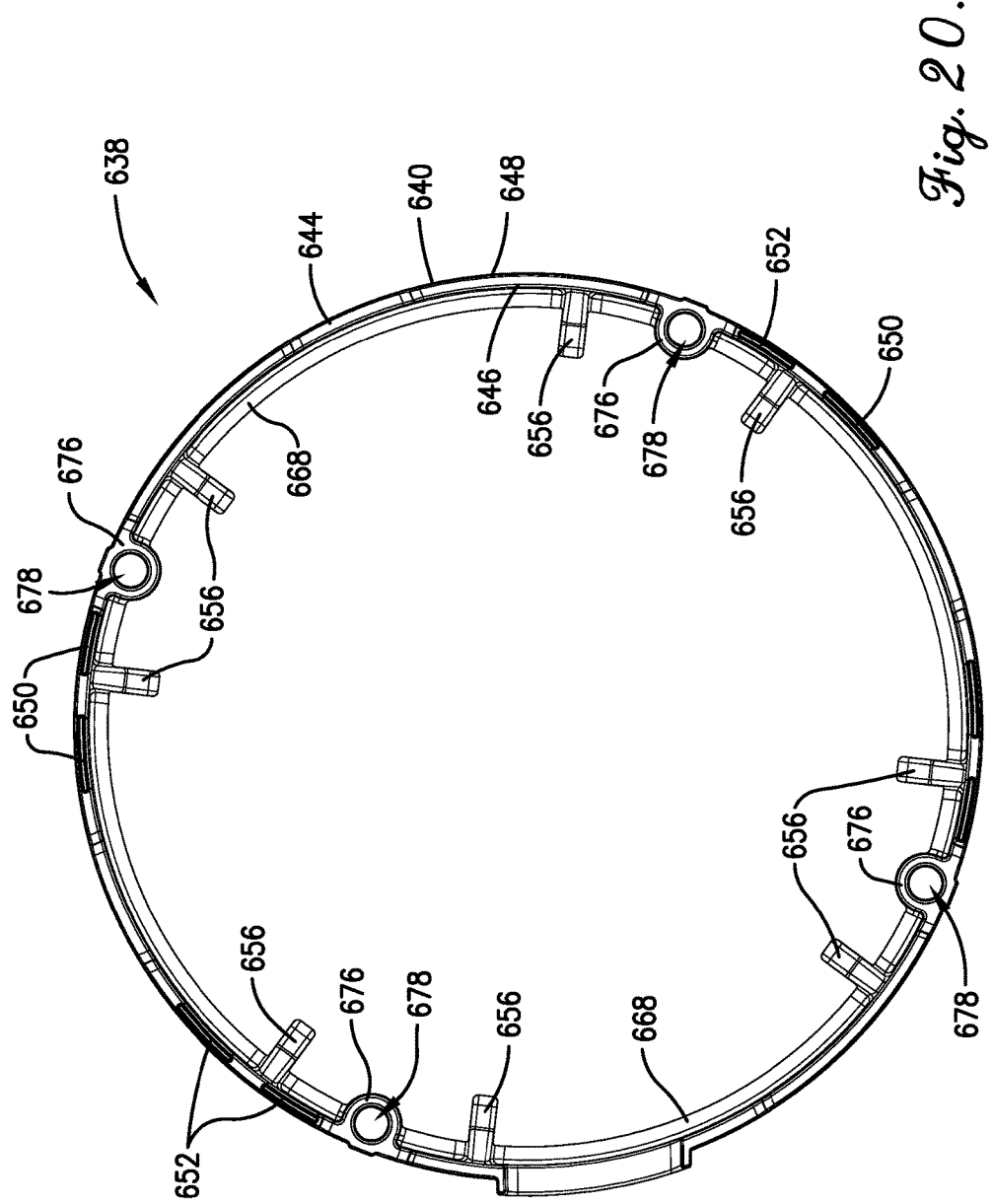
Figure 21:
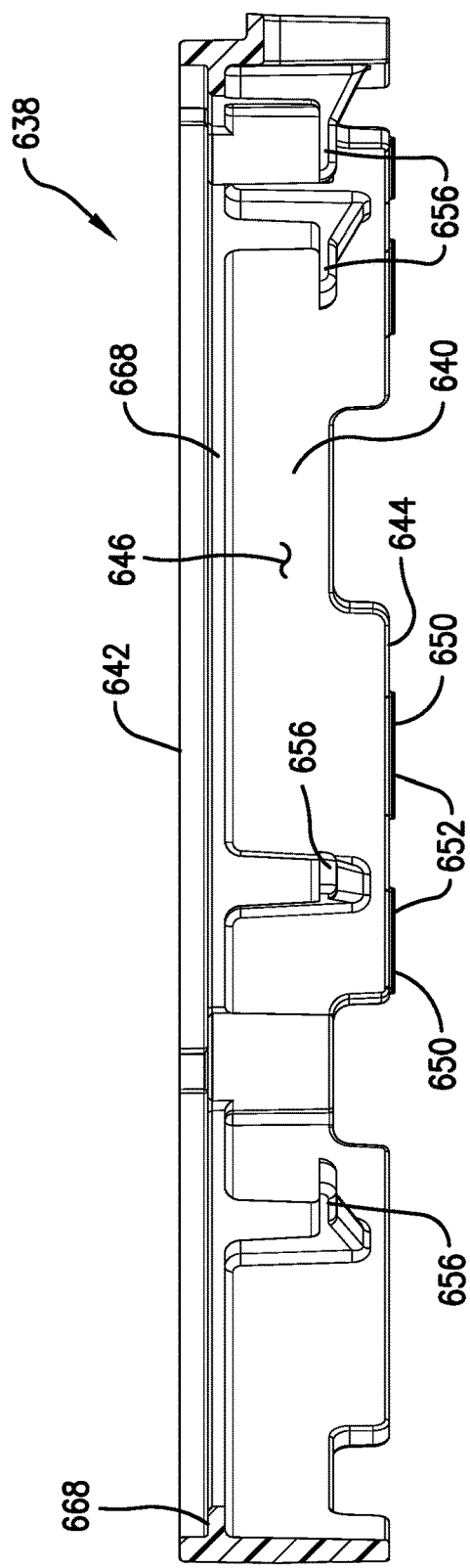
Figure 22:
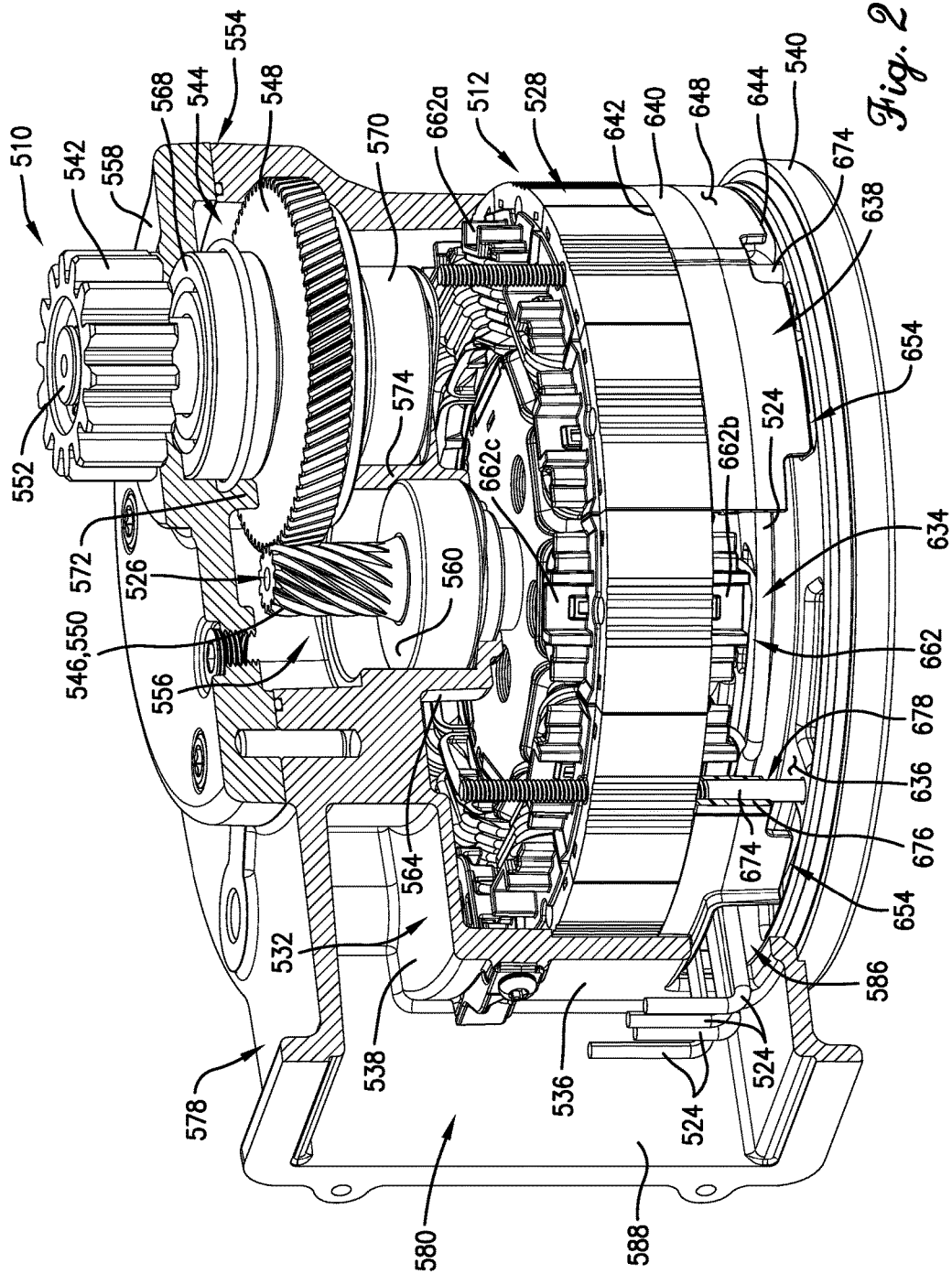
Figure 23:
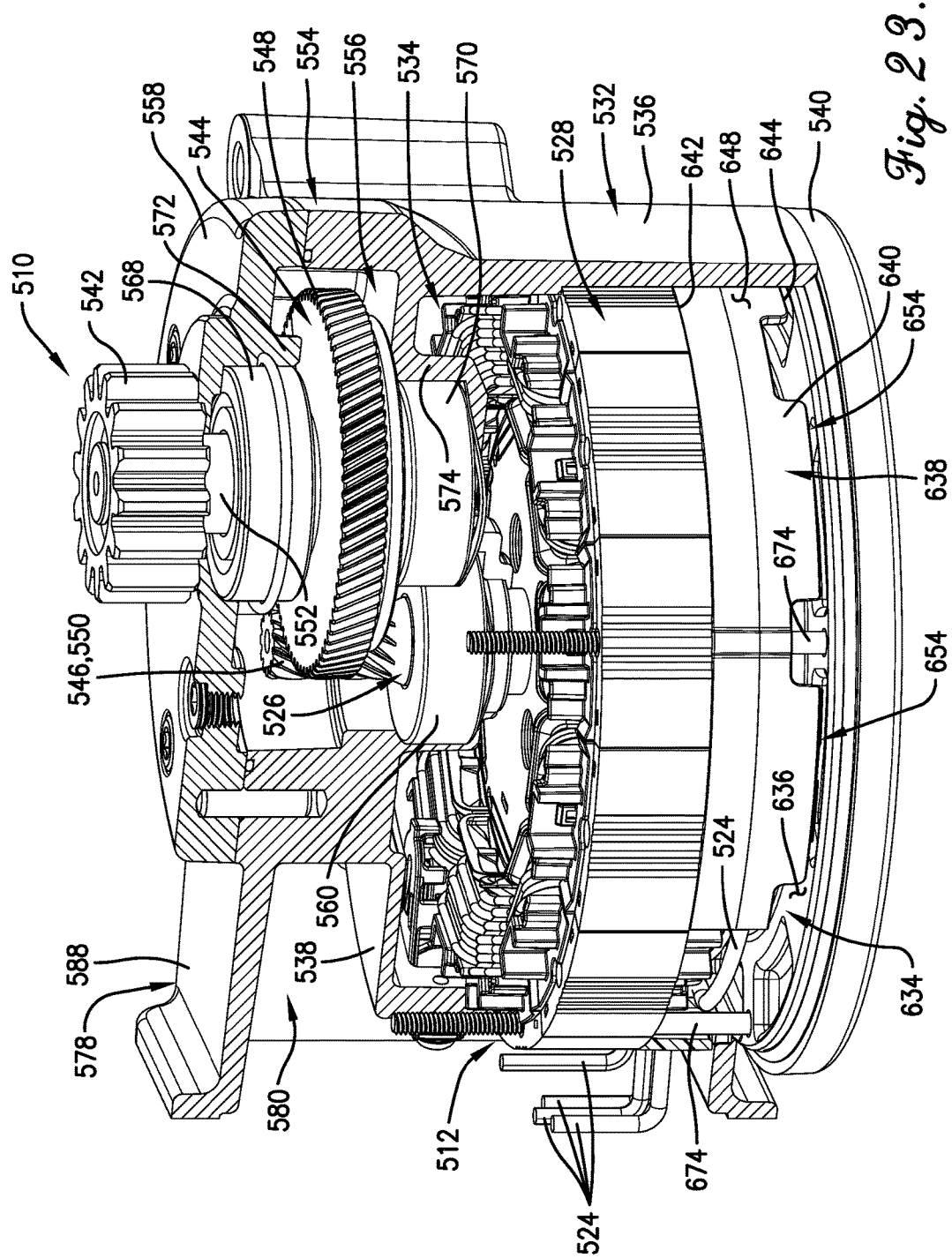
Figure 24:
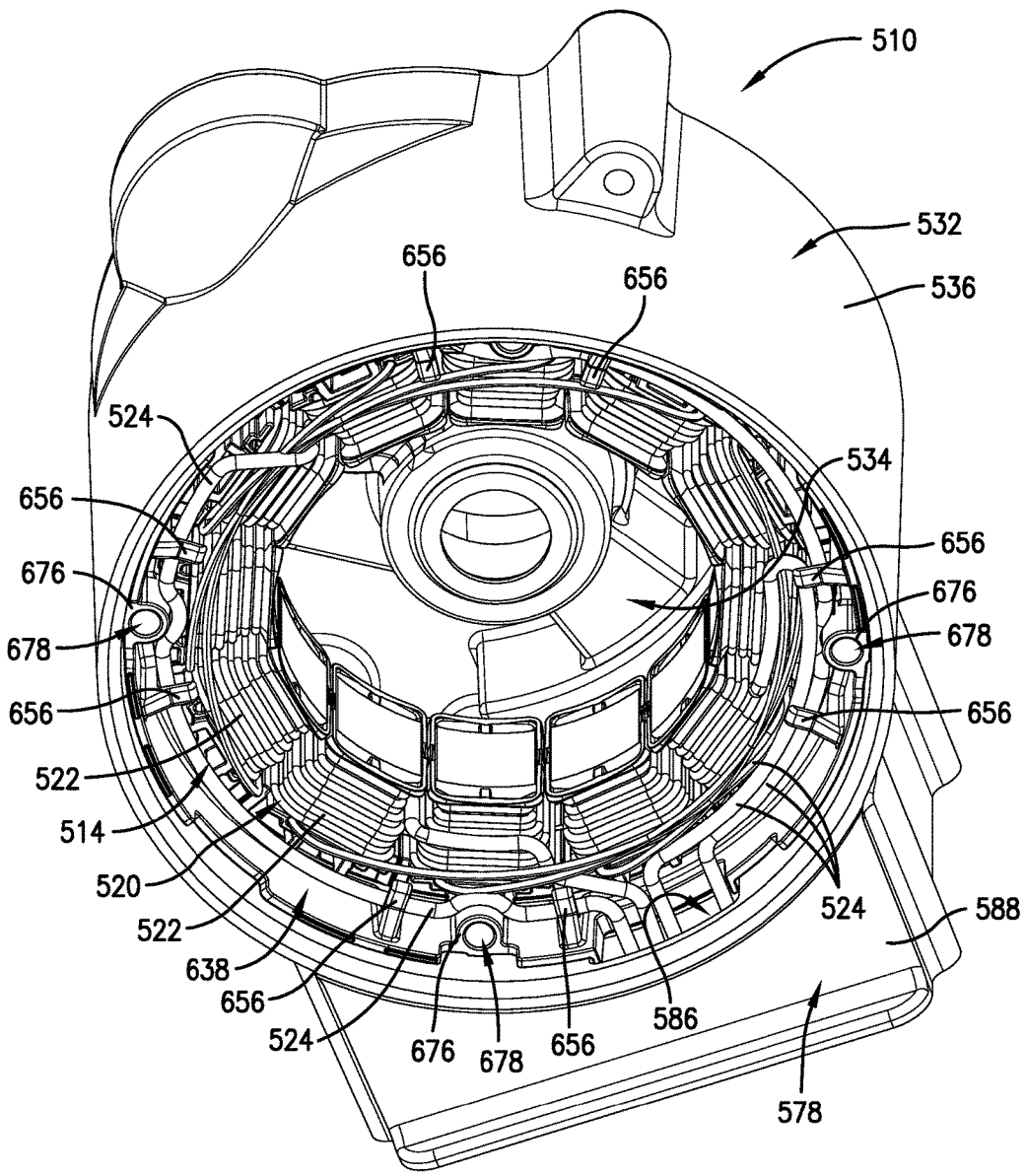
Figure 25A:
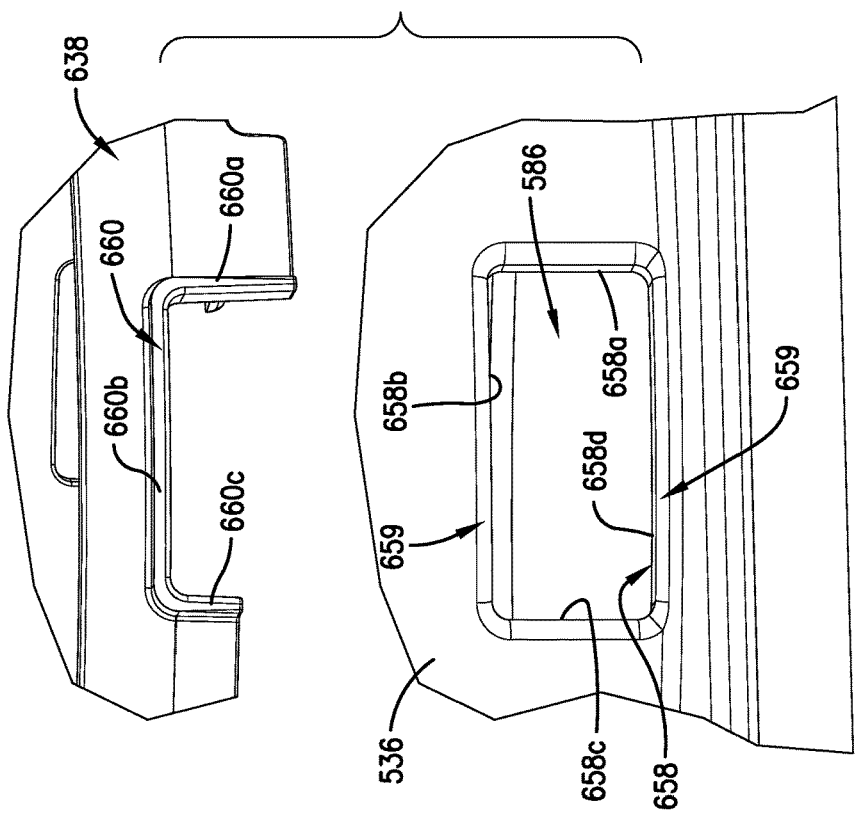
Figure 25:
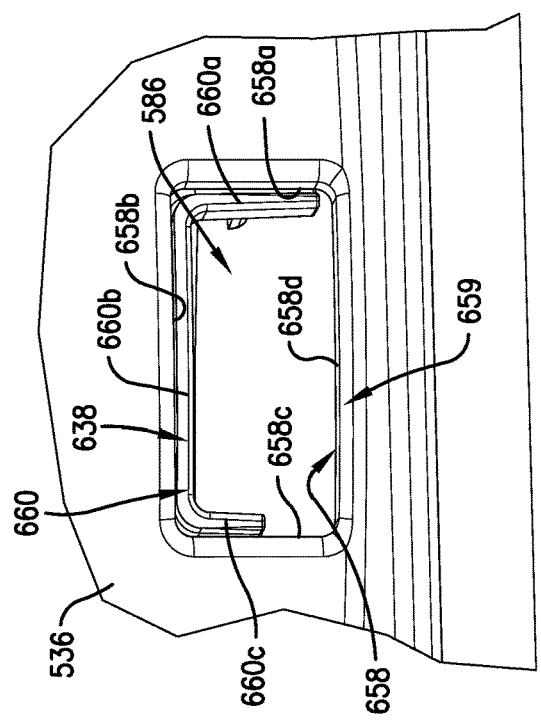
Figure 28:
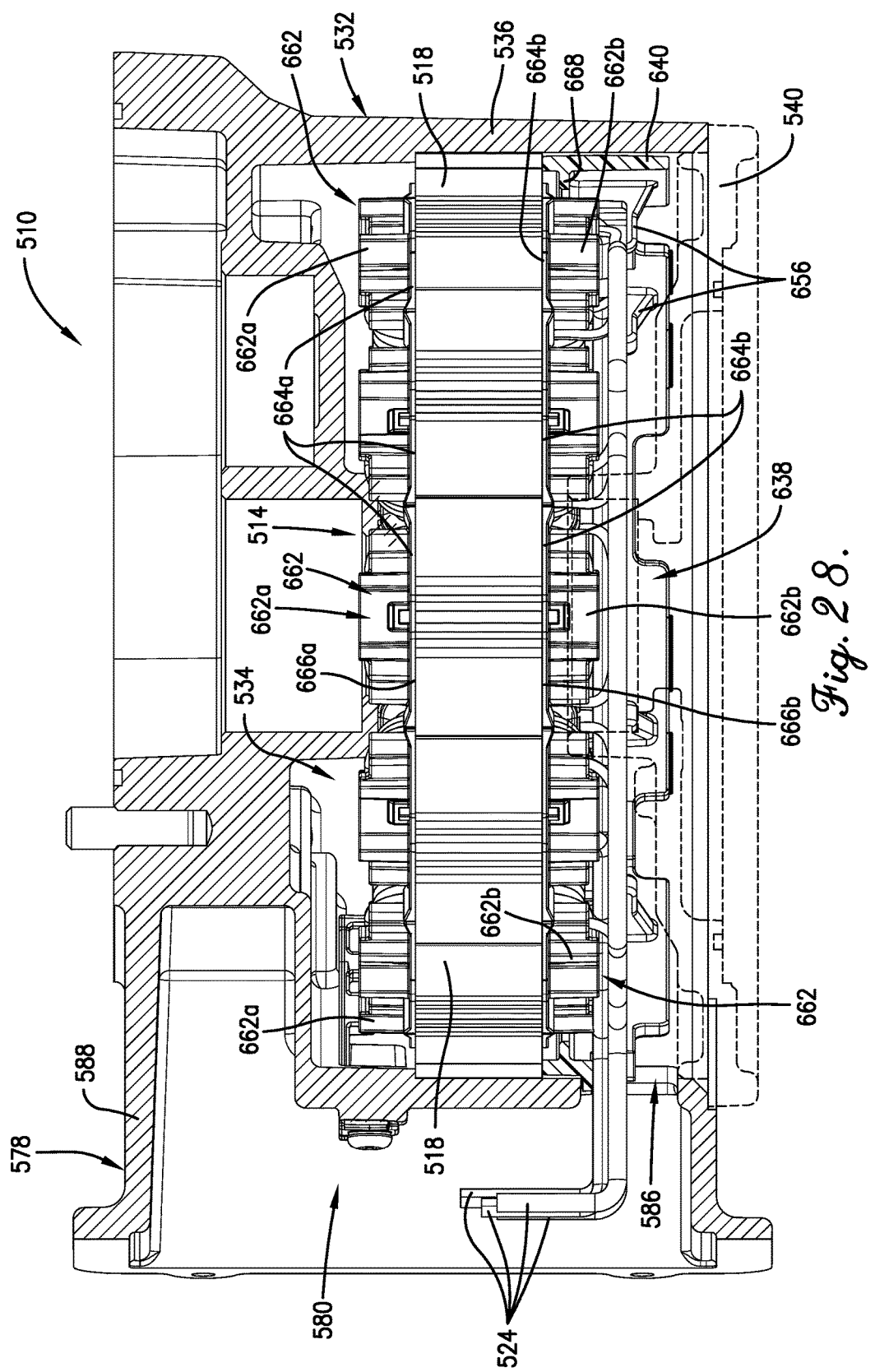
Figure 29:
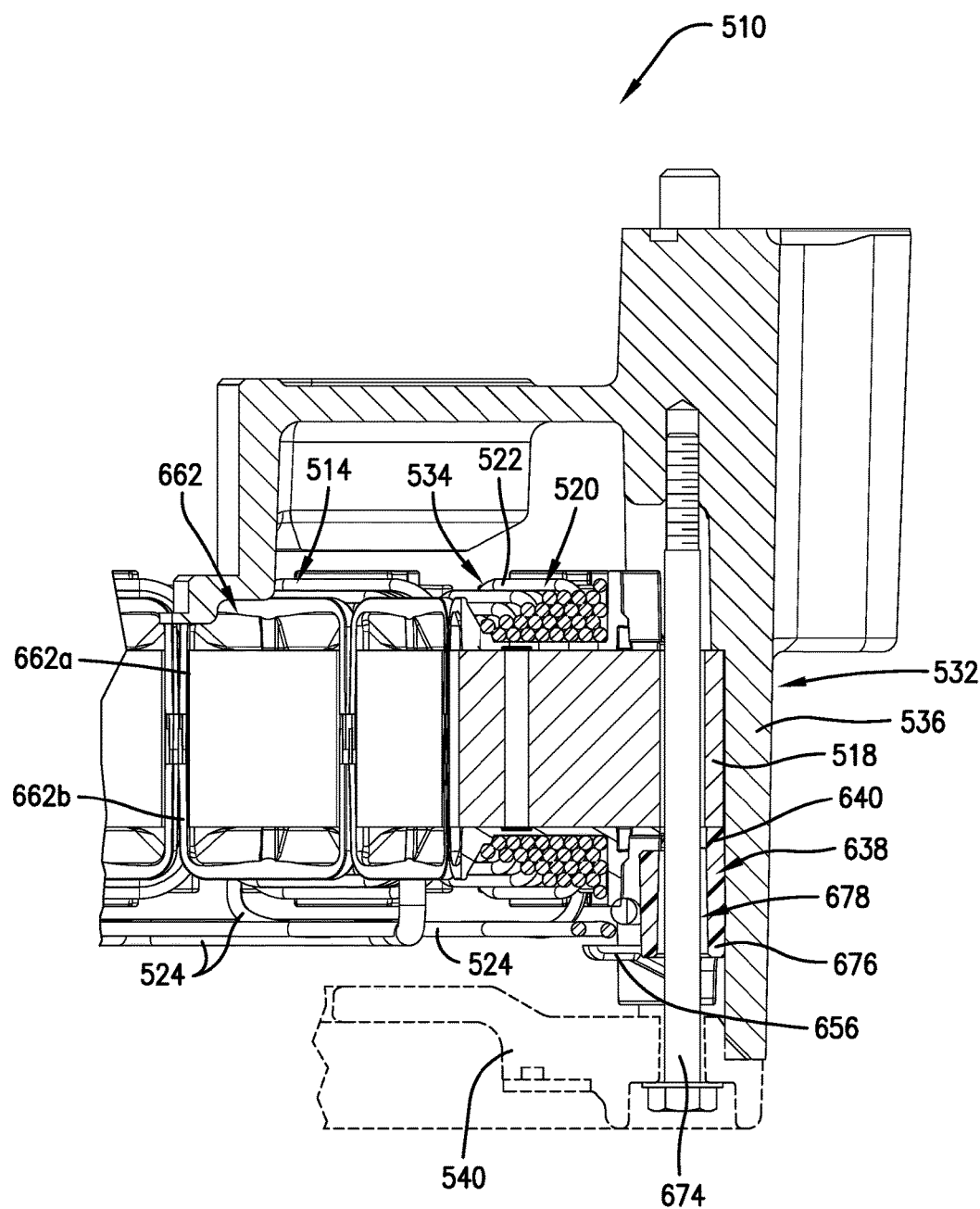
Figure 30:
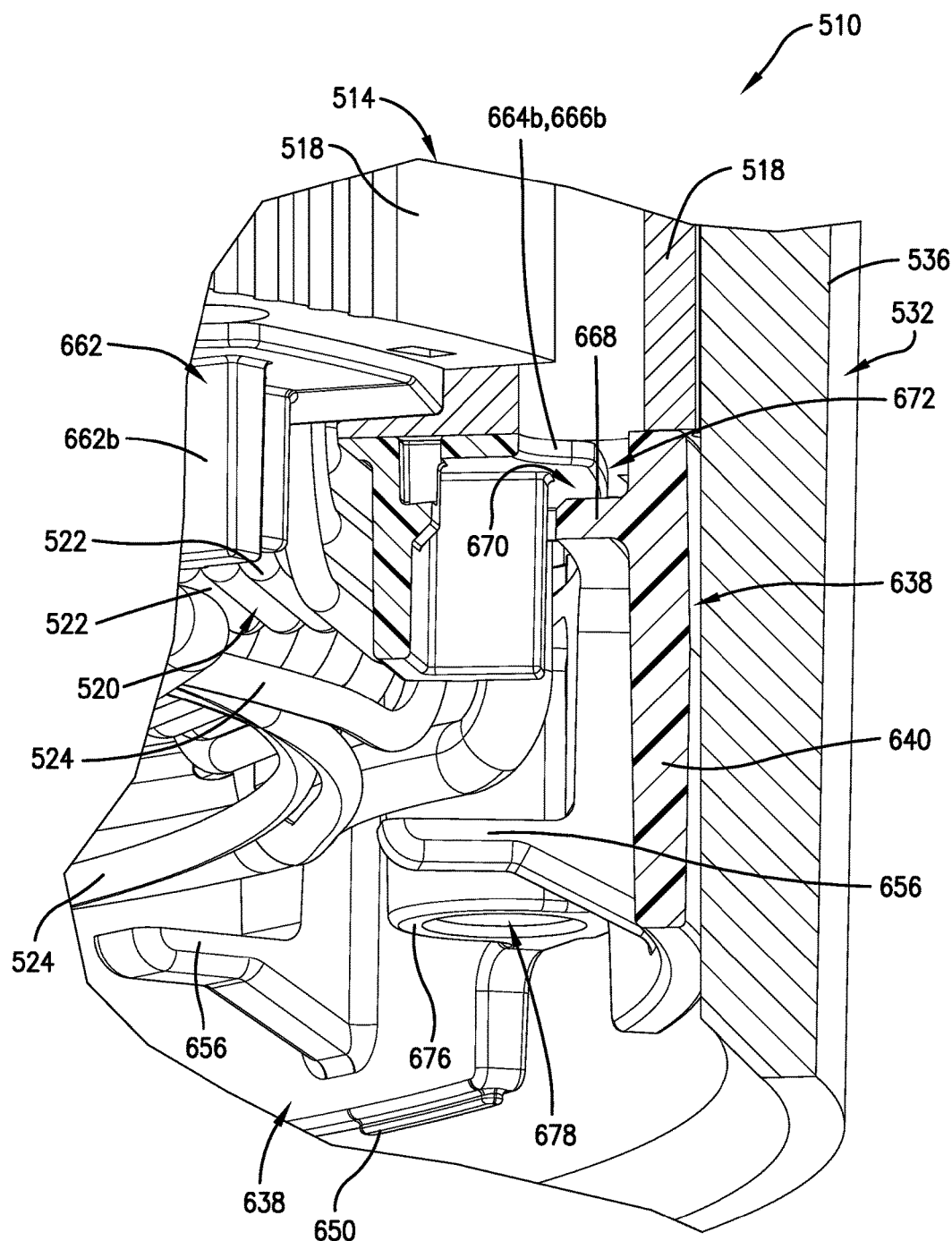
Figure 31:
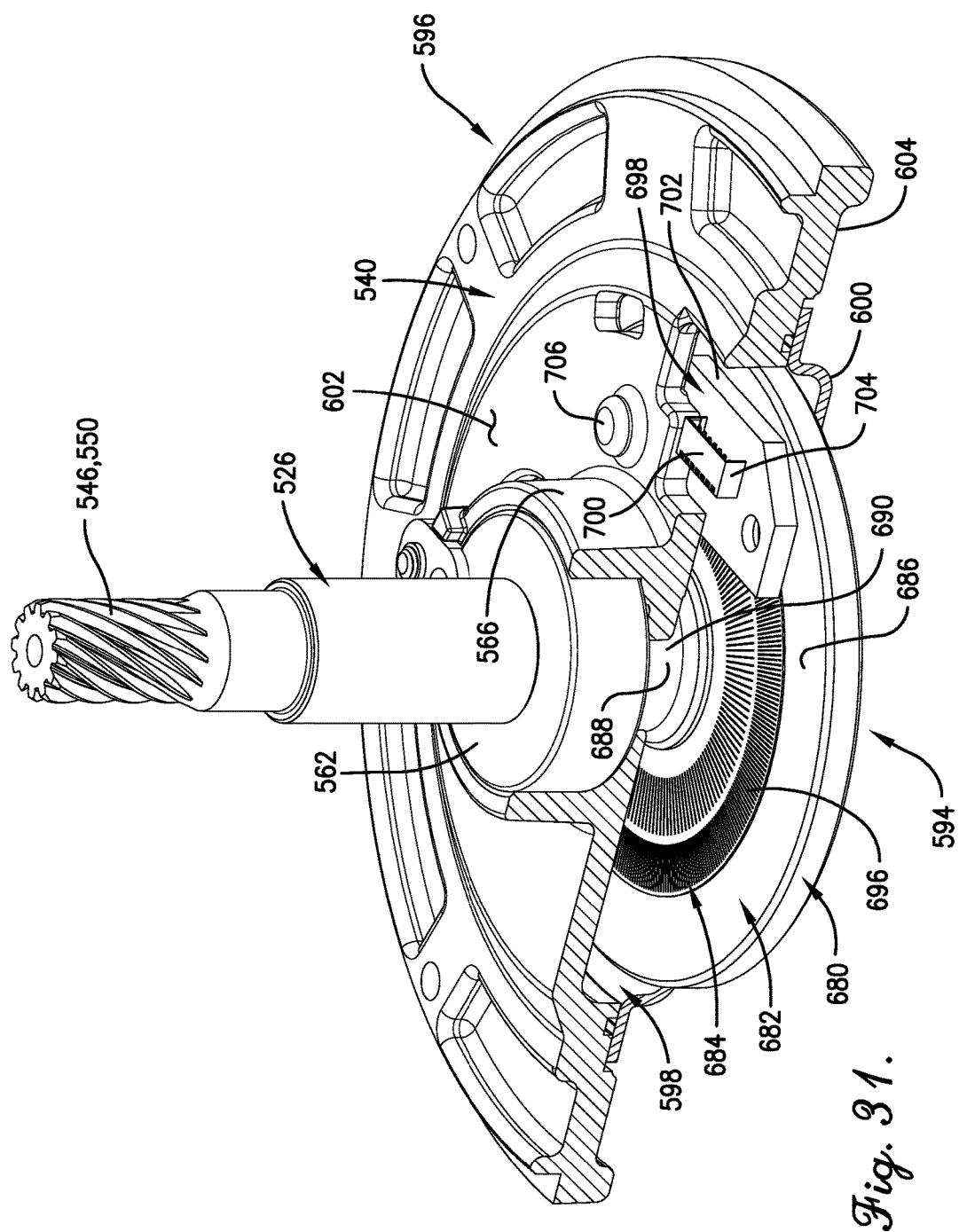
Figure 32:
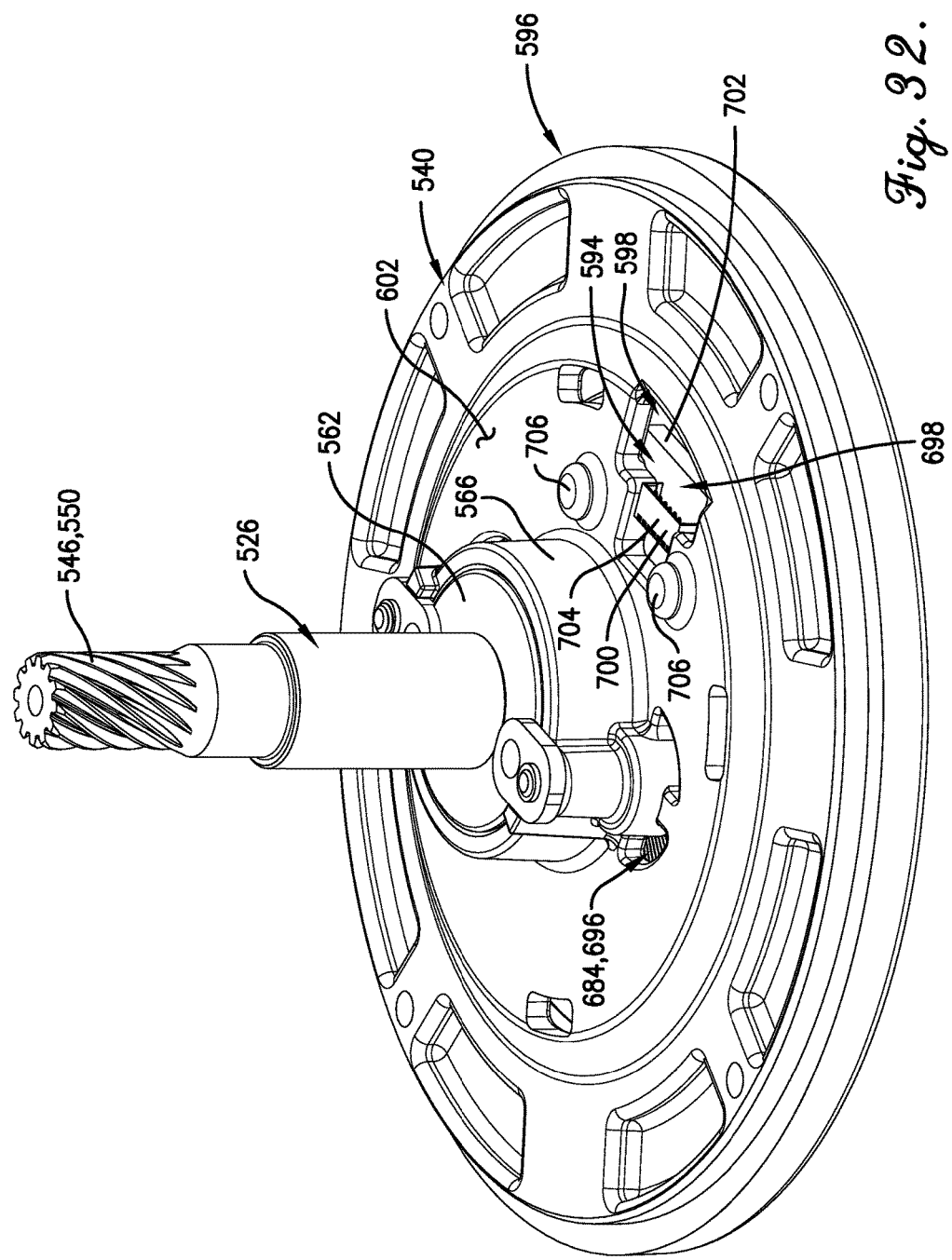
Figure 33:
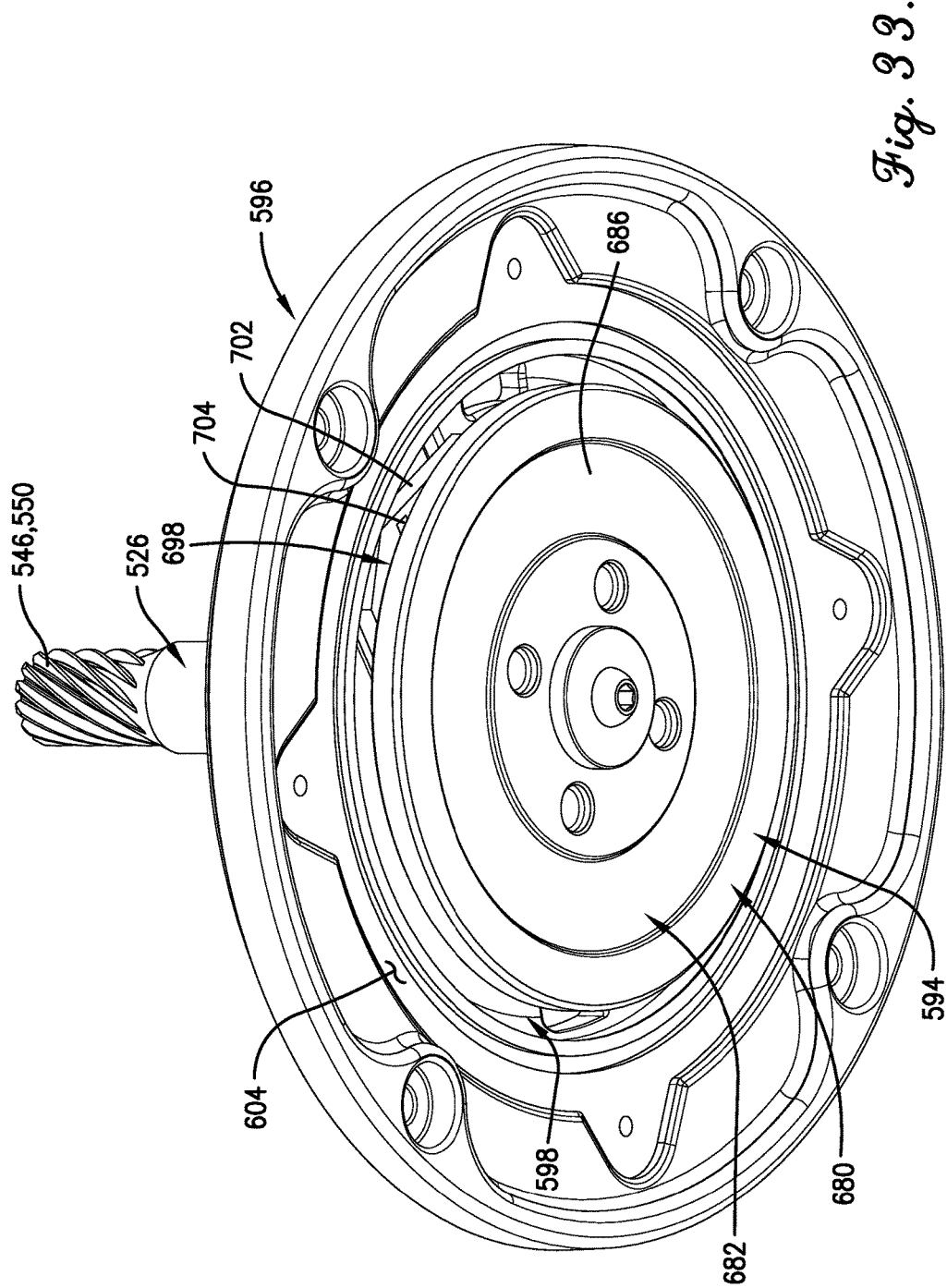
Figure 34:
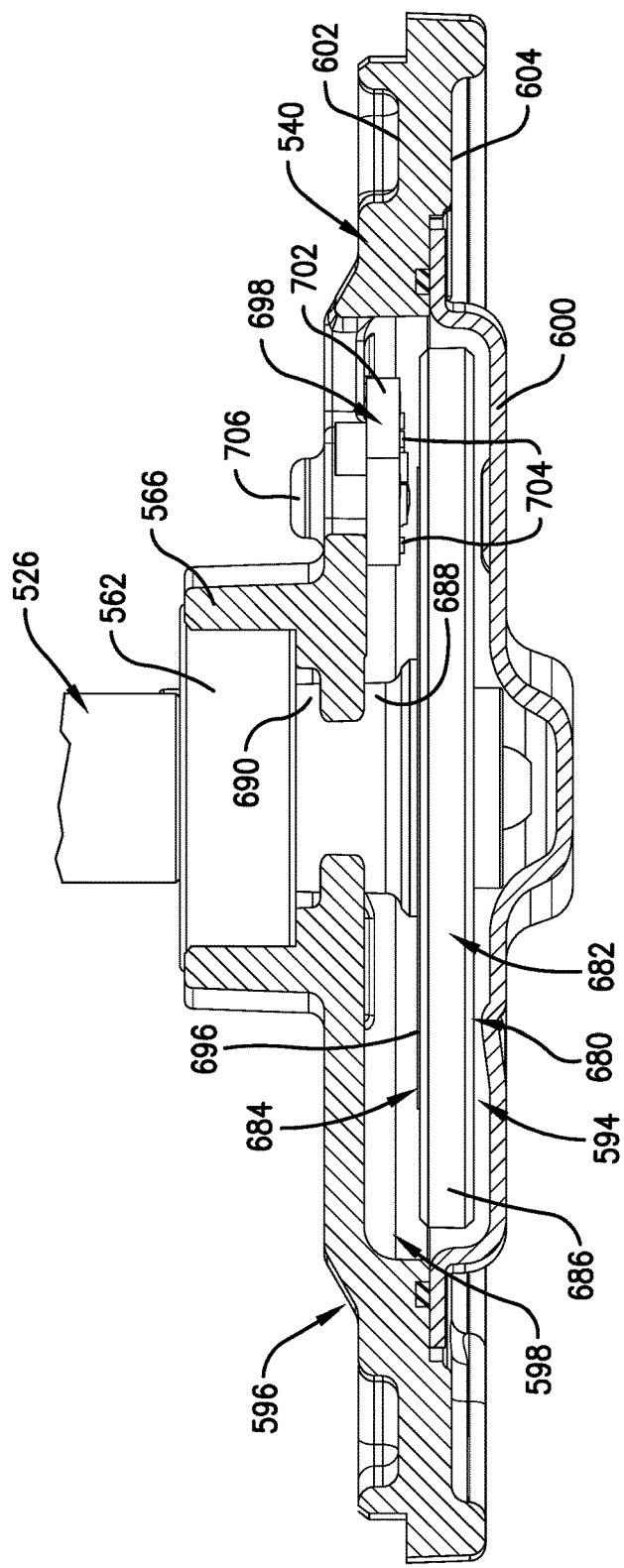
Figure 35:
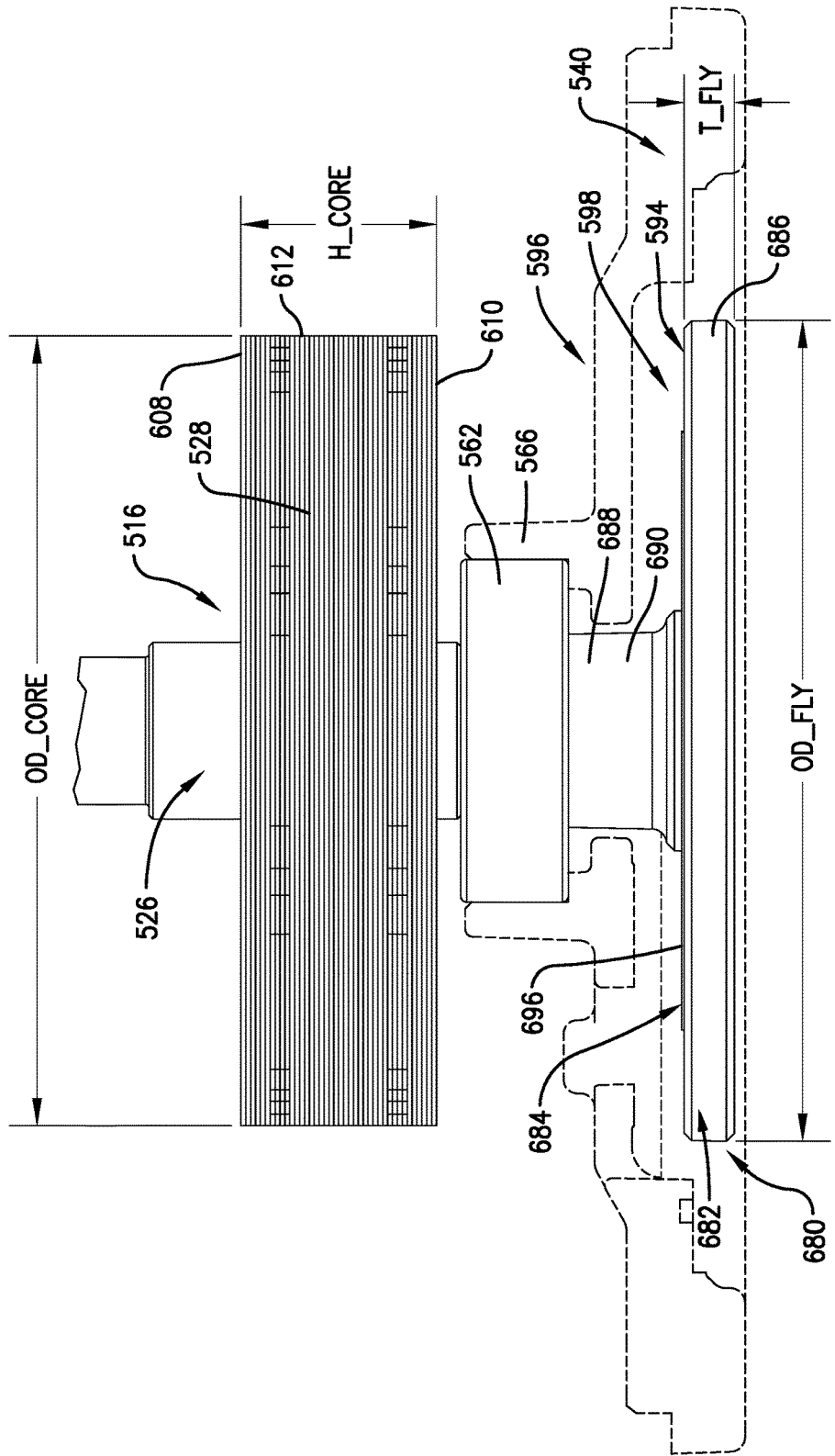
Figure 36:
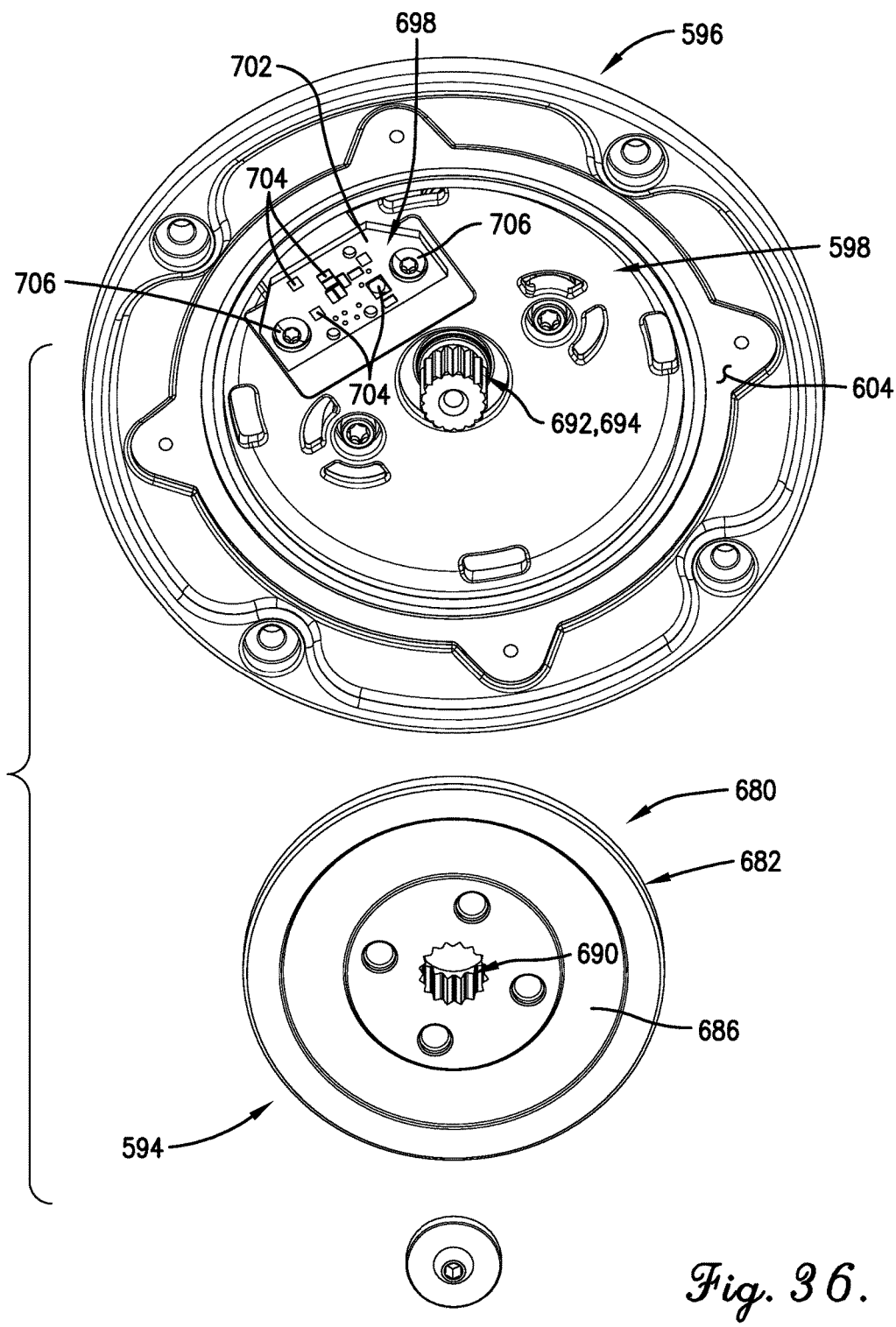
Figure 37:
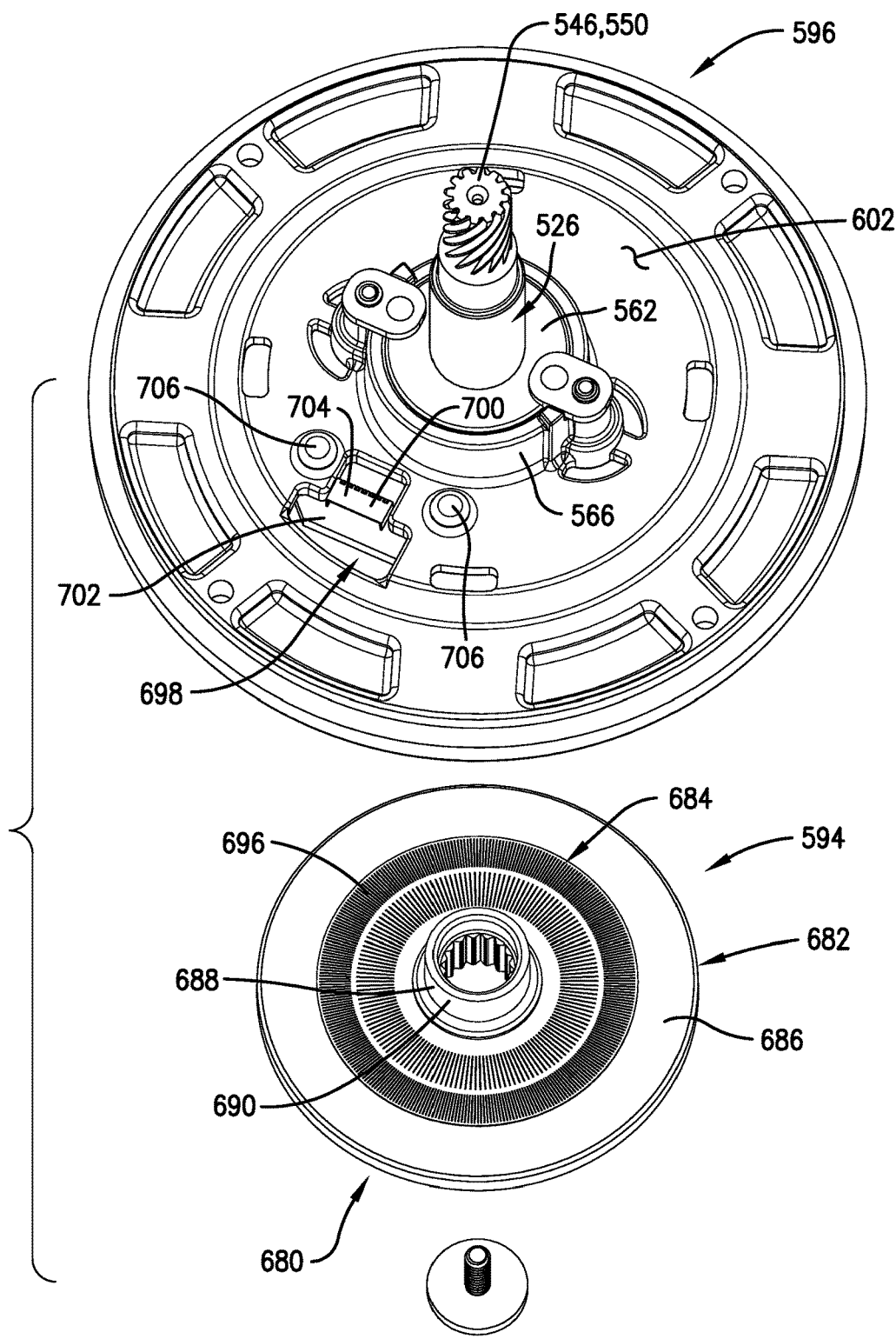

FIG. 4*a* is an enlarged, cross-sectional view of a portion of the labyrinth formed between the wheel and the end block of the locomotion motor assembly and wheel of FIG. 4;

FIG. 5 is an exploded perspective view of the locomotion motor assembly and wheel of FIGS. 3 and 4;

FIG. 6 is an exploded perspective view of the locomotion motor assembly and wheel generally opposite of that shown in FIG. 5;

FIG. 7 is a partially sectioned perspective view of the turntable motor assembly of FIG. 2;

FIG. 8 is a partially sectioned alternative perspective view of the turntable motor assembly of FIG. 7;

FIG. 9 is a cross-sectional view of the turntable motor assembly of FIGS. 7 and 8;

FIG. 10 is an exploded perspective view of the turntable motor assembly of FIGS. 7-9;

FIG. 11 is an exploded perspective view of the turntable motor assembly generally opposite of that shown in FIG. 10;

FIG. 12 is a top perspective view of a turntable motor assembly according to a second preferred embodiment of the present invention;

FIG. 13 is a bottom perspective view of the turntable motor assembly of FIG. 12;

FIG. 14 is an exploded top perspective view of the turntable motor assembly of FIGS. 12 and 13;

FIG. 15 is an exploded bottom perspective view of the turntable motor assembly of FIGS. 12-14;

FIG. 16 is a perspective view of the rotor of the turntable motor assembly of FIGS. 12-15, particularly illustrating the securement portions of the rotor core;

FIG. 17 is a top view of the rotor of FIG. 16;

FIG. 17*a* is an enlarged, sectioned top view of the rotor of FIGS. 16 and 17, particularly illustrating the securement portions, ears, and stressed regions;

FIG. 17*b* is an enlarged, partially sectioned perspective view of the rotor of FIGS. 16-17*a*, taken along line 17*b*-17*b* of FIG. 17*a*;

FIG. 17*c* is an enlarged, partially sectioned perspective view of the rotor of FIGS. 16-17*b*, taken along line 17*c*-17*c* of FIG. 17*a*;

FIG. 18 is top perspective view of the stator retention ring of the turntable motor assembly of FIGS. 12-15;

FIG. 19 is a bottom perspective view of the stator retention ring of FIG. 18;

FIG. 20 is a bottom view of the stator retention ring of FIGS. 18 and 19;

FIG. 21 is a cross-sectional side view of the stator retention ring of FIGS. 18-20;

FIG. 22 is a partially sectioned perspective view of the turntable motor assembly of FIGS. 12-15, particularly illustrating the disposition and function of the stator retention ring of FIGS. 18-21 and the portal extending between the motor chamber and the controller chamber;

FIG. 23 is an alternative partially sectioned perspective view of the turntable motor assembly of FIGS. 12-15 and 22, further illustrating the disposition and function of the stator retention ring of FIGS. 18-21;

FIG. 24 is a bottom perspective view of the turntable motor assembly of FIGS. 12-15, 22, and 23, with the lower end plate removed, further illustrating the disposition and function of the stator retention ring of FIGS. 18-21 and the portal of FIG. 22;

FIG. 25 is an enlarged side view, taken from the controller chamber toward the motor chamber, of the portal of FIGS. 22 and 24, particularly illustrating the overlap of the stator retention ring lip over portions of the portal edge;

FIG. 25a is an exploded view of FIG. 25, providing broader context to the engagement between the stator ring lip and the portal edge;

FIG. 26 is an is an enlarged perspective view, taken from the motor chamber toward the controller chamber, of the portal of FIGS. 22 and 24-25a, particularly illustrating the overlap of the stator retention ring lip over portions of the portal edge;

FIG. 26a is an exploded view of FIG. 26, providing broader context to the engagement between the stator ring lip and the portal edge;

FIG. 27 is a bottom view of the turntable motor assembly of FIGS. 12-15, and 22-24, with the lower end plate removed, further illustrating the disposition and function of the stator retention ring of FIGS. 18-21, especially with regard to wire routing;

FIG. 28 is a cross-sectional side view, taken along line 28-28 of FIG. 27, further illustrating the disposition and function of the stator retention ring of FIGS. 18-21;

FIG. 29 is a cross-sectional side view, taken along line 29-29 of FIG. 27, further illustrating the disposition and function of the stator retention ring of FIGS. 18-21, especially with regard to fastener insulation;

FIG. 30 is an enlarged, partially sectioned bottom perspective view of the turntable motor assembly of FIGS. 12-15, 22-24, and 27-29, further illustrating the disposition and function of the stator retention ring of FIGS. 18-21, especially with regard to redundant stator core insulation in cooperation with the end caps;

FIG. 31 is a partially sectioned top perspective view of a portion of the of the turntable motor assembly of FIGS. 12-15, particularly illustrating the encoder flywheel assembly and associated encoder housing;

FIG. 32 is a top perspective view of the encoder flywheel assembly and encoder housing of FIG. 31, with the base plate removed;

FIG. 33 is a bottom perspective view of the encoder flywheel assembly and encoder housing of FIGS. 31 and 32;

FIG. 34 is a cross-sectional side view of the encoder flywheel assembly and encoder housing of FIGS. 31-33;

FIG. 35 is a side view of the encoder flywheel assembly and rotor of the turntable motor assembly of FIGS. 12-15, with the base plate removed and the end plate shown schematically;

FIG. 36 is an exploded bottom perspective view of the encoder flywheel assembly and encoder housing of FIGS. 31-35, with the base plate removed; and FIG. 37 is an exploded top perspective view of the encoder flywheel assembly and encoder having of FIGS. 31-36, with the base plate removed.

The drawing figures do not limit the present invention to the specific embodiments disclosed and described herein.

The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer etc.) are used solely for the sake of convenience and should be understood only in relation to each other. For instance, a component might in practice be oriented such that faces referred to as "top" and "bottom" are sideways, angled, inverted, etc. relative to the chosen frame of reference.

In a preferred embodiment of the present invention, a robot 10 is provided. The robot 10 preferably includes a main body 12 supported on a chassis (not shown), a support platform 14, and a pair of rotatable, ground-engaging wheels 16 enabling the robot 10 to have a zero-turn radius.

The robot 10 is preferably configured to transport goods in a warehouse environment. For instance, in a preferred embodiment, the robot 10 is configured to transport shelving 18 and various goods 20 supported thereon through a warehouse environment. More particularly, the robot 10 is preferably operable at least to (1) lift the shelving 18 and associated goods 20 on the platform 14; (2) rotate at least a portion of the platform 14 so as to appropriately orient the shelving 18 and goods 20 supported by the platform 14; (3) transport the shelving 18 and goods 20 on the platform 14 from one location to another in the warehouse, making use of the wheels 16; (4) deposit the shelving 18 and goods 20 at their new location through lowering of the platform 14; and (5) completely disengage from the shelving 18 and goods 20 via lowering of the platform 14 so as to no longer be in contact with the shelving 18 and/or goods 20.

The robot 10 is preferably provided with numerous features to enable such operation, including but not limited to one or more printed circuit boards, sensors, cameras, and communication devices. A control system (not shown) is also preferably provided to control each robot 10 and to synchronize operation of multiple robots 10 in a warehouse.

The robot 10 is preferably battery-powered and rechargeable.

In a preferred embodiment, the robot 10 includes four (4) motor assemblies: a pair of locomotion or traction motor assemblies 110, each of which is associated with a respective one of the wheels 16 to form a respective traction assembly 112, and which cooperatively enable the robot 10 to travel through the warehouse; a turntable motor assembly 310 operable to rotate and stabilize at least a portion of the platform 14; and a lift motor assembly 710 operable to raise the platform 14, preferably but not necessarily with the assistance of a scissor lift mechanism or other lifting aid.

Preferably, the locomotion motor assemblies 110 and the lift motor assembly 710 are mounted directly to the chassis (not shown). The turntable motor assembly 310 is preferably mounted to the platform 14.

Although the locomotion motor assemblies 110, the turntable motor assembly 310, and the lift motor assembly 710 are preferably part of the robot 10 and function generally as described above, it is noted that it is within the scope of the present invention for the motor assemblies to instead be provided in an alternative application and/or to be provided separately from one another. For instance, the locomotion motor assemblies might instead be provided for use in an electric vehicle for human transport, the turntable motor assembly might be used to operate a rotating display, or the lift motor assembly might be used to raise and lower a load that is in no manner associated with a warehouse operation. Furthermore, certain features of each of the motor assemblies may be used in entirely different applications than shown. For example, certain aspects of the locomotion motor assembly 110 might be capable of use in motor assemblies that are not used to drive or propel a wheeled vehicle, including but not limited to motor assemblies similar to the turntable motor assembly 310 or the lift motor assembly 710.

Locomotion Motor Assembly

With initial reference to FIGS. 3-6, the traction assembly 112 in accordance with a first preferred embodiment of the present invention is illustrated. As noted previously, the traction assembly 112 preferably includes one of the locomotion or traction motor assemblies 10 and one of the wheels 16.

The locomotion motor assembly 110 preferably includes a motor 114 including a rotor 116 rotatable about a rotor axis. The motor 114 further preferably includes a stator 118.

The locomotion motor assembly 110 further preferably includes an output shaft 120, a motor case 122, a controller 124, and a controller case 126.

The locomotion motor assembly 110 is preferably oriented such that the rotor axis is a horizontal axis. The rotor 116 and the stator 118 are preferably positioned at an axially inner end (relative to the robot 10 in a broad sense) of the traction assembly 112, while the wheel 16 is positioned at an axially outer end (relative to the robot 10 in a broad sense) of the assembly 112. It is permissible according to some aspects of the present invention, however, for the locomotion motor assembly to be alternatively oriented.

Stator Overview

As best shown in FIGS. 4-6, the stator 118 preferably includes a generally toroidal stator core 128 and wiring 130 wound about the stator core 128 to form a plurality of coils 132. The stator core 128 is preferably a laminated stator core comprising a plurality of stacked laminations (not shown), although it is permissible for the stator core to be non-laminated. The stator core 128 preferably comprises a ferromagnetic material such as steel, although use of any one or more electrically conductive materials is permissible without departing from the scope of the present invention.

The laminations of the stator core 128 are preferably interlocked to restrict relative axial shifting, although other configurations (e.g., non-interlocked laminations) are permissible.

The stator core 128 preferably defines an axis. Most preferably, the axis is co-axial with the axis of the rotor 116, although offset or skewed axes are permissible according to some aspects of the present invention.

Preferably, the stator core 128 includes a plurality of arcuately spaced apart, generally radially extending teeth 134. More particularly, in a preferred embodiment, each of the teeth 134 includes a generally circumferentially extending yoke 136, a generally radial arm 138 extending from the yoke 136, and a crown 140 extending generally circumferentially from the arm 138.

The motor 114 is preferably an inner rotor motor, with the stator 118 at least substantially circumscribing the rotor 116. More particularly, each yoke 136 preferably engages a pair of adjacent yokes 136, such that the yokes 136 cooperatively present an outer circumferential stator core face 142. The crowns 140 cooperatively present a discontinuous inner circumferential stator core face 144 that faces the rotor 116. A circumferentially extending radial gap 146 is preferably formed between the inner circumferential stator core face 144 and the rotor 116. Use of an outer rotor motor is permissible according to some aspects of the present invention, however.

Furthermore, it is permissible according to some aspects of the present invention for the stator core to be alternatively configured. Among other things, for instance, the stator core could comprise a plurality of interconnected multi-tooth segments, comprise one or more helically wound laminations, or comprise stacked annular laminations each formed from a single punched strip.

The stator core 128 is preferably electrically insulated by means of a plurality of discrete, electrically insulative end caps 148 secured relative to the core 128. Each end cap 148 preferably provides both a physical and electrical barrier between the coils 132 and the stator core 128, with a pair of end caps 148 fitted over opposite axial sides of a corresponding tooth 134 so as to in part encompass the tooth 134.

The end caps 148 preferably comprise a plastic or synthetic resin material, although any one or more of a variety of materials having electrically insulative properties may be used.

Furthermore, it is noted that use of any one or more of a variety of alternative or additional insulation means, including but not limited to the use of electrically insulative overmolding, powder-coating, and/or liners, is permissible according to some aspects of the present invention. It is also permissible according to some aspects of the present invention for the stator core to be devoid of electrical insulation.

The coils 132 are preferably wound about the arms 138 of the teeth 134. More particularly, a slot 150 is defined between each adjacent pair of teeth 134. The coils 132 are preferably wound about the teeth 134 and through the slots 150 so as to circumscribe respective ones of the arms 138.

The stator 118 preferably includes twelve (12) teeth 134 defining twelve (12) slots 150 therebetween, with twelve (12) coils 132 being wound about the teeth 134. Alternate numbers of teeth, slots, and/or coils are permissible according to some aspects of the present invention, however.

The wiring 130 forming the coils 132 is preferably electrically conductive wiring wound multiple times about each tooth 134 to form a plurality of turns or loops. The wiring 130 is preferably formed of copper or aluminum, although any one or more of a variety of electrical conductive materials or a combination thereof may be used within the ambit of the present invention.

Furthermore, the wiring 130 may be coated or uncoated.

As is customary, the wiring 130 is wound around the teeth 134 in a particular manner according to the configuration and desired performance characteristics of the locomotion motor assembly 110.

Rotor Overview

As best shown in FIGS. 4-6, the rotor 116 preferably includes a rotor core 152, a plurality of arcuately arranged magnets 154, and a rotor shaft 156 (or, alternatively, a motor shaft 156) that extends along and is rotatable about the rotor axis.

The rotor core 152 is preferably a laminated rotor core, although it is permissible for the rotor core to be non-laminated. The laminations of the rotor core 152 are preferably interlocked, although other configurations (e.g., non-interlocked laminations) are permissible.

The rotor core 152 preferably comprises a ferromagnetic material such as steel, although use of any one or more electrically conductive materials is permissible without departing from the scope of the present invention.

The rotor core 152 is preferably generally decagonal in cross-section so as to define ten (10) magnet-mounting faces 158, although other shapes (e.g., round or hexagonal) are permissible according to some aspects of the present invention.

The magnets 154 are preferably mounted to corresponding ones of the magnet-mounting faces 158. In a preferred embodiment, ten (10) magnets 154 are provided and define ten (10) poles. Magnet numbers may vary within the ambit of the present invention, however.

In keeping with the above-described preferred stator core 128, which defines twelve (12) slots, it is noted that the motor 114 is preferably a twelve (12) slot, ten (10) pole motor. It is permissible according to some aspects of the present invention, however, for the locomotion motor assembly to have a different number of slots and poles maintaining the preferred six (6) slot:five (5) pole ratio or for an entirely different slot to pole ratio to be defined.

The magnets 154 are preferably mounted to corresponding ones of the magnet-mounting faces 158 through use of a glue or adhesive. In a preferred embodiment, for instance the magnets 154 are retained on the magnet-mounting faces 158 through use of a two step acrylic, one-part, dual-cure, thixotropic magnet bonding adhesive with a solvent-less activator.

The adhesive is preferably applied to each magnet-mounting face 158 and to each magnet 154. The adhesive may applied in the form of a bead, in a pattern (e.g., a grid or a plurality of evenly spaced apart dots), in a random dispersion, or over the entire surface.

The rotor 116 is preferably additionally wrapped with a thin film (not shown) to provide redundant magnet 154 retention. Preferably, the film is heat shrunk over the rotor 116. In addition to providing retention of the magnets 154 in whole, the thin film is also preferably operable to retain any chips that might break away from the magnets 154. (The likelihood of such chip formation is greater if a non-preferred magnet material such as ferrite is used, rather than a preferred, unlikely-to-chip neodymium iron boron magnet material as identified below.)

The magnet retention means may vary from the preferred combination described above without departing from some aspects of the present invention, however. For instance, it is permissible according to some aspects of the present invention for the thin film to be omitted and/or for the magnets to be retained using alternative or additional mechanical means or an alternative or additional adhesive. Preferably, however, the magnet retention means are sufficient to restrict magnet dislodgement at all rotational speeds of the rotor 116. The magnet retention means should also be sufficient to restrict magnet dislodgement at all possible magnet temperatures during operation.

The magnets 154 are preferably rare earth magnets. More particularly, the magnets 154 are preferably thirty-five (35) uh, one hundred eighty degrees Celsius (180° C.) grade neodymium iron boron magnets. Other magnet types may be used without departing from some aspects of the present invention, however. For instance, according to some aspects of the present invention, the magnets might be of a lower grade and/or comprise ferrite.

In a preferred embodiment, the magnets 154 include nickel-copper-nickel plating.

Alternative plating or no plating is permissible, however.

The magnets 154 preferably cooperatively present an outer circumferential rotor face 160.

The gap 146 is preferably formed between the inner circumferential stator core face 144 and the outer circumferential rotor face 160.

Motor Case Overview

As noted previously, the motor assembly 110 preferably includes the motor case 122. As best shown in FIG. 4, the motor case 122 preferably defines a motor chamber 162 that at least substantially receives the motor 114 (i.e., at least substantially receives the rotor 116 and the stator 118).

More particularly, in a preferred embodiment, the motor case 122 includes a shell 164, an axially inner endshield 166, and an axially outer end block 168. The shell 164 preferably extends between and interconnects the endshield 166 and the end block 168.

The shell 164 and the end block 168 are preferably integrally formed (e.g., from a single casting), although non-integral formation is permissible.

Preferably, the shell 164 includes a generally cylindrical main body 170 and a radially or laterally extending flange 172, although other shapes (e.g., a polygonal main body) are permissible according to some aspects of the present invention. The flange 172 preferably abuts or merges with the end block 168.

It is preferred that the shell 164 at least substantially circumscribes the stator 118 and in part defines the motor chamber 162, such that the motor chamber 162 at least substantially receives the stator 118 and the rotor 116.

In a preferred embodiment, the shell 164 comprises metal. More particularly, in the preferred embodiment, the shell 164 comprises cast aluminum.

The shell 164 is preferably fit on the stator core 128 via an interference fit, although non-interference fits (e.g., tight fits or slip fits) fall within the scope of the present invention, The endshield 166 preferably at least substantially encloses an inner end of the motor chamber 162. The end block 168 preferably at least substantially encloses an outer end of the motor chamber 162.

Furthermore, the endshield 166 preferably supports the rotor 116. More particularly, the motor assembly 110 preferably includes a rotor shaft bearing 174 that rotatably supports the rotor shaft 156 and, in turn, the rotor 116 in a broad sense. The endshield 166 preferably defines a rotor shaft bearing hub 176 that at least in part receives the rotor shaft bearing 174.

Integral Ring Gear

As noted above, the rotor 116 preferably includes the rotor or motor shaft 156. Preferably, the rotor shaft 156 comprises the output shaft 120, which includes an output gear 178. More particularly, the output shaft 120 (or, alternatively, the rotor or motor shaft 156) preferably presents an axially outer end 180 comprising the output gear 178, which is preferably a pinion gear. Furthermore, the wheel 16 preferably presents a wheel gear 182 that drivingly intermeshes with the output gear or pinion gear 178, such that rotation of the output gear 178 imparts rotation to the wheel 16.

More particularly, the wheel 16 preferably includes a hub 184, a rim 186 circumscribing the hub 184, a tire 188 circumscribing the hub 184 and the rim 186, and a wheel shaft 190 fixed relative to the hub 184 for rotational movement therewith.

The wheel 16 is preferably rotatable about a wheel axis, with the wheel shaft 190 preferably extending along the wheel axis. The wheel axis is preferably laterally offset from and at least substantially parallel to the rotor axis, such that the rotor shaft 156 and the wheel shaft 190 are laterally offset and generally parallel, although alternative relative dispositions are permissible according to some aspects of the present invention.

Furthermore, the rotor shaft 156 and the wheel shaft 190 preferably extend at least in part alongside each other. Such axial overlap enables a decrease in the axial envelope required for the wheel 16 and the pinion gear 178 in a broad sense. Advantageous effects of such a decrease will be discussed in greater detail below.

The assembly 112 preferably includes a pair of wheel bearings 192 and 194 rotatably supporting the wheel shaft 190. More particularly, the end block 168 of the motor case 122 preferably defines a wheel bearing hub 184 that receives the pair of wheel bearings 192,194 such that the wheel bearings 192 and 194 support the wheel shaft 190 on the motor case 122.

Preferably, the wheel shaft 190 is integrally formed with the hub 184 of the wheel 16, although non-integral formation is permissible according to some aspects of the present invention.

In a preferred embodiment, the hub 184 presents the aforementioned wheel gear 182. More particularly, the wheel gear 182 is preferably integrally formed with the hub 184 and comprises a ring gear 196 having a plurality of arcuately spaced apart, radially inwardly directed ring gear teeth 196a defined about the hub 184 in spaced relation to the wheel shaft 190. The pinion gear 178 of the output shaft 120, in contrast, preferably includes a plurality of arcuately spaced apart, generally radially outwardly directed pinion gear teeth 178a that engage the teeth 196a of the ring gear 196 to drive rotation of the ring gear 196 and, more broadly, the wheel 16 in its entirety.

It is particularly noted that provision of the ring gear 196 formed integrally with the wheel hub 184 enables a decrease in the axial envelope required for the ring gear 196 and the pinion gear 178 and, more broadly, the wheel 16 and the pinion gear 178. Advantageous effects of such a decrease will be discussed in greater detail below.

The hub 184 (including the integrally formed ring gear 196) and the output shaft 120 preferably comprise powder-coated metal, although other materials may permissibly be used for some or all of the above-referenced elements without departing from the scope of some aspects the present invention.

In a preferred embodiment, the pinion gear 178 and the ring gear 196 define a single stage gear transmission 198 from the motor assembly 110 to the wheel 16. That is, the motor assembly 110 itself is devoid of gearing. It is permissible according to some aspects of the present invention, however, for a more complex transmission including additional gears to be provided. For example, in an alternative multi-stage embodiment, the output shaft may be connected to the rotor shaft by two (2) or more intermeshing gears.

Gear Lubrication and Sealing

In a preferred embodiment, the motor case 122 and the hub 184 cooperatively define a gear chamber 200 in which the pinion gear 178 and the ring gear 196 intermesh. More particularly, the end block 168 and the hub 184 preferably define the gear chamber 200. Thus, the end block 168 preferably at least in part defines both the motor chamber 162 and the gear chamber 200.

Furthermore, as best shown in FIG. 4, the motor chamber 162 and the gear chamber 200 are preferably in fluid communication.

Preferably, the hub 184 and the end block 168 cooperatively define a dynamic seal interface 202 therebetween, with the seal interface 202 being in communication with the gear chamber 200.

A seal 204 is preferably provided at the interface 202 to at least substantially prevent the transfer of contaminants or other materials thereacross. However, it is permissible according to some aspects of the present invention the seal to be omitted. More particularly, it is noted that the interface 202 preferably comprises a labyrinth 206. The labyrinth 206 is configured to restrict leakage of oil or other lubricants from the gear chamber 200 while also preventing ingress of contaminants into the gear chamber 200. Most preferably, the interface 202 (i.e., the labyrinth 206) is filled with a lubricant that restricts migration of contaminants into the gear chamber 200. The labyrinth 206 will be described in greater detail below.

It is noted that the preferred embodiment described above is particularly suited for use of a heavier grease as a lubricant. The grease preferably is viscous enough to not drip throughout the motor chamber 162 and/or the gear chamber 200.

Preferably, the ring gear 196 circumscribes a gear chamber cavity 208, with the grease at least in part filling the gear chamber cavity 208 and being forced into the ring gear 196 by means of centrifugal force. The grease thereby lubricates the ring gear 196 and at least in part prevents the migration of dust and foreign debris or other contaminants into the gear chamber 200.

The grease further preferably at least in part fills the interface 202 so as to lubricate the rotation of the hub 184 relative to the end block 168 and at least in part prevents the migration of dust and foreign debris or other contaminants into the gear chamber 200.

In a preferred embodiment and as best shown in FIG. 4a, the labyrinth 206 includes a plurality of alternately radially and axially extending (i.e., orthogonally oriented relative to each other) sections 206a, 206b (shown filled with the seal 204), 206c, 206d, and 206e. More or fewer sections may be provided without departing from the scope of the present invention, however. Furthermore, relative orientations between the sections may be non-orthogonal (e.g., acutely angled, etc.) or a combination of orthogonal and non-orthogonal.

More particularly, the end block 168 preferably includes a circumferential recess 210 that extends axially inwardly relative to the wheel 16. The hub 184 preferably includes a circumferential wall 212 that extends axially inwardly into the recess 210. The recess 210 and the wall 212, along with the rim 186, cooperatively at least in part define the labyrinth 206.

In still greater detail, it is preferred that the labyrinth sections 206a, 206b, 206c, 206d, and 206e are in part defined by corresponding end block surfaces 168a, 168b, 168c, 168d, and 168e, and further in part defined by a corresponding face 186a presented by the rim 186 and corresponding faces 212b, 212c, 212d, and 212e defined by the circumferential wall 212.

Preferably, the labyrinth sections 206a and 206e both extend at least substantially radially and are at least substantially axially aligned. Likewise, corresponding surfaces 168a,168e extend at least substantially radially and are at least substantially axially aligned. Yet further, the faces 186a,212e extend at least substantially radially are at least substantially axially aligned.

Furthermore, the surfaces 168b,168c,168d (which generally define the recess 210) are preferably at least in part in axial and radial alignment with the circumferential wall 212. If desired, according to some aspects of the present invention, the labyrinth may be alternatively formed along only one side (radially inner or outer side) of the circumferential wall (e.g., one of the surfaces 168b or 168d may be removed).

Furthermore, the seal 204 is preferably at least in part disposed in the recess 210 so as to at least substantially fill the labyrinth section 206b. However, according to some aspects of the present invention, the seal may be alternatively positioned radially inside the circumferential wall.

Axially Disposed Controller

As noted previously, the motor assembly 110 preferably includes the controller 124 and the controller case 126. The controller case 126 preferably defines a controller chamber 214 that at least substantially receives the controller 124.

The controller 124 is preferably configured to at least in part control operation of the motor 114.

Furthermore, in a preferred embodiment, the controller 124 is positioned axially adjacent the motor 114. More particularly, as will be discussed in greater detail below, the output gear 178 or pinion gear 178 is preferably positioned adjacent the outer end 180 of the output shaft 120, while the controller 124 is positioned adjacent an axially opposite, inner end 216 of the output shaft 120.

The controller 124 preferably includes a printed circuit board 218 and a plurality of electronic components 220 (e.g., resistors, capacitors, inductors, transistors, processors, switches, etc.) mounted on the printed circuit board 218. However, it is permissible for the controller 124 to be configured in any manner known in the art.

In a preferred embodiment, the printed circuit board 218 presents a geometric center that lies on or at least near the rotor axis. However, offset positioning is permissible according to some aspect of the present invention.

In a preferred embodiment, as noted previously, the motor case 122 includes the shell 164, the inner endshield 166, and the outer end block 168. The shell 164 preferably extends between and interconnects the endshield 166 and the end block 168.

The controller case 126 preferably includes an inner base 222, an outer cover 224, and a generally axially extending sidewall 226 extending between and interconnecting the base 222 and the cover 224. The base 222 preferably at least substantially encloses an inner end of the controller chamber 214, while the cover 224 preferably at least substantially encloses an outer end of the controller chamber 214.

The base 222 and the sidewall 226 are preferably integrally formed, while the cover 224 is preferably a discrete component. Most preferably, the cover 224 is integral with the endshield 166 of the motor case 122. Alternative formation is permissible without departing from the scope of some aspects of the present invention, however.

The base 222 and the cover 224 are preferably generally circular. The sidewall 226 is preferably generally cylindrical. Other base, cover, and sidewall shapes are permissible, however.

The controller 124 may be mounted in any suitable manner within the controller chamber 214. For instance, the controller 124 could be fastened to mounting bosses (not shown in detail) projecting from the cover 224 of the controller case 126.

In a preferred embodiment, the controller chamber 214 and, in turn, the controller 124, is at least substantially encapsulated. Furthermore, one or more gaskets (not shown) are preferably provided to restrict dust and water ingress into the controller chamber 214.

Preferably, a wire opening 228 is defined in the endshield 166. Wires (not shown) connecting the controller 124 and the motor 114 are preferably routed through the wire opening 228.

In a preferred embodiment and as best shown in FIG. 3, the controller case 126 preferably includes a plurality of circumferentially spaced apart mounting tabs 230 each extending generally radially outwardly from the sidewall 226. Each mounting tab 230 preferably defines a fastener-receiving opening 232. Similarly, the endshield 166 of the motor case 122 (or, alternatively, the cover 224 of the controller case 126) preferably includes a plurality of circumferentially spaced apart mounting projections 234 each extending generally radially outwardly. Each mounting projection 234 preferably defines a fastener-receiving aperture 236 (see, for instance, FIG. 5). Corresponding fastener-receiving orifices 238 are also formed in the end block 168. A fastener 240 preferably extends through each corresponding set of openings/apertures/orifices 232,236,238 to secure the controller case 126 to the motor case 122. It is noted however, that alternative approaches utilizing fasteners, latches, adhesives, welds, and/or other devices or techniques are permissible.

The controller case 126 and the motor case 122 are preferably at least substantially axially aligned. More particularly, in a preferred embodiment, the shell 164 of the motor case 122 and the sidewall 226 of the controller case 126 are at least substantially aligned. More particularly, the shell 164 and the sidewall 226 preferably have at least substantially equivalent wall thicknesses and form at least substantially coaxial cylinders having at least substantially equal diameters (both inner and outer).

It is therefore also preferable that the controller chamber 214 and the motor chamber 162 present at least substantially equal diameters. More broadly, however, it is preferred that the controller chamber 214 and the motor chamber 162 present at least substantially equal radial or lateral dimensions (e.g., as would be the case for chambers having generally congruent oval or rectangular cross-sections).

It is particularly noted that provision of an integral outer ring gear 196 enables a decrease in the axial envelope required for the ring gear 196 and the pinion gear 178. Furthermore, the previously described extension of the rotor shaft 156 and the wheel shaft at least in part alongside each other enables a decrease in the axial envelope required for the wheel 16 and the pinion gear 178 in a broad sense. Such reductions in required axial space at least in part enable the addition of the controller 124 and the associated controller case 126 axially adjacent the motor 114 without exceeding the allowable axial envelope for the motor assembly 110 as a whole.

Turntable Motor Assembly—First Preferred Embodiment

FIGS. 7-11 illustrate the turntable motor assembly 310 as shown in FIG. 2. It is initially noted that, with certain exceptions to be discussed in detail below, certain elements of the turntable motor assembly 310 are the same as or very similar to those described in detail above in relation to the locomotion motor assembly 110. Therefore, for the sake of brevity and clarity, redundant descriptions and numbering will be generally avoided here. Unless otherwise specified, the detailed descriptions of certain of the elements presented above with respect to the locomotion motor assembly 110 should therefore be understood to apply at least generally to the turntable motor assembly 310, as well.

Among other things, the turntable motor assembly 310 preferably includes a motor 312. The motor 312 preferably includes a stator 314 and a rotor 316 rotatable about an axis.

The stator 314 preferably includes a generally toroidal stator core 318 comprising a plurality of teeth 320 (shown schematically). The stator core 318 is preferably a laminated stator core, although it is permissible for the stator core to be non-laminated. The stator core 318 preferably comprises a ferromagnetic material such as steel, although use of any one or more other electrically conductive materials is permissible without departing from the scope of the present invention.

The stator 314 further preferably includes a plurality of coils 322 (shown schematically) wound about the stator core 318.

The rotor 316 preferably includes a rotor shaft 324 that is rotatable about an axis, a rotor core 326 fixed to the rotor shaft 324 to rotate therewith, and a plurality of circumferentially spaced magnets 328 fixed to the rotor core 326 to rotate therewith.

The rotor core 326 is preferably a laminated rotor core, although it is permissible for the rotor core to be non-laminated. The rotor core 326 preferably comprises a ferromagnetic material such as steel, although use of any one or more electrically conductive materials is permissible without departing from the scope of the present invention.

The motor 312 is preferably an inner rotor motor, with the stator 314 at least substantially circumscribing the rotor 316.

The motor assembly 310 further preferably includes a motor housing 330 defining a motor chamber 332. The motor 312 (i.e, the stator 314 and the rotor 316) is preferably least substantially received in the motor chamber 332.

In a preferred embodiment, the motor housing 330 includes an upper end plate 334 and a shell 336. The upper end plate 334 is preferably fixed relative to the shell 336.

The rotor shaft 324 preferably includes a connection end 338 and an encoder end 340 axially spaced from and opposite the connection end 338. The rotor shaft 324 further preferably includes a connection portion 342 adjacent the connection end 338, a cantilevered portion 344 adjacent the encoder end 340, and a bearing-supported portion 346 extending between and interconnecting the connection portion 342 and the cantilevered portion 344.

Figure 1:
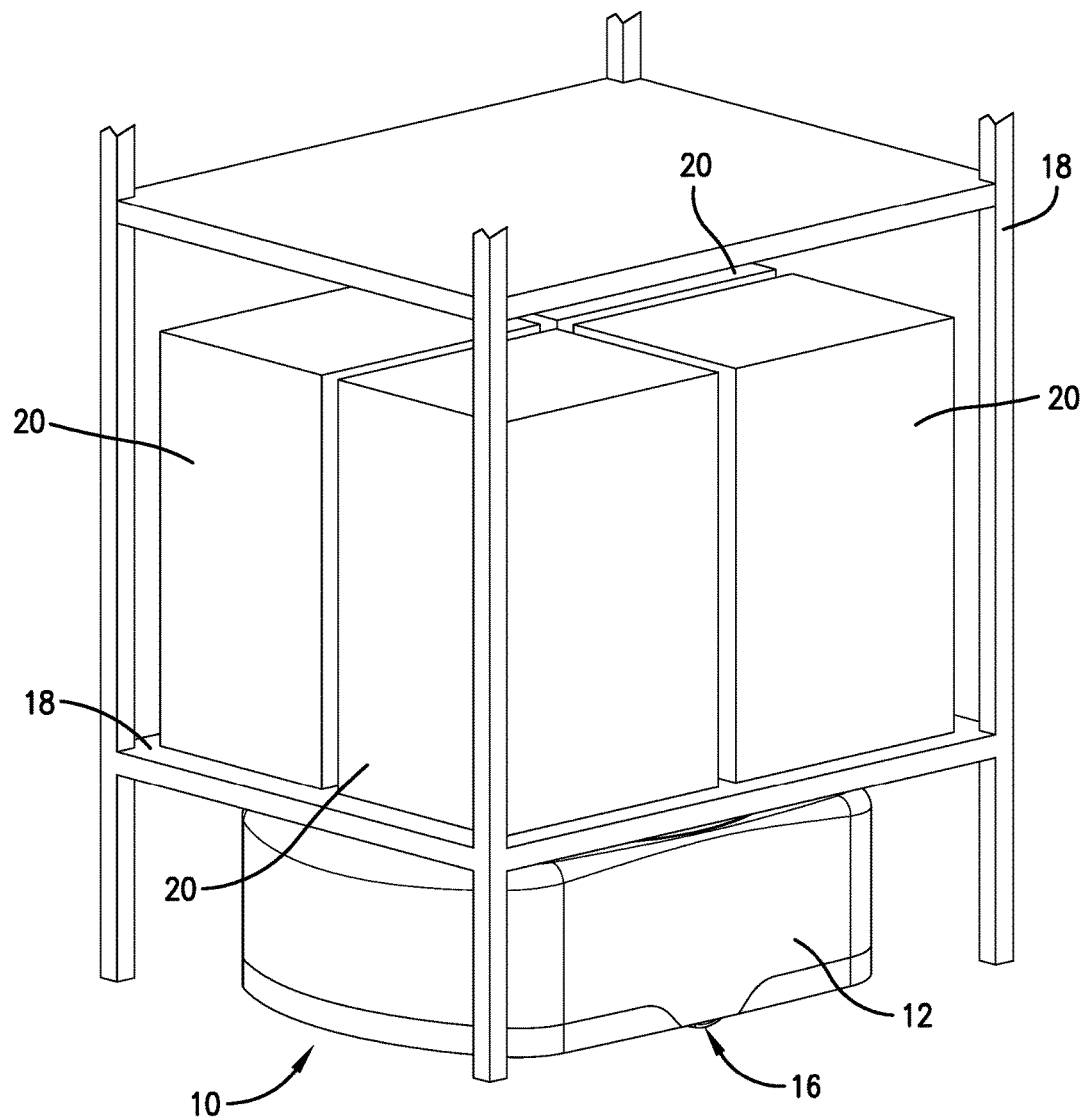
FIG. 1 illustrates a robot, shelving, and goods, wherein the robot is operable to transport the shelving and goods.

The connection portion 342 preferably supports a connector 348 configured for engagement with a device or structure such as a turntable (not shown) of an automated guided vehicle such as the robot 10 of FIGS. 1 and 2.

Preferably, the motor assembly 310 includes a shield 350 for protecting the connector 348. The shield 350 is preferably but not necessarily integrally formed with the motor housing 330. Most preferably, the shield 350 is integrally formed with the upper end plate 334 of the motor housing 330.

Counterbored Rotor for Housing Bearings

In a preferred embodiment, the motor assembly 310 further includes upper and lower bearings 352 and 354, respectively, for rotatably supporting the rotor shaft 324. The bearings 352 and 354 are preferably ball bearings; however, according to certain aspects of the invention, each bearing may be of any type.

Preferably, the bearings 352 and 354 are disposed at least substantially adjacent one another. That is, the bearings 352 and 354 are disposed side by side so as to support the rotor shaft 324 only along the bearing-supported portion 346. One of ordinary skill in the art will therefore understand the aforementioned cantilevered portion 344 to comprise the portion of the rotor shaft 324 extending away from (i.e., below) the lower bearing 254.

Preferably, the cantilevered portion 344 presents a length that is greater than about one fourth (25%) of the total length of the rotor shaft 324. More preferably, the cantilevered portion 344 presents a length that is greater than one third (33%) of the total length of the rotor shaft 324. Most preferably, the cantilevered portion 344 presents a length that is nearly or about one half (50%) the total length of the rotor shaft 324.

As best shown in FIG. 9, the rotor core 326 is at least in part supported on the cantilevered portion 344.

In a preferred embodiment, a pair of snap rings 356 and 358 are provided to additionally secure the bearings 352 and 354 relative to the bearing-supported portion 346 of the rotor shaft 324. Alternative or additional securement means may be provided, however, or snap rings or similar devices may be omitted.

Preferably, the motor housing 330 includes a bearing support 360 that supports the bearings 352 and 354. More particularly, the bearing support 360 preferably comprises a sleeve 362 that is spaced from and circumscribes the rotor shaft 324, with the bearings 352 and 354 likewise circumscribing the rotor shaft 324 and being interposed between the sleeve 362 and the rotor shaft 324.

The bearing sleeve 362 is preferably integrally formed with the motor housing 330. Most preferably, the bearing sleeve 362 is integrally formed with the upper end plate 334 of the motor housing 330, such that the end plate 334 may suitably be referred to as an endshield. However, non-integral formation or formation separate from the upper end plate (e.g., formation associated with another part of the motor housing) is permissible according to some aspect of the present invention.

The bearing sleeve 362 is preferably at least substantially cylindrical in form and is complementary in shape to the bearings 352 and 354. Alternative shapes are permissible, however. For instance, the sleeve might alternatively include an inner surface defining a generally cylindrical form in contrast to an outer surface defining a generally prismatic form.

The rotor core 326 preferably is counter-bored in such a manner as to define an axially downwardly extending recess or bore 368. More particularly, the rotor core 326 preferably presents opposite upper and lower axial ends 364 and 366. The bore 368 preferably comprises a counterbore extending axially inwardly from the upper axial end 364.

The bore 368 is preferably concentric with the rotor shaft 324, although offset configurations are permissible according to some aspects of the present invention.

The bearing sleeve 362 preferably projects axially downwardly into the bore 368 so as to be at least in part received therein. Alternatively stated, the rotor core 326 extends axially upwardly about the bearing sleeve 362 so as to at least substantially circumscribe the bearing sleeve 362.

Preferably, the bore 368 is at least substantially cylindrical and complements the shape of the sleeve 362, although disparate shapes are permissible. For instance, the bore might instead be generally cuboidal in form.

Preferably, the lower bearing 254 is at least in part received in the bore 368. It is permissible according to some aspects of the present invention, however, for neither of the bearings to be received in whole or in part in the bore or for both of the bearings to be received in whole or in part in the bore.

As will be apparent to one of ordinary skill in the art, the aforementioned arrangement of the bearings 352 and 354, the bearing sleeve 362, and the bore 368 enables a reduction in the axial space that would otherwise be required for the bearings 352,354 and the rotor core 326.

Axially Disposed Controller

The motor housing 330 preferably presents opposite, axially spaced apart upper and lower ends 370 and 372 defined by the shield 350 and the motor housing shell 336, respectively. The rotor shaft 324 preferably projects from the upper end 370 toward the lower end 372 (i.e., from a position adjacent the shield 350 toward the shell 336).

Preferably, the motor assembly 310 further includes a controller 374 (shown schematically in FIGS. 7-11) that is positioned adjacent the lower end 372 of the motor housing 330. That is, the controller 374 is preferably positioned axially adjacent the encoder end 340 of the rotor shaft 324 to thereby be disposed axially below the rotor shaft 324.

The controller 374 is preferably configured to at least in part control operation of the motor 312. More particularly, the controller 374 preferably includes a printed circuit board 376 and a plurality of electronic components 378 (e.g., resistors, capacitors, inductors, transistors, processors, switches, etc.) mounted on the printed circuit board. However, it is permissible for the controller to be configured in any manner known in the art.

The motor assembly 310 further preferably includes a controller housing 380. The controller housing 380 preferably defines a controller chamber 382 that at least substantially receives the controller 374.

The controller housing 380 preferably includes a base 384 and a sidewall 386 extending axially from the base 384. The sidewall 386 is preferably generally cylindrical, although other shapes are permissible.

In a preferred embodiment, the shell 336 and the sidewall 386 are at least substantially aligned. More particularly, the shell 336 and the sidewall 386 preferably form at least substantially coaxial cylinders having at least substantially equal outer diameters.

Similarly, the motor chamber 332 and the controller chamber 382 preferably have at least substantially equal diameters.

The sidewall 386 preferably defines a generally radially extending, circumferential shoulder 388. The shell 336 preferably engages and rests upon the shoulder 388 to at least in part secure the controller housing 380 and the shell 336 relative to each other.

Furthermore, a plurality of fasteners 390 are preferably provided to secure the controller housing 380 to the upper end plate 334 of the motor housing 330.

In a broad sense, the axial space savings described above with regard to the bearings 352 and 354, the bearing sleeve 362, and the bore 368 enables the provision of the axially disposed controller 374 as discussed above.

Recess-Defining Encoder Wheel

In a preferred embodiment, the motor assembly 310 additionally includes an encoder assembly 392 configured to sense an operational parameter of the motor 312. Most preferably, for instance, the encoder assembly 392 senses at least one and preferably both of the position and speed of the rotor 316.

As will be discussed in greater detail below, the encoder assembly 392 is preferably at least substantially received in the controller chamber 382.

In a preferred embodiment, the encoder assembly 392 includes an encoder wheel 394 fixed relative to the rotor shaft 324 for rotational movement therewith. The encoder assembly 392 further preferably includes a sensed element 396 fixed relative to the encoder wheel 394 to rotate therewith. Yet further, the encoder assembly 392 preferably includes a sensor 398 operable to sense the sensed element 396. More broadly, the sensor 398 is preferably operable to sense the speed and direction of the sensed element 396 and, in turn, of the rotor 316 itself.

The sensor 398 is preferably fixed relative to the sensed element 396 such that the sensed element 396 rotates relative to the sensor 398. More particularly, the encoder wheel 394 and the sensed element 396 are preferably mounted to the cantilevered portion 344 of the shaft 324 at the encoder end 340 to rotate therewith, whereas the sensor 398 is preferably fixed to the controller 374. Other fixation locations are permissible according to some aspects of the present invention, however.

The sensed element 396 preferably comprises a reflective code disc 400 secured to the encoder wheel 394 by means of a pressure-sensitive adhesive, although other sensed element types and securement means are permissible. Most preferably, the reflective code disc 400 is a window-type decal including hundreds of sensor-readable lines 402. For instance, a preferred reflective code disc might include one thousand twenty-four (1024) radially extending, arcuately spaced apart lines printed, etched, or otherwise displayed thereon.

The sensor 398 preferably comprises an encoder chip 404 fixed to the printed circuit board 376 of the controller 374, although other sensor configurations fall within the ambit of some aspects of the present invention.

In a preferred embodiment, the encoder wheel 394 preferably presents a generally cylindrical hub 406, a generally radially extending upper plate 408 extending radially outwardly relative to the hub 406, and a generally cylindrical sidewall 410 extending axially downwardly from the upper plate 408. The hub 406 and the upper plate 408 each preferably circumscribe and are fixed to the cantilevered portion 344 of the shaft 324 at the encoder end 340, such that the encoder wheel 394 rotates with the shaft 324.

The encoder wheel 394 preferably presents an at least substantially U-shaped cross-section so as to define an axially upwardly extending recess 412 therein. More particularly, as best shown in FIG. 9, the upper plate 408 and the sidewall 410 cooperatively present the generally U-shaped cross-section. The upper plate 408, the encoder end 340, and the sidewall 410 cooperatively define the recess 412.

As will be apparent from the above description, it is therefore preferable that the rotor bore 368 and the encoder wheel recess 412 extend in opposite axial directions, with the rotor bore 368 extending axially downwardly toward the encoder end 340 of the rotor shaft 324 and the encoder wheel recess 412 extending axially upwardly toward the connection end 338 of the rotor shaft 324.

Preferably, the encoder wheel 394 is integrally formed in its entirety. It is permissible according to some aspects of the present invention, however, for one or more portions of the wheel to be discrete components.

Preferably, the sidewall 410 presents a generally circumferential lowermost encoder wheel face 414. The sensed element 396 (i.e., the reflective code disc 400 in a preferred embodiment, as illustrated) is preferably adhered to the lowermost encoder wheel face 414.

The sensor 398 (i.e., the encoder chip 404 in a preferred embodiment, as illustrated) is preferably secured to the printed circuit board 376 of the controller 374 so as to be disposed immediately axially below the sidewall 410 and, in turn, the sensed element 396.

In a preferred embodiment, at least a portion of the controller 374 is received in the recess 412. For instance, as best shown in FIG. 9, it is preferred that at least one of the electronic components 378 projects into the recess 412. One of more others of the electronic components 378 preferably project axially upwardly outside the sidewall 410.

The above-described axial overlapping of the encoder wheel 394 and the controller 374 enabled by the provision of the recess 412 and the fit therein, as well as outside the sidewall 410, of the electronic components 378 of the controller 374 enables a reduction in the axial envelope required for the motor assembly 310.

Thus, a reduced axial envelope for the motor assembly 310, despite the axial disposition of both the controller 374 and the encoder assembly 392 relative to the motor 312, is cooperatively provided at least by (1) the compact positioning of the bearings 352 and 354 adjacent one another, rather than at opposite ends of the rotor shaft 324; (2) the receipt of at least a portion of the bearing sleeve 362 (and the lower bearing 354) in the recess 412 in the rotor core 326; and (3) the axial overlapping of the encoder wheel 394 and the controller 374.

Turntable Motor Assembly—Second Preferred Embodiment

FIGS. 13-37 illustrate a second preferred turntable motor assembly 510. It is initially noted that, with certain exceptions to be discussed in detail below, certain elements of the turntable motor assembly 510 of the second preferred embodiment are the same as or very similar to those described in detail above in relation to the locomotion motor assembly 110 and/or the turntable motor assembly 310. Therefore, for the sake of brevity and clarity, redundant descriptions and numbering will be generally avoided here. Unless otherwise specified, the detailed descriptions of certain of the elements presented above with respect to the locomotion motor assembly 110 should therefore be understood to apply at least generally to the turntable motor assembly 510, as well.

Among other things, the turntable motor assembly 510 preferably includes a motor 512. The motor 512 preferably includes a stator 514 and a rotor 516 rotatable about an axis.

The stator 514 preferably includes a generally toroidal stator core 518 and wiring 520. The wiring 520 forms a plurality of coils 522 wound about the stator core 518. As will be discussed in greater detail below, the wiring 520 further preferably includes exit wires or lead wires 524 extending from the coils 522.

The rotor 516 preferably includes a rotor shaft 526 that is rotatable about an axis, a rotor core 528 fixed to the rotor shaft 526 to rotate therewith, and a plurality of circumferentially spaced magnets 530 fixed to the rotor core 528 to rotate therewith.

The motor 512 is preferably an inner rotor motor, with the stator 514 at least substantially circumscribing the rotor 516.

The motor 512 further preferably includes a motor housing 532 defining a motor chamber 534. The stator 514 and the rotor 516 are preferably least substantially received in the motor chamber 534.

The motor housing 532 preferably includes a generally circumferential motor shell 536, an upper end plate 538 fixed relative to the shell 536, and a generally radially extending lower end plate 540 fixed relative to the shell 536 and axially opposite the upper end plate 538. The upper end plate 538 is preferably but not necessarily integrally formed with the shell 536.

A connector 542 configured for engagement with a device or structure such as a turntable (not shown) of an automated guided vehicle such as the robot 10 of FIGS. 1 and 2 is preferably provided. The connector 542 is preferably configured to rotate in response to rotation of the rotor shaft 526.

More particularly, a gear assembly 544 preferably transfers rotation of the rotor shaft 526 to the connector 542. More particularly, the gear assembly 544 preferably decreases rotational speed from the rotor shaft 526 to the connector 542 while increasing torque. Preferably, as best shown in FIGS. 22 and 23, the gear assembly 544 includes an input gear 546 and an output gear 548, with the input gear 546 drivingly engaging the output gear 548. The rotor shaft 526 preferably includes an upper end 550 comprising the input gear 546. The output gear 548 and the connector 542 are both preferably secured to an output shaft 552 to rotate therewith. Thus, rotation of the output gear 548 results in rotation of both the output shaft 552 and the connector 542.

Although a gear assembly 544 as illustrated is preferred, a direct drive configuration is permissible according to some aspects of the present invention.

The motor 512 preferably includes a gear box 554 defining a gear chamber 556 that at least substantially receives the gear assembly 544. The gear box 554 preferably includes the upper end plate 538 of the motor housing 532 and a top cover 558 secured to the upper end plate 538.

The connector 542 is preferably disposed axially above the cover 558 so as to be positioned outside the gear chamber 556.

The motor 512 preferably includes a pair of upper and lower rotor shaft bearings 560 and 562 for rotatably supporting the rotor shaft 526. The upper end plate 538 preferably defines an upper bearing sleeve 564 for supporting the upper rotor shaft bearing 560, while the lower end plate 540 defines a lower bearing sleeve 566 for supporting the lower rotor shaft bearing 562. Thus, in the illustrated embodiment, the end plates 540 and 538 function as motor endshields.

Yet further, the motor 512 preferably includes a pair of upper and lower output shaft bearings 568 and 570 for rotatably supporting the output shaft 552. The cover 558 preferably defines an upper bearing sleeve 572 for supporting the upper output shaft bearing 568, while the upper end plate 538 defines a lower bearing sleeve 574 for supporting the lower output shaft bearing 570.

Preferably, the shell 536 at least substantially circumscribes the stator core 518. Most preferably, the shell 536 is secured to the stator core 518 via an interference fit, such that the shell 536 at least substantially restricts axial shifting of the stator core 518. The interference fit is most preferably achieved via a hot drop operation (i.e., a thermal fitting operation). It is permissible, however, for other fit types or means of securement to be used. Preferably, however, the shell 536 restricts relative axial shifting of the stator core 518 and, in turn, the stator 514 in general, during normal operation of the motor 512.

In a preferred embodiment, the motor 512 further includes a controller 576 and a controller box 578. The controller box 578 preferably defines a controller chamber 580 that at least substantially houses the controller 576. The controller 576 is preferably configured to at least in part control operation of the motor 512 and includes a printed circuit board 582 and a plurality of electronic components 584 mounted on the board 582.

The controller chamber 580 is preferably disposed radially outside the motor chamber 534, although other arrangements (e.g., axially adjacent disposition) are permissible according to some aspects of the present invention.

Preferably, the motor chamber 534 and the controller chamber 580 are connected via a portal 586, as shown in FIGS. 22, 24, 28, and others. As will be discussed in greater detail below, at least some of the lead wires 524 are preferably routed through (i.e., extend through) the portal 586 to interconnect the stator 514 and the controller 576.

The controller box 578 preferably includes a main body 588 and a side cover 590. The main body 588 is preferably but not necessarily integrally formed with the shell 536 of the motor housing 532.

The side cover 590 preferably but not necessarily includes a plurality of fins 592 for dispersing heat from the controller 576.

As will be discussed in greater detail below, the motor 512 further preferably includes an encoder assembly 594 and an encoder housing 596. The encoder housing 596 preferably at least substantially defines an encoder flywheel chamber 598. The encoder assembly 594 is preferably at least substantially received in the encoder flywheel chamber 598.

Preferably, the motor housing 532 at least in part defines the encoder housing 596. More particularly, the encoder housing 596 preferably includes the lower end plate 540 of the motor housing 532 and a base plate 600 fixed to the lower end plate 540.

It is preferred that the encoder flywheel chamber 598 be disposed at least substantially directly axially below the motor chamber 534. More particularly, the lower end plate 540 preferably presents axially opposed inner and outer faces 602 and 604, respectively. The inner face 602 is preferably adjacent the motor chamber 534 (and opposite the encoder flywheel chamber 598), whereas the outer face 604 is axially opposite the motor chamber 534 so as to be adjacent the encoder flywheel chamber 598. The base plate 600 is thus preferably fixed to the lower end plate 540 adjacent the outer face 604.

The motor housing 532, the gear box 554, the controller box 578, and the encoder housing 596 each preferably comprise a metal such as aluminum, although other metals or types of materials may be used according to some aspects of the present invention.

Staked Rotor

As noted above and as shown in detail in FIGS. 16-17c, the rotor 516 preferably includes the rotor shaft 526, the rotor core 528, and the magnets 530.

In a preferred embodiment, the rotor core 528 is a laminated rotor core comprising a plurality of stacked laminations 606. Each of the laminations 606 is preferably at least substantially circumferentially continuous, and the laminations 606 are preferably at least substantially uniform in axial height. However, it is permissible according to some aspects of the present invention for the core to be devoid of laminations (e.g., to have a solid form or comprise only a pair of thick stacked portions), be formed of a plurality of interconnected arcuately arranged segments, or to include substantially irregularly sized laminations.

The rotor core 528 preferably presents axially spaced apart top and bottom faces 608 and 610 so as to define a rotor core axial height therebetween. The rotor core 528 also presents a radially outer face 612 that preferably takes a generally cylindrical form to present a radially outermost core diameter, although other rotor core shapes are permissible according to some aspects of the present invention.

The magnets 530 each preferably present a pair of generally arcuately spaced apart magnet sides 614 defining a magnet tangential width therebetween, upper and lower generally axially spaced apart magnet ends 616 defining a magnet axial height therebetween, and inner and outer generally radially spaced apart magnet fronts and backs 618 defining a magnet radial thickness therebetween. That is, in a preferred embodiment, each magnet 530 is preferably generally cuboidal in form.

Preferably, the rotor core 528 defines a plurality of arcuately spaced apart magnet-receiving slots 620, each of which receives a corresponding one of the magnets 530 therein. Preferably, each magnet 530 is received in its entirety in the corresponding slot 620, although partial insertion is permissible according to some aspects of the present invention.

Preferably, each of the slots 620 extends axially through the entirety of the rotor core 528 so as to present an axial slot height that is at least substantially equal to the axial core height. Furthermore, the axial slot height is preferably at least substantially equal to the magnet axial height.

Each slot 620 preferably presents first and second generally arcuately spaced apart slot ends 622 defining a slot tangential width therebetween. The slot tangential width is preferably greater than the magnet tangential width, such that each of the slots 620 includes a pair of arcuately spaced apart end openings 624 defined adjacent respective ones of the magnet sides 614.

In a preferred embodiment, the rotor core 528 further preferably includes a pair of arcuately spaced apart ears 626 associated with each of the slots 620 and extending radially outwardly thereinto. The ears 626 of each pair are preferably configured to cooperatively at least in part position the corresponding one of the magnets 530 in the corresponding slot 620. As best shown in FIG. 17a, such positioning may be by means of restriction only upon generally circumferential shifting of the corresponding magnet 530 (e.g., if the ears 626 are spaced apart a greater distance than the magnet tangential width). However, it is also permissible that one or more magnets be sized to directly abut the corresponding ears without shifting having occurred, whether by precise manufacture or as a result of variation within sizing tolerances.

In a preferred embodiment and as best shown in FIG. 17b, each of the ears 626 presents an ear axial extent that is at least substantially equal to the core axial height and, in turn, the magnet axial height. That is, each ear 626 preferably extends continuously alongside the entirety of the corresponding magnet side 614. It is permissible, however, for the ears to extend along only part of the corresponding magnet and/or to be axially discontinuous so as to comprise a plurality of axially spaced apart ear segments.

Preferably, the rotor core 528 also includes a pair of arcuately spaced apart bridges 628 each associated with a corresponding one of the slots 620. Each bridge 628 is preferably disposed radially opposite a corresponding one of the ears 626 and radially adjacent a corresponding ones of the end openings 624.

Each of the bridges 628 is preferably partly deformed to form a securement portion 630 that extends into the corresponding one of the end openings 624 and engages the respective magnet 530, most preferably via contact with a corresponding one of the magnet sides 614. The securement portions 630 of each pair of bridges 628 thus cooperatively at least in part secure the respective magnet in the slot.

More particularly, each of the bridges 628 is preferably generally disposed radially outside the corresponding one of the end openings 624, with the securement portion 630 extending radially inwardly into the corresponding one of the end openings 624, and with a pair of the securement portions 630 engaging each of the magnets 530 along respective ones of the magnet sides 614.

It is particularly noted that the securement portions 630 thus preferably cooperatively secure the magnets 530 not only against generally circumferential and generally radial shifting, as will be readily apparent to one of ordinary skill in the art, but also against axial shifting by providing frictional engagement with the magnets 530 along the corresponding magnet sides 614.

Although direct contact is preferred, the securement portions might alternatively be spaced slightly from the magnets so as to secure the magnets only upon shifting of the magnets into contact with the securement portions (see the above discussion with regard to the ears).

Furthermore, is permissible according to some aspects of the present invention for more broadly different positioning and extension of the securement portions to occur. For instance, the securement portions might extend radially outwardly from a radially inward position (e.g, in an outer rotor motor). In such a case, it may be preferable (but not particularly necessary) for the ears to also be alternatively disposed so as to extend radially inwardly from a radially outward position, thus maintaining the preferred opposed arrangement between the bridges and the ears. It is also within the ambit of the present invention for the securement portions to be formed portions of the core other than the bridges (e.g., the bridges may be eliminated altogether).

Although it is preferred that both bridges 628 of each pair include a corresponding securement portion 630, it is permissible according to some aspects of the present invention for only one bridge per pair to include a securement portion.

In a preferred embodiment, each securement portion 630 comprises a pair of axially spaced apart securement portion segments 630a,630b, such that four (4) of the segments 630a,630b (i.e., one upper segment 630a and one lower segment 630b adjacent each magnet side 614) cooperatively secure each magnet 530 in the corresponding slot 620. More segments may be provided, however, or the securement portions may be continuous (i.e., non-segmented).

Preferably, each of the securement portion segments 630a,630b is disposed axially between the top and bottom faces 608 and 610 of the rotor core 528 and, in turn, between the upper and lower magnet ends 616. It is permissible according to some aspects of the present invention, however, for alternative positioning of the segments to be provided. For instance, the magnets might alternatively be shorter in axial height than the core, with one or more of the segments extending past the corresponding magnet end.

The securement portion segments 630a,630b preferably cooperatively present a total securement portion axial extent that is less than the core axial height and, in turn, the magnet axial height. As shown in FIG. 17c, for instance, each securement portion 630 preferably does not extend alongside the entirety of the corresponding magnet side 614. Preferably, the total securement portion axial extent is between about ten percent (10%) and about fifty percent (50%) of the core axial height/magnet axial height. Most preferably, as illustrated, the total securement portion axial extent is about twenty percent (20%) of the core axial height/magnet axial height.

Alternatively stated, the plurality of laminations 606 forming the rotor core 528 preferably includes a subset of laminations 606a cooperatively defining each securement portion 630. The subset of laminations 606a preferably comprises between about ten percent (10%) and about fifty percent (50%) of the plurality of laminations 606. Most preferably, as best shown in FIG. 17c, the subset of laminations 606a preferably comprises about twenty percent (20%) of the total plurality of laminations 606.

More particularly, as illustrated, the rotor core 528 preferably comprises a stack of forty (40) laminations 606, with each of the securement portion segments 630a,630b being formed from four (4) laminations 606a to define a securement portion-forming subset of eight (8) laminations 606a.

Preferably, the slots 620, including the end openings 624, are devoid of overmolding, adhesives or glues, fillers, or other means of providing additional magnet securement. That is, it is preferred that the securement portions 630 and the ears 626 cooperatively provide sufficient means of securing the magnets 530 in the slots 620, such that provision of additional means is unnecessary. Omission of such additional means may be preferable in some cases to avoid detrimental electromagnetic effects. However, it is permissible according to some aspects of the present invention for one or more additional securement means or mechanisms to be implemented.

According to some aspects of the present invention, formation of the rotor core 528 and, more generally, the rotor 516 may be by any means known in the art. However, it is preferred that the rotor 516 is formed in a process that broadly includes (1) stamping or punching the plurality of laminations 606 from a thin metal sheet (e.g., a steel sheet) in such a manner that the ears 626 and the magnet-receiving slots 620 are defined; (2) assembling the laminations 606 into an axial stack to form the rotor core 528; (3) inserting the magnets 530 into corresponding ones of the slots 620; and (4) deforming the rotor core 528 along the end openings 624 of each slot 620 to define the securement portions 630. However, according to some aspects of the present invention, deformation of the core need not be at the end openings 624 of each slot 620. For example, in some instances, the core may be deformed centrally between the slot ends.

With regard to step (4) above, such deformation is preferably achieved by means of one or more specially-designed tools (e.g., presses or stamps) that apply a radially inwardly acting force against the radially outer face 612 of the rotor core 528 to controllably "dent" selected ones 606a of the laminations 606 and form one or more of the securement portion segments 630a,630b. Tool design is preferably such that such "denting" occurs without shearing or other damage to the selected laminations 606a.

Most preferably, more than one tool is used simultaneously. For instance, a pair of tools may be provided in order to form an entire securement portion 630 (i.e., two axially aligned securement portion segments 630a,630b) in one motion, with the rotor core 528 thereafter being rotated (on a turntable, for instance) to enable formation of an arcuately adjacent securement portion 630.

Alternatively, a plurality of arcuately spaced apart pairs of axially spaced apart tools, each corresponding with one of the desired securement portion segments 630a or 630b, might be provided, with the tools simultaneously applying radially inward forces to form all of the securement portion segments 630a,630b concurrently.

As will be apparent to one of ordinary skill in the art, such deformation of the selected laminations 606a to form the securement portions 630 will preferably result in the definition of a circumferential stressed region or band 632 extending along the portion of the outer face 612 of the rotor core 528 defined by the selected laminations 606a.

The stressed region 632 preferably includes plurality of arcuately spaced apart primary stressed regions 632a interconnecting each pair of securement portions 630 and thus being disposed radially outside of and adjacent the magnets 530. The stressed region 632 further preferable includes a plurality of arcuately spaced apart secondary stressed regions 632b formed between the securement portions 630 of adjacent pairs and thus alternately arranged with the primary stressed regions 632a.

As best shown in FIGS. 17a and 17b, the primary and secondary stressed regions 632a and 632b cooperatively present a radially outermost stressed region diameter that is smaller than the core diameter. The primary stressed regions 632a are thus operable to apply a radially inward force on the magnets 530 that additionally secures the magnets 530 against shifting relative to the rotor core 528, both due to direct generally radial force application and due to frictional forces.

It is permissible according to some aspects of the present invention, however, for the stressed regions to not apply significant force on the magnets under normal circumstances. For instance, the magnets might be sized or positioned so as to not abut the stressed regions (i.e., to be spaced therefrom) or to abut them only lightly.

Ring for Axially Retaining Stator

In a preferred embodiment and as best shown in FIGS. 22 and 23, a circumferentially and axially extending space 634 is defined between the stator core 518 and the motor housing 532. The space 634 preferably in part accommodates the coils 522, the lead wires 524, and other motor components as required.

In a preferred embodiment, the space 634 is defined between the lower end plate 540 and the rotor core 528. More particularly, the lower end plate 540 preferably defines a generally radially extending surface 636, with the space 634 being defined between the surface 636 and the rotor core 528. It is permissible for such a radially extending surface to be defined by any part of the housing, however. For instance, the housing might include one or more projections (e.g., shelves, fingers, etc.) individually or cooperatively presenting a radially extending surface.

Preferably, the motor 512 includes a circumferentially extending stator retention ring 638, shown in detail in FIGS. 18-21 and in position in FIGS. 22-30, disposed in the space 634. The ring 638 preferably extends at least substantially continuously, although it is permissible according to some aspects of the present invention for the ring to instead be discontinuous or to extend only along an arc rather than forming a closed (or continuous) loop.

The ring 638 is preferably integrally formed. Most preferably, the ring 638 is a molded element. However, it is permissible according to some aspects of the present invention for the ring to comprise a plurality of discrete components.

The ring 638 preferably is formed of an electrically insulative material such as a synthetic resin, although alternative materials, including those not suitable for use as electrical insulators, may be used without departing from the ambit of some aspects of the present invention.

The ring 638 preferably serves a variety of advantageous functions, several of which will be described in detail below.

Axial Retention of Stator

As noted above, a space 634 is preferably defined between the lower end plate 540 and the stator core 518. The ring 638 preferably at least substantially spans the space 634 and at least in part restricts relative axial shifting between the stator core 518 and the motor housing 532 or, more particularly, the stator core 518 and the lower end plate 540.

More particularly, as noted previously, the stator core 518 is preferably secured to the shell 536 via an interference fit. Under normal motor operation, it is therefore preferred the shell 536 secures the stator core 518 against relative axial shifting between the stator core 518 and the motor housing 532. However, should the fit loosen so significantly as to result in slippage of the stator core 518 relative to the shell 536 and the remainder of the motor housing 532 (e.g., due to a shock load, extreme thermal fluctuations, repeated thermal fluctuations over a significant enough portion of time, or other generally abnormal circumstances), the ring 638 would prevent extreme axial shifting of the stator core 518. More specifically, the ring 638 would prevent the stator core 518 and, in turn the stator 514, from shifting into contact with the lower end plate 540 as the stator core 518 slipped downward (due to gravity, for instance).

It is particularly noted, however, that while a secondary retention functionality (the shell providing primary retention functionality) as described above is preferred, it is permissible according to some aspects of the present invention for the stator retention ring to instead be the primary means by which axially downward shifting of the stator core is restricted or prevented.

As noted previously, the ring 638 preferably comprises an electrically insulative material such as a synthetic resin. The lower end plate 540 is therefore at least substantially insulated from the stator core 518 and the wiring 520 by the ring 638.

Preferably, the ring 638 includes a circumferential outer wall 640 presenting axially spaced apart upper and lower faces 642 and 644, respectively. The outer wall 640 preferably presents radially spaced apart inner and outer faces 646 and 648, with the outer face 648 preferably abutting or being disposed in close proximity to the shell 536.

The ring 638 further preferably includes a plurality of arcuately spaced apart crush ribs 650 disposed on the lower face 644 and configured to provide additional structural integrity to the ring 638 when subjected to axial loading. The crush ribs 650 cooperatively present a lowermost face 652 of the ring 638. It is permissible according to some aspects of the present invention, however, for the crush ribs to be omitted. In such a configuration, the previously described lower face of the ring would also be the lowermost face of the ring.

The ring 638 preferably presents an axial height between the upper face 642 and the lowermost face 652. In a preferred embodiment, the ring 638 is sized axially in such a manner as to accommodate variations in the height of the stator core 518 as might occur due to allowable manufacturing tolerances. That is, the height of the stator core 518 and, in turn, the axial dimension of the space 634, might vary from motor to motor during manufacturing without such variation being deemed a defect. It is therefore preferred that the axial height of the ring 638 be such that the ring 638 will appropriately fit in the space 634 both when the stator core 518 is at its largest allowable specified axial height and at its smallest allowable specified axial height.

Thus, in one configuration, as illustrated, the ring 638 might only partially (but preferably at least substantially) span the space 634 and be in contact with the stator core 518, such that an axial gap 654 (best shown in FIGS. 22 and 23 and included in the space 634) is defined between the lower end plate 540 and the ring 638.

Alternatively, in a second configuration, the ring might only partially (but preferably at least substantially) span the space and be in contact with the end plate, such that the axial gap is defined between the stator core and the ring.

In a third configuration, the ring might only partially (but preferably at least substantially) span the space and be in contact with neither the end plate nor the stator core, such that the axial gap includes upper and lower portions defined between the stator core and the ring and the between the ring and the end plate, respectively.

As will be apparent to one of ordinary skill in the art, in the first and third configurations described above, maintenance of the gap between the end plate and the ring prior to any attempted shifting of the stator core 518 requires some form of support of the stator ring 638. That is, in a motor orientated as illustrated—in which the connector 542 is provided at an axially upward end of the motor 512 relative to a global reference system—and absent some form of support, the stator ring would simply drop down toward the end plate due to gravity (see the second configuration, above).

As will be discussed in greater detail below, such support might provided by structural features the housing. Alternatively, friction between the ring and the housing, or any other suitable support means, might in whole or in part provide support to the ring. Such support means might be either (1) sufficient to restrict axially downward shifting of the ring prior to any attempting shifting of the stator core but insufficient to support the ring when subjected to loads associated with an axially downwardly slipping stator core (e.g., low levels of friction or deflectable latches with a sufficiently low resiliency); or (2) sufficient to restrict axially downward shifting of the ring prior to and during any attempting shifting of the stator core (e.g., a solid shelf or plurality of fingers).

Turning again to the above-described first through third configurations and considering the former case, in which slippage of the ring may occur upon loading associated with slippage of the stator core, any slippage of the stator core would be limited to the distance spanned by the axial gap. That is, the stator core can only slip so far as to close the axial gap. In the latter case, of course, no shifting of the stator core will be permissible.

It is also noted that support means might be provided that allow some degree of shifting of the ring without enabling complete closure of the axial gap. For instance, a wedge-like surface might abut the ring in such a manner as to enable shifting until the wedge-like surface "locks" the ring into place.

In a preferred embodiment, the axial dimension of the gap 654 is less than about ten-hundredths (0.10) inches, such that the maximum downward stator core 518 slippage relative to the housing, before direct contact is achieved between the stator core 518, the ring 638, and the lower end plate 540, is ten-hundredths (0.10) of an inch.

One of ordinary skill in the art will recognize, however, that an appropriate gap size will be dependent on factors including but not limited to the overall motor size, the stator core size, the envelope required for components to be fit in the space, the allowable manufacturing tolerances for the stator core (and, in particular, its laminations), and so on.

Furthermore, in a fourth configuration that contrasts with the aforementioned gap-defining configurations, the ring might span the entirety of the space, so as to directly abut both the core and the end plate with its upper face and lowermost face, respectively. In such a configuration, no axially downward slippage of the stator core could occur, even if fixation relative to the shell should fail.

Lead Wire Routing

In addition to the above-described stator-retention functionality, the ring 638 further preferably functions to route the lead wires 524 that extend from the coils 522, through the portal 586, and to the controller 576.

More particularly, with regard to wire routing, the ring 638 preferably includes a plurality of arcuately spaced apart fingers 656 extending generally radially inwardly from the outer wall 640. Each finger 656 is also spaced axially from both the upper and lower faces 642 and 644, respectively, of the outer wall 640, so as to be spaced axially downwardly from the stator core 518.

Preferably, the fingers 656 are disposed in sets of arcuately evenly spaced apart pairs, although an even distribution or other regular or irregular distribution falls within the ambit of the present invention.

As best shown in FIGS. 24, 27, and 28, the fingers 656 preferably restrict axially downward shifting of at least some of the wiring 520. More particularly, the fingers 656 preferably restrict such shifting of at least some of the lead wires 524 as they extend generally circumferentially along the outer periphery of the stator core 518.

In addition to routing, the fingers 656 also preferably assist in electrical insulation of the lower end plate 540 from the wiring 520, which might otherwise fall or sag axially downwardly into contact with the lower end plate 540.

Lead Wire Protection

In addition to routing the lead wires 524, the ring 638 preferably functions to at least in part protect the lead wires 524. More particularly, as will be discussed in greater detail below, the ring 638 preferably functions to protect the lead wires 524 as they extend through the portal 586 from the motor chamber 534 to the controller chamber 580.

Preferably, the motor housing 532 comprises a metal such as aluminum. As best shown in FIGS. 25-26a, the portal 586 is preferably cut or otherwise formed through the shell in such a manner that the shell 536 presents a sharp edge 658 adjacent the motor chamber 534 and a rounded edge 659 adjacent the controller chamber 580. The sharp edge 658 preferably includes a plurality of sharp edge sides 658a, 658b, 658c, and 658d at least in part defining the portal 586. The edge sides 658a, 658b, 658c, and 658d preferably form a generally rectangular shape, although other shapes and/or numbers of edges are permissible without departing from the scope of some aspects of the present invention. It is also permissible that some or all of the edges and/or edge sides be smooth or rounded rather than sharp, or vice versa.

As also best shown in FIGS. 25-26a, in a preferred embodiment, the ring 638 defines a lip 660 including a plurality of lip sides 660a, 660b, and 660c. The lip sides 660a, 660b, and 660c preferably extend over at least part and most preferably at least substantially the entirety of each of the corresponding edge sides 658a, 658b, and 658c, such that the lip 660 extends over a portion of the edge 658.

The lip 660 thus prevents direct engagement between the lead wires 524 and the covered portions of the edge 658 (i.e., the edge sides 658a, 658b, and 658c). Furthermore, as shown most clearly in FIGS. 24 and 28, the fingers 656 assist in avoiding contact between the lead wires 524 and the edge side 658d by restricting axially downward shifting of the wires 524 prior to their extension through the portal 586.

Furthermore, in a manner similar to that discussed above with respect to more generically described support structures, the lip 660 may also function to restrict axial shifting of the ring 638 relative to the motor housing 532 both prior to and contemporaneously with attempted axially downward shifting of the stator core 518 relative to the motor housing 532. For instance, as best shown in FIGS. 25 and 26, the lip side 660*a* of the lip 660 preferably extends along almost the entirety of the edge side 658*a* so as to nearly abut the edge side 658*d*. This near-abutment enables the edge 658 to restrict axially downward shifting of the ring 638 relative to the motor housing 532 and, in turn, axially downward shifting of the stator core 518 relative to the motor housing 532 after only a very small amount of slippage (whether of the stator ring 638 alone or of the ring 638 and the stator core 518 both) has occurred.

Stator Core Insulation

As noted previously, the ring 638 preferably comprises an electrically insulative material. As will be discussed in greater detail below, the ring 638 is preferably configured to provide secondary insulation of the stator core 518.

More particularly, the stator 514 preferably includes a plurality of electrically insulative end caps cap 662, best shown in FIGS. 22 and 28-30, cooperatively forming an electrically insulative covering that at least in part overlies the stator core 518.

Each end cap 662 preferably includes upper and lower end cap segments 662*a*,662*b*. As best shown in FIG. 28, the end cap segments 662*a*,662*b* include respective generally radially outwardly and circumferentially extending rim portions 664*a*,664*b*, with the rim portions 664*a*,664*b* cooperatively forming at least substantially continuous upper and lower circular rims 666*a*,666*b*, respectively. The rims 666*a*, 666*b* preferably directly abut the stator core 518 and thereby provide electrical insulation thereto.

Preferably, the ring 638 includes a shelf 668 extending generally radially inwardly from the outer wall 640. The preferred shelf 668 is disposed axially above the fingers 656. The shelf 668 preferably extends at least substantially continuously circumferentially, although discontinuous or truncated extension is permissible according to some aspects of the present invention.

As best shown in FIG. 30, the shelf 668 is preferably disposed axially below the lower rim 666*b* in such a manner that radial overlap occurs therebetween. Such overlap is preferably of a non-contacting variety (i.e., an axial space 670 is preferably defined between the shelf 668 and the lower rim 666*b*), although direct abutment is permissible according to some aspects of the present invention.

Furthermore, it is preferred that the shelf 668 overlaps only a portion of the lower rim 666*b*. Full overlap is permissible according to some aspects of the present invention, however.

As best shown in FIG. 30, the aforementioned preferred partial overlap between the lower rim 666*b* and the shelf 668 preferably results in the definition of a labyrinth 672 therebetween. The labyrinth 672 and the shelf 668 itself thus cooperatively provide a barrier against axially upward shifting of the lead wires 524 into contact with the stator core 518. (As noted previously, the fingers 656 preferably cooperatively restrict axially downward shifting of the lead wires 524.)

Although some degree of overlap is preferred, it is also noted, however, that a non-overlapping shelf and rim might nevertheless cooperatively define some form of labyrinth or tortuous path that would restrict the lead wires from shifting into contact with the stator core.

End Plate Fastener Insulation

The ring 638 additionally preferably provides an electrically insulative barrier about a plurality of fasteners 674 that secure the lower end plate 540 relative to the stator core 518.

More particularly, the ring 638 preferably includes a plurality of bosses 676 each defining a fastener-receiving opening 678. As shown in detail in FIG. 29, each fastener-receiving opening 678 preferably receives a corresponding one of the fasteners 674 and at least in part insulates the corresponding fastener 674 from the wiring 520.

The bosses 676 are preferably evenly arcuately spaced apart. Furthermore, each boss 676 is preferably disposed arcuately between the fingers 656 of each of the aforementioned pairs of fingers 656, although other positioning and spacing is permissible according to some aspects of the present invention.

Encoder Flywheel

As noted previously, the rotor 516 preferably includes the rotor core 528, the magnets 530, and the rotor shaft 526, with the rotor shaft 526 rotatably supporting the rotor core 528 and the magnets 530.

Furthermore, the motor 512 preferably includes the encoder assembly 594 and the encoder housing 596, with the encoder housing 596 at least substantially defining the encoder flywheel chamber 598. The encoder housing 596 preferably includes the base plate 600 and the lower end plate 540 of the motor housing 532. The encoder flywheel chamber 598 preferably at least substantially receives the encoder assembly 594.

In a preferred embodiment, the encoder assembly 594 includes an encoder flywheel 680 fixed to the rotor shaft 526 to rotate therewith. The encoder flywheel 680 preferably includes a wheel body 682 and a sensed element 684 secured to the wheel body 682 to rotate therewith.

More particularly, the wheel body 682 preferably includes radially extending flywheel disc 686 and a center wall 688 extending generally axially from the flywheel disc 686. The center wall 688 and the flywheel disc 686 each preferably at least substantially circumscribe and abut the rotor shaft 526 to cooperatively form a hub 690 for the wheel body 682.

Preferably, as best shown in FIGS. 16 and 36, the rotor shaft 526 includes an axially lower end 692 comprising a connecting element 694 that drivingly engages the hub 690.

In a preferred embodiment, the sensed element 684 comprises a reflective code disc 696 similar to the previously described reflective code disc 400 of the turntable motor assembly 310. It is permissible, however, for an alternative type of sensed element to be provided. Preferably, however, the sensed element 684 comprises at least one of a position indicator and a direction indicator.

The sensed element 684 is preferably secured to the flywheel disc 686, although fixation to another component of the wheel body 682 is permissible according to some aspects of the present invention.

Furthermore, the sensed element 684 is preferably secured to the flywheel disc 686 by means of a pressure-sensitive adhesive (particularly if in the preferred reflective code disc form). However, alternative securement by any means known in the art (e.g., discrete fasteners, latches, other types of adhesives, etc.) is permissible according to some aspects of the present invention.

The encoder assembly 594 further preferably includes a sensor assembly 698 that is stationary relative to the encoder flywheel 680 and configured to sense the sensed element 684. The sensor assembly 698 is thus configured to sense rotation of the wheel body 682 and, in turn, of the rotor 516 in general.

Although any one or more of a variety of sensor types may be suitable according to some aspects of the present invention, it is preferred that sensor assembly 698 include an encoder chip 700.

As noted previously, the encoder housing 596 includes the lower end plate 540, which presents inner and outer faces 602 and 604 adjacent the motor chamber 534 and the encoder flywheel chamber 598, respectively. As best shown in FIG. 36, the sensor assembly 698 is preferably fixed to the outer face 604 of the lower end plate 540.

More particularly, the sensor assembly 698 preferably includes a bracket 702 and a plurality of electronic components 704 fixed to the bracket 702. The bracket 702 is preferably fixed to the lower end plate 540 by means of fasteners 706. Other fixation locations are permissible according to some aspects of the present invention, however.

The electronic components 704 preferably include the encoder chip 700. The bracket 702 may be a printed circuit board or any other suitable structure for enabling both support and operation of the electronic components 704.

The rotor 516 and the encoder flywheel 680 each present respective rotor and encoder flywheel moments of inertia based on the respective masses and geometries thereof. The rotor 516 and the encoder flywheel 680 further cooperatively present a total moment of inertia based on their combined masses and geometries.

Preferably, the encoder flywheel moment of inertia is at least fifteen percent (15%) of the total moment of inertia and less than or equal to about ninety-five percent (95%) of the total moment of inertia. More preferably, the encoder flywheel moment of inertia is in a range from about twenty percent (20%) to about ninety-two percent (92%) of the total moment of inertia. In the illustrated embodiment, the encoder flywheel moment of inertia is preferably about twenty-one and five-tenths percent (21.5%) of the total moment of inertia.

As will be discussed in detail below, the breadth of the above preferred ranges is at least in part dictated by the allowable variations in preferred configurations of the gear assembly 544.

More particularly, upon rotation at a given angular velocity, the rotor 516 and the encoder flywheel 680 cooperatively present a total angular momentum that is a function of the square of the angular velocity and of the total moment of inertia. Such angular momentum preferably assists the motor 512 in operating smoothly despite potentially detrimental effects such as gearing backlash, unexpected loading, and so on.

High gear ratios provided by an associated gear assembly (e.g., a 10:1 ratio) result in significant slowing of the rotation of the connector relative to the rotor shaft. That is, the rotor and the encoder flywheel are spinning very quickly relative to the connector and provide a very large angular velocity contribution to the overall angular momentum. Thus, a high gear ratio enables a suitably high total angular momentum to be achieved in association with a greater reliance on angular velocity than on mass (or, more broadly speaking, moment of inertia).

In contrast, a gear assembly having a low gear ratio (e.g., a 2:1 ratio) results in relatively insignificant slowing of the rotation of the connector relative to the rotor shaft. That is, the rotor and the encoder flywheel are spinning only somewhat quickly relative to the connector and provide a only a small or moderate angular velocity contribution to the overall angular momentum. Thus, a sufficiently high total angular momentum perhaps cannot be achieved through significant reliance on angular velocity rather than mass/moment of inertia. Rather, it may be necessary to increase the total moment of inertia (e.g., by increasing the density, radius, and/or axial thickness of the encoder flywheel and/or the rotor core, etc.) to achieve the desired angular momentum.

A direct drive system in which rotor shaft speeds and connector speeds are at least substantially equal—in effect, a gear assembly having a one-to-one (1:1) gear ratio—may necessitate an even greater reliance on the total moment of inertia to achieve suitable levels of angular momentum.

Thus, as will be apparent to one of ordinary skill in the art, the total angular momentum may be adjusted to meet overall motor performance needs through any one or more of a variety of design changes, including but not limited to mass and/or geometric changes to vary the total moment of inertia and gear ratio changes to vary the influence of angular velocity.

However, as will also be apparent to one of ordinary skill in the art, the most desirable of such changes will vary according to factors including but not limited to manufacturing expense, electromagnetic considerations, and motor envelope. For instance, increasing the axial and/or radial dimensions of the encoder flywheel might be more economically feasible than reconfiguring the manufacturing process to produce a larger-diameter laminated rotor core and, in turn, a larger stator core to accommodate the enlarged rotor core. Increasing encoder size or rotor core size might be more desirable for economic or other reasons than increasing the gear ratio. However, limits in motor envelope might dictate that it is necessary both to increase the encoder flywheel and/or rotor size and to increase the gear ratio. For instance, the axial and radial space required for a large enough encoder flywheel might simply not be available, necessitating an increased gear ratio.

In view of the above considerations, in a preferred embodiment of the present invention, it is generally desirable to avoid rotor core redesign and to minimize the gear ratio as much as possible. Thus, to increase angular momentum, the encoder flywheel inertia preferably is increased to the extent allowed by the motor envelop (e.g, via increases in axial thickness and/or outer diameter) before any gear ratio increases are implemented in the gear assembly.

Turning now to specific examples, in the preferred illustrated turntable motor assembly 510, the gear assembly 544 presents a six-to-one (6:1) gear ratio, with the encoder flywheel 680 presenting twenty-one and five tenths percent (21.5%) of the total moment of the inertia. In contrast, an otherwise identical turntable motor having a direct drive interconnection between the rotor shaft and the connector preferably includes an encoder flywheel that provides a much higher ninety-two percent (92%) of the total moment of inertia.

In an alternative motor type (e.g., a locomotion motor similar to the locomotion motor 114) with a twenty-to-one (20:1) gear ratio, the encoder flywheel might preferably provide thirty-nine percent (39%) of the total moment of inertia. In contrast, in an otherwise identical alternative motor having a ten-to-one (10:1) gear ratio, the encoder flywheel might preferably provide a much higher eighty-five percent (85%) of the total moment of inertia.

As will be apparent from the above discussion of angular momentum and moments of inertia, specific geometries of certain components of the turntable motor assembly 510, as well as certain relative dimensions of various components, are significant factors in motor design.

For instance, as best shown in FIG. 35, the flywheel disc 686 presents a flywheel disc outer diameter OD_fly and a flywheel disc axial thickness T_fly. The flywheel disc axial thickness T_fly is preferably greater than about three percent (3%) of the flywheel disc outer diameter OD_fly. More preferably, the flywheel disc axial thickness T_fly is between about four percent (4%) and about twenty percent (20%) of the flywheel disc outer diameter OD_fly. Most preferably, the flywheel disc axial thickness T_fly is about six percent (6%) of the flywheel disc outer diameter OD_fly.

Furthermore, as noted previously and as best characterized in FIG. 35, the rotor core 528 presents a radially outermost core diameter OD_core defined by the radially outer face 612, as well as a core axial height H_core defined between the top and bottom faces 608 and 610. The core axial height H_core is preferably between about fifteen percent (15%) and about thirty-five percent (35%) of the core outer diameter OD_core. Most preferably, the core axial height H_core is about twenty-five percent (25%) of the core outer diameter OD_core.

Yet further, the flywheel disc axial thickness T_fly is preferably between about fifteen percent (15%) and about thirty-five percent (35%) of the core axial height H_core. Most preferably, the flywheel disc axial thickness T_fly is about twenty-five percent (25%) of the core axial height H_core.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A motor for use in a machine, said motor comprising:
a rotor rotatable about an axis, said rotor including—
  a core,
  a plurality of magnets fixed relative to the core to rotate therewith, and
  a rotor shaft including an end and rotatably supporting the core and the magnets;
a gear assembly including an input gear and an output gear, said end of said rotor shaft comprising the input gear, said gear assembly having a 6:1 gear ratio and being operable to decrease rotational speed and increase torque; and
an encoder flywheel fixed to the rotor shaft to rotate therewith,
said encoder flywheel including a wheel body and a sensed element secured to the wheel body to rotate therewith,
said rotor and said encoder flywheel cooperatively presenting a total moment of inertia,
said encoder flywheel presenting an encoder flywheel moment of inertia that is at least 15% of the total moment of inertia.

2. The motor as claimed in claim 1,
said encoder flywheel moment of inertia being less than or equal to about 95% of the total moment of inertia.

3. The motor as claimed in claim 2,
said encoder flywheel moment of inertia being in a range from about 20% to about 92% of the total moment of inertia.

4. The motor as claimed in claim 1,
said encoder flywheel moment of inertia being about 21.5% of the total moment of inertia.

5. The motor as claimed in claim 1, further comprising:
an encoder assembly including—
  said encoder flywheel, and
  a sensor assembly that is stationary relative to the encoder flywheel,
  said sensor assembly configured to sense the sensed element and, in turn, the rotation of the wheel body.

6. The motor as claimed in claim 5,
said sensor assembly including an encoder chip.

7. The motor as claimed in claim 5, further comprising:
a motor housing defining a motor chamber that substantially receives the rotor,
said motor housing including an end plate presenting an inner face adjacent the motor chamber and an outer face axially opposite the motor chamber,
said sensor assembly being fixed to the outer face.

8. The motor as claimed in claim 7, further comprising:
a bearing rotatably supporting the rotor shaft,
said end plate defining a bearing sleeve substantially supporting the bearing.

9. The motor as claimed in claim 7, further comprising:
a cover fixed to the end plate adjacent the outer face,
said end plate and said cover at least in part defining an encoder flywheel chamber spaced axially from the motor chamber,
said encoder assembly being substantially received in said encoder flywheel chamber.

10. The motor as claimed in claim 1,
said sensed element comprising at least one of a position indicator and a direction indicator.

11. The motor as claimed in claim 10,
said sensed element comprising a reflective code disc.

12. The motor as claimed in claim 1,
said wheel body including a generally radially extending flywheel disc,
said sensed element being secured to the flywheel disc.

13. The motor as claimed in claim 12,
said wheel body further including a generally circumferential center wall extending generally axially from the flywheel disc,
said center wall substantially circumscribing and abutting the shaft.

14. The motor as claimed in claim 12,
said flywheel disc presenting an outer diameter and an axial thickness,
said axial thickness being between about 4% and about 20% of the outer diameter.

15. The motor as claimed in claim 14,
said axial thickness being about 6% of the outer diameter.

16. The motor as claimed in claim 12,
said flywheel disc presenting an axial thickness,
said rotor core presenting an axial height,
said axial thickness being between about 15% and about 35% of the axial height.

17. The motor as claimed in claim 16,
said axial thickness being about 25% of the axial height.

18. A motor for use in a machine, said motor comprising:
a rotor rotatable about an axis, said rotor including—
  a core,
  a plurality of magnets fixed relative to the core to rotate therewith, and
  a rotor shaft rotatably supporting the core and the magnets; and
an encoder flywheel fixed to the rotor shaft to rotate therewith,
said encoder flywheel including a wheel body and a sensed element, said wheel body including a generally radially extending flywheel disc presenting an outer diameter and an axial thickness, said axial thickness being about 6% of the outer diameter, said sensed element being secured to the flywheel disc to rotate therewith,
said rotor and said encoder flywheel cooperatively presenting a total moment of inertia,
said encoder flywheel presenting an encoder flywheel moment of inertia that is at least 15% of the total moment of inertia.

19. A motor for use in a machine, said motor comprising:
a rotor rotatable about an axis, said rotor including—
  a core,
  a plurality of magnets fixed relative to the core to rotate therewith, and
  a rotor shaft including an end and rotatably supporting the core and the magnets;
a gear assembly including an input gear and an output gear, said end of said rotor shaft comprising the input gear, said gear assembly having a 10:1 gear ratio and being operable to decrease rotational speed and increase torque; and
an encoder flywheel fixed to the rotor shaft to rotate therewith,
said encoder flywheel including a wheel body and a sensed element secured to the wheel body to rotate therewith,
said rotor and said encoder flywheel cooperatively presenting a total moment of inertia,
said encoder flywheel presenting an encoder flywheel moment of inertia that is about 85% of the total moment of inertia.

20. A motor for use in a machine, said motor comprising:
a rotor rotatable about an axis, said rotor including—
  a core,
  a plurality of magnets fixed relative to the core to rotate therewith, and
  a rotor shaft including an end and rotatably supporting the core and the magnets;
a gear assembly including an input gear and an output gear, said end of said rotor shaft comprising the input gear, said gear assembly having a 20:1 gear ratio and being operable to decrease rotational speed and increase torque; and
an encoder flywheel fixed to the rotor shaft to rotate therewith,
said encoder flywheel including a wheel body and a sensed element secured to the wheel body to rotate therewith,
said rotor and said encoder flywheel cooperatively presenting a total moment of inertia,
said encoder flywheel presenting an encoder flywheel moment of inertia that is about 39% of the total moment of inertia.

* * * * *